| (12) | United States Patent | (10) Patent No.: | US 12,268,112 B2 |
|---|---|---|---|
| | Tamatani et al. | (45) Date of Patent: | Apr. 8, 2025 |

(54) SYSTEM TO ADJUST OBJECT DETECTION DIRECTION FOR AGRICULTURAL MACHINE

(71) Applicant: KUBOTA CORPORATION, Osaka (JP)

(72) Inventors: Kenji Tamatani, Sakai (JP); Yuji Okuyama, Sakai (JP); Kazuo Sakaguchi, Sakai (JP); Yusuke Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 245 days.

(21) Appl. No.: 17/839,535

(22) Filed: Jun. 14, 2022

(65) Prior Publication Data

US 2022/0400598 A1 Dec. 22, 2022

(30) Foreign Application Priority Data

Jun. 22, 2021 (JP) .................................. 2021-103303
Jun. 22, 2021 (JP) .................................. 2021-103304

(51) Int. Cl.
*A01B 69/00* (2006.01)
*A01B 63/00* (2006.01)
*A01B 69/04* (2006.01)

(52) U.S. Cl.
CPC .......... *A01B 69/008* (2013.01); *A01B 63/008* (2013.01); *A01B 69/001* (2013.01)

(58) Field of Classification Search
CPC .... A01B 69/001; A01B 69/008; A01B 63/008
(Continued)

(56) References Cited

U.S. PATENT DOCUMENTS 6,507,366 B1 * 1/2003 Lee .................. H04N 7/142
348/169
10,126,754 B2 * 11/2018 Ogura .................. G05D 1/0016
(Continued)

FOREIGN PATENT DOCUMENTS

| EP | 2976934 A1 * | 1/2016 | ............. A01B 69/00 |
|---|---|---|---|
| JP | 10-155309 A | 6/1998 | |

(Continued)

OTHER PUBLICATIONS

Official Communication issued in corresponding Japanese Patent Application No. 2021-103303, mailed on Oct. 18, 2022.
(Continued)

*Primary Examiner* — Andrew R Dyer
(74) *Attorney, Agent, or Firm* — Keating & Bennett, LLP

(57) ABSTRACT

An agricultural machine includes a traveling vehicle body, a detector to detect objects in an area surrounding the traveling vehicle body, a detection adjuster to adjust a detection direction of the detector, a position sensor to detect a position of the traveling vehicle body, and an information acquirer to acquire information relating to an entrance/exit of an agricultural field. The detection adjuster is operable to perform a first adjustment of orienting the detection direction toward an end point of the entrance/exit when the traveling vehicle body is traveling toward the entrance/exit and a distance from the position of the traveling vehicle body to the entrance/exit included in the information is a predetermined value or less, and a second adjustment of orienting the detection direction toward the end point of the entrance/exit or a space forward of the end point in a traveling direction when the traveling vehicle body is traveling on the entrance/exit.

8 Claims, 42 Drawing Sheets

(58) Field of Classification Search
USPC .......................................................... 701/117
See application file for complete search history.

(56) References Cited

U.S. PATENT DOCUMENTS

| | | | |
|---|---|---|---|
| 10,474,153 B2* | 11/2019 | Matsuzaki | G05D 1/0214 |
| 11,912,205 B2* | 2/2024 | Takase | A01B 69/008 |
| 2016/0021813 A1* | 1/2016 | Matthews | A01B 69/00 |
| | | | 701/26 |
| 2021/0172149 A1* | 6/2021 | Keigley | A01B 63/114 |
| 2022/0105874 A1* | 4/2022 | Takase | G05D 1/248 |

FOREIGN PATENT DOCUMENTS

| | | |
|---|---|---|
| JP | 2016-134129 A | 7/2016 |
| JP | 2017-176007 A | 10/2017 |
| JP | 2018-150010 A | 9/2018 |
| JP | 2020-065451 A | 4/2020 |
| JP | 2020-072740 A | 5/2020 |
| JP | 2020-103102 A | 7/2020 |
| JP | 2020-166534 A | 10/2020 |

OTHER PUBLICATIONS

Official Communication issued in corresponding Japanese Patent Application No. 2021-103304, mailed on Oct. 18, 2022.

* cited by examiner

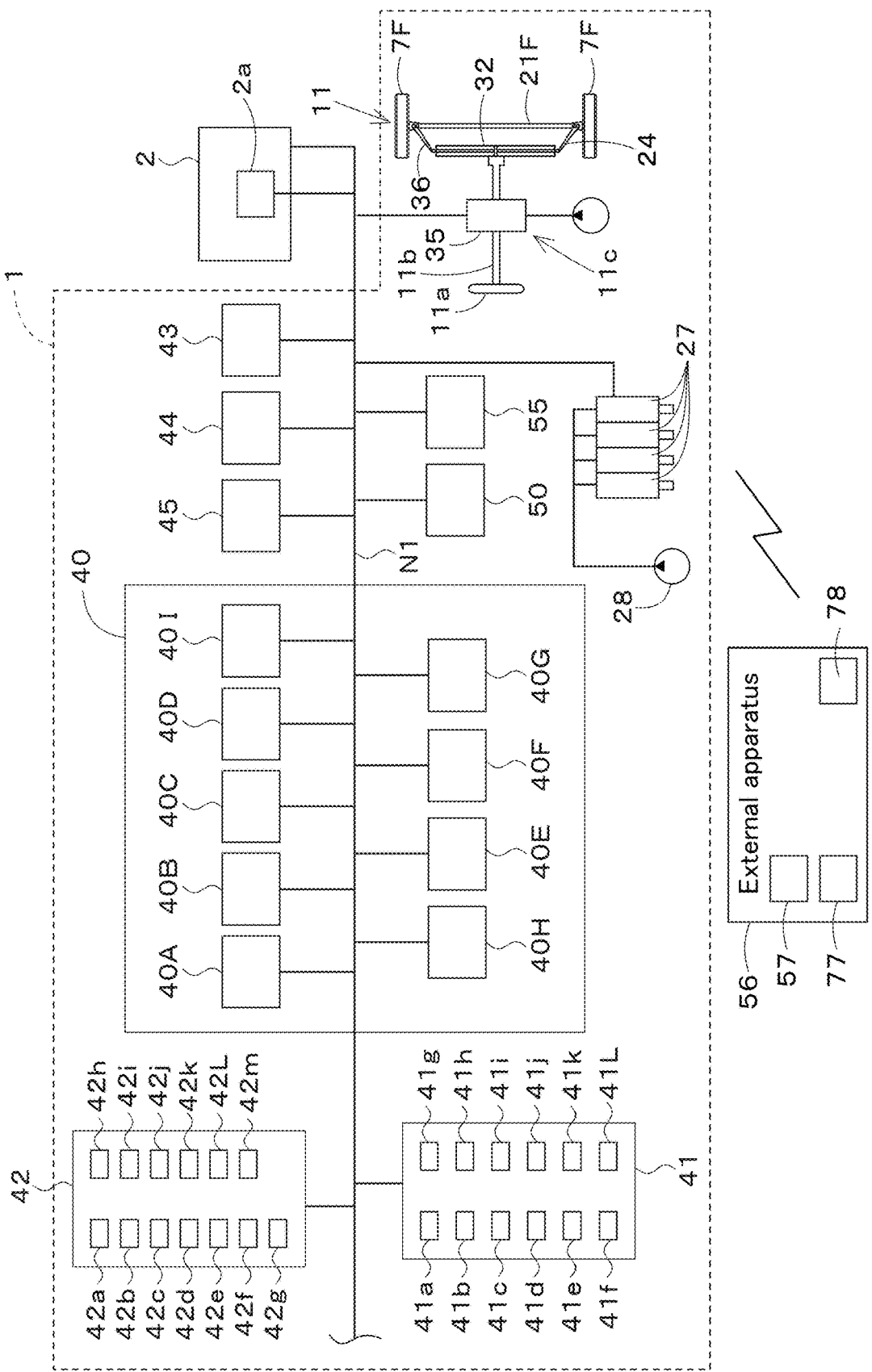

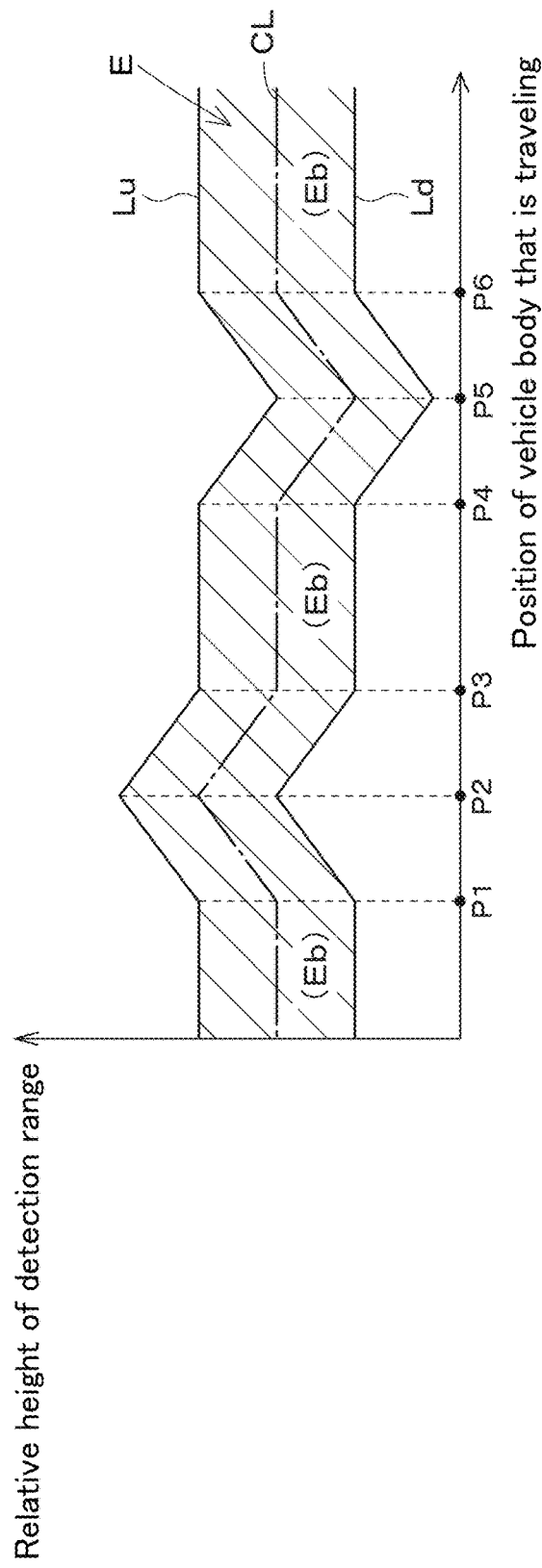

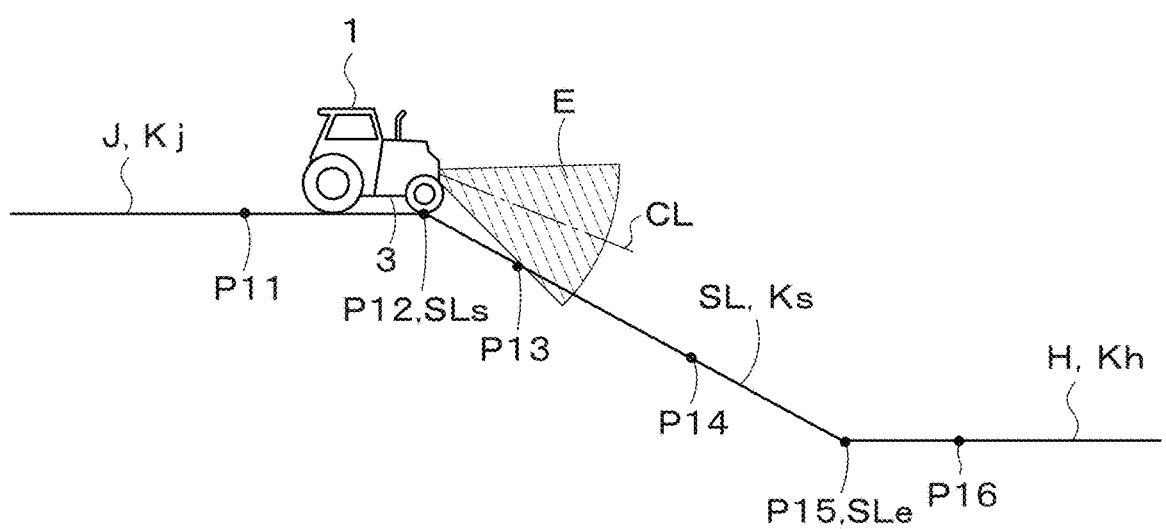

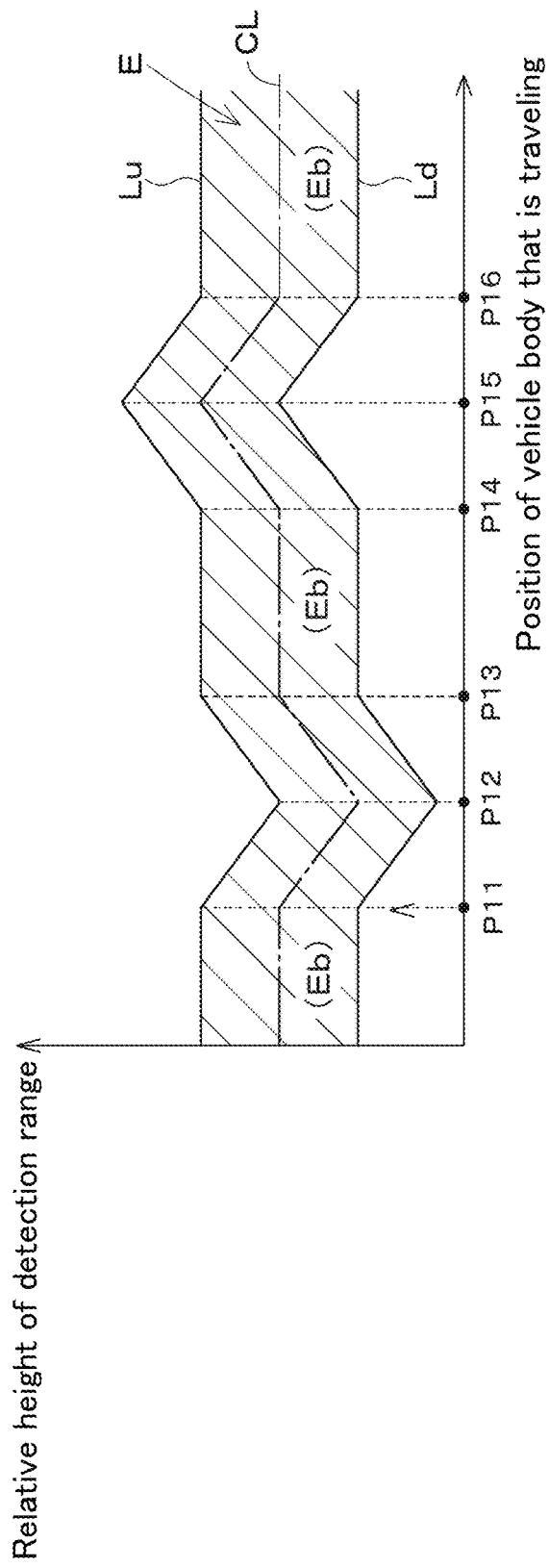

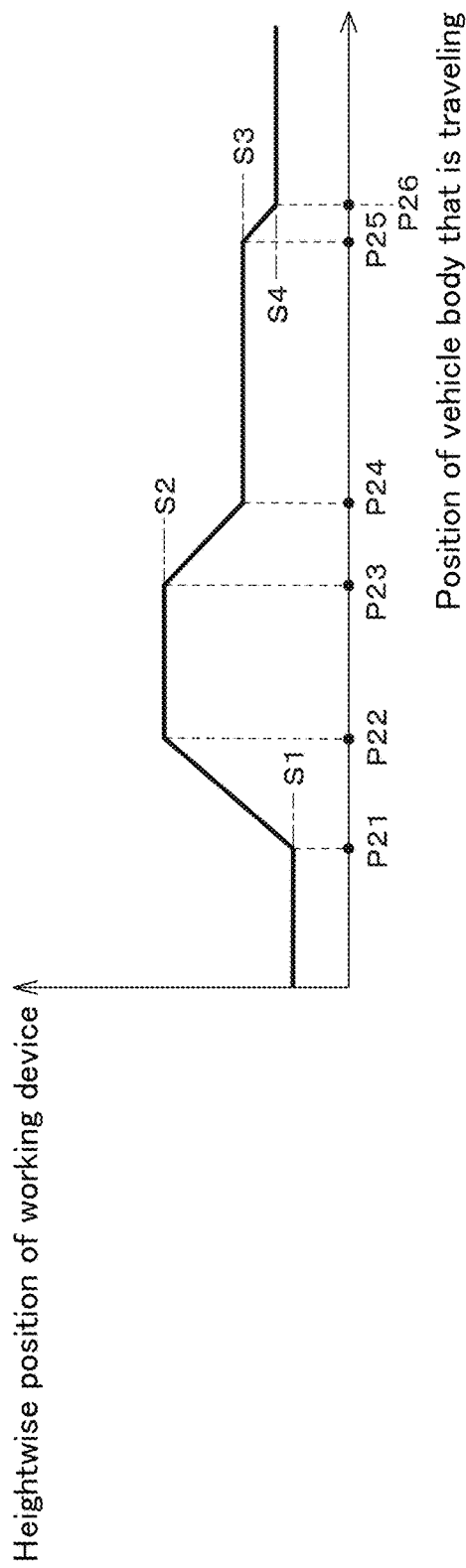

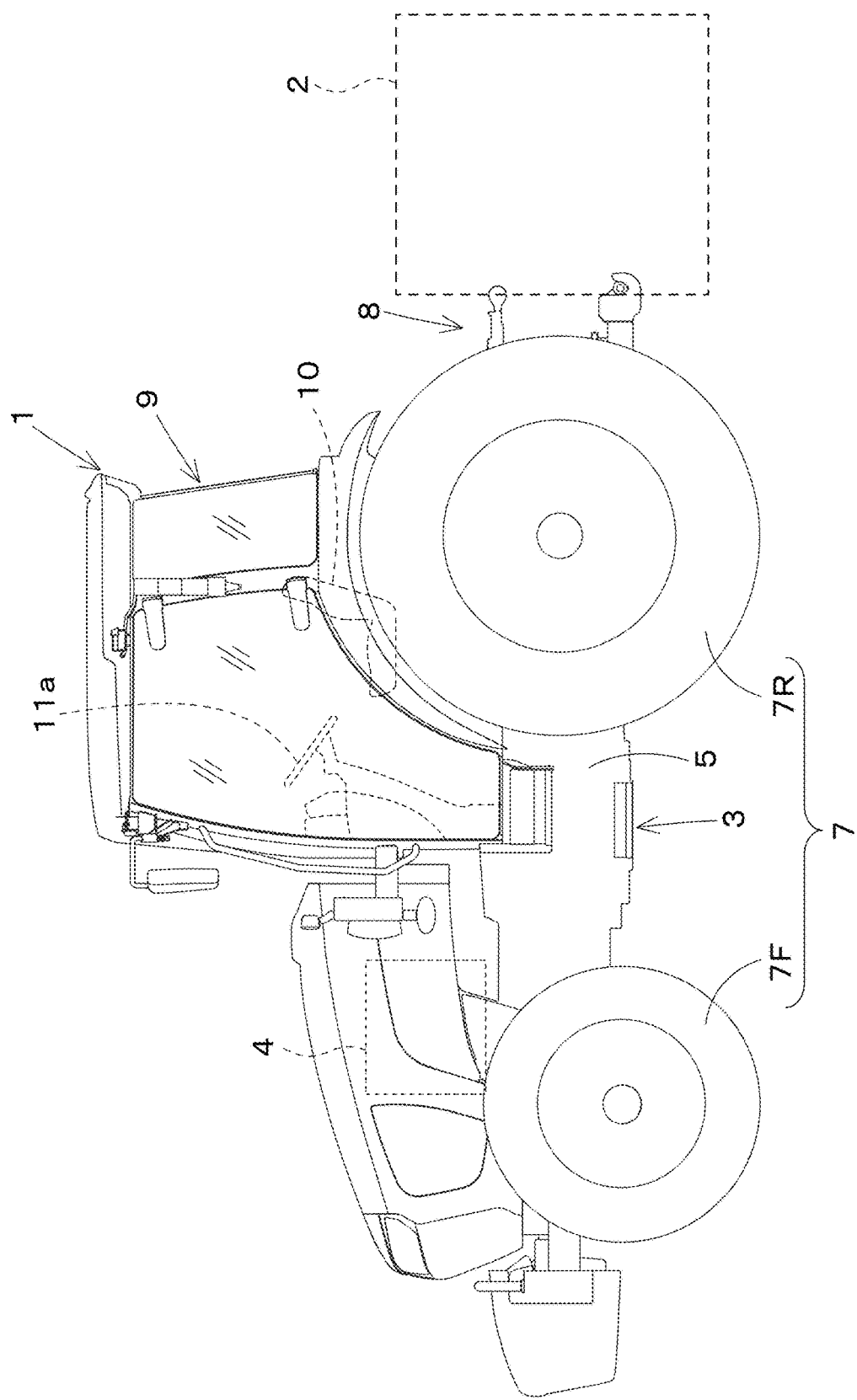

SYSTEM TO ADJUST OBJECT DETECTION DIRECTION FOR AGRICULTURAL MACHINE

CROSS-REFERENCE TO RELATED APPLICATION

This application claims the benefit of priority to Japanese Patent Application No. 2021-103303 filed on Jun. 22, 2021, and to Japanese Patent Application No. 2021-103304 filed on Jun. 22, 2021. The entire contents of this application are hereby incorporated herein by reference.

BACKGROUND OF THE INVENTION

1. Field of the Invention

The present invention relates to an agricultural machine including a detector to detect objects in a surrounding area and a raising/lowering device to raise and lower a working device linked to a traveling vehicle body.

2. Description of the Related Art

Agricultural machines disclosed in Japanese Unexamined Patent Application Publication No. 2020-103102 and Japanese Unexamined Patent Application Publication No. 2020-166534 are each known as an agricultural machine which detects objects in a surrounding area using a detector such as a sensor. The agricultural machines of Japanese Unexamined Patent Application Publication No. 2020-103102 and Japanese Unexamined Patent Application Publication No. 2020-166534 each include an obstacle sensor to detect obstacles in a surrounding area of a traveling vehicle body which is configured to travel, and an inclination sensor to detect the inclination of the traveling vehicle body in a front-rear direction or a sideways direction of the traveling vehicle body, wherein, upon detection of the inclination of the traveling vehicle body with the inclination sensor, a detection range of the obstacle sensor in the direction of inclination is reduced.

Furthermore, agricultural machines disclosed in Japanese Unexamined Patent Application Publication No. 10-155309 and Japanese Unexamined Patent Application Publication No. 2020-72740 are each known as an agricultural machine including a raising/lowering device configured to raise and lower a working device linked to a traveling vehicle body. Each of the agricultural machines of Japanese Unexamined Patent Application Publication No. 10-155309 and Japanese Unexamined Patent Application Publication No. 2020-72740, when traveling without doing work on the ground using the working device, detects the forward, rearward, leftward, or rightward inclination of the traveling vehicle body or the inclination of a land surface using a sensor and/or the like, and changes the height of the working device using the raising/lowering device based on the inclination angle and position information of the traveling vehicle body or agricultural field information to avoid the contact of the working device with the land surface.

SUMMARY OF THE INVENTION

There are cases in which a sloping entrance is provided to an agricultural field for entrance and exit of an agricultural machine. There are cases in which, before the agricultural machine travels to such an entrance, a large portion of the land surface of the entrance enters the detection range of a detector provided on the agricultural machine, resulting in a reduction in performance of detecting other targets. There are also cases in which, when the agricultural machine travels to the entrance, the traveling vehicle body of the agricultural machine is inclined such that the detection range and the detection direction of the detector are oriented upward or downward, resulting in a reduction in performance of detecting other targets. Even when the detection range of the detector is reduced when the agricultural machine is inclined as disclosed in Japanese Unexamined Patent Application Publication No. 2020-103102 and Japanese Unexamined Patent Application Publication No. 2020-166534, the target detection performance may decrease. Such a reduction in target detection performance may adversely affect the travel of the agricultural machine.

When the height of the working device is increased according to the inclination of the agricultural machine or the land surface in order to avoid the contact of the working device with the land surface as disclosed in Japanese Unexamined Patent Application Publication No. 10-155309 and Japanese Unexamined Patent Application Publication No. 2020-72740, the center of gravity of the agricultural machine may be raised and the agricultural machine may become unstable, which may adversely affect the travel of the agricultural machine. In particular, when the agricultural machine with the working device held in high position travels an unstable land surface such as an entrance to the agricultural field that is inclined at a greater angle than the agricultural field or agricultural roads, the agricultural machine may fall down due to the high center of gravity thereof.

Preferred embodiments of the present invention provide agricultural machines each of which is capable of ensuring high detection performance of a detector even when land surface conditions change.

Preferred embodiments of the present invention provide agricultural machines each of which is capable of safely traveling with a working device held at varying heights.

An agricultural machine according to an aspect of a preferred embodiment of the present invention includes a traveling vehicle body to travel, a detector to detect objects in a surrounding area of the traveling vehicle body, a detection adjuster to adjust a detection direction of the detector, a position sensor to detect a position of the traveling vehicle body, and an information acquirer to acquire information relating to an entrance/exit of an agricultural field, wherein the detection adjuster is operable to perform a first adjustment when the traveling vehicle body is traveling toward the entrance/exit and a distance from the position of the traveling vehicle body detected by the position sensor to a position of the entrance/exit included in the information relating to the entrance/exit acquired by the information acquirer is equal to or less than a predetermined value, the first adjustment being an adjustment in which the detection adjuster orients the detection direction toward an end point of the entrance/exit, and a second adjustment when the traveling vehicle body is traveling on the entrance/exit, the second adjustment being an adjustment in which the detection adjuster orients the detection direction toward the end point of the entrance/exit or a space forward of the end point in a direction of travel of the traveling vehicle body.

In an aspect of a preferred embodiment of the present invention, the detection adjuster may perform a third adjustment when the traveling vehicle body is traveling on the entrance/exit and a distance from the position of the traveling vehicle body to the end point of the entrance/exit is equal to or less than a predetermined value, the third adjustment being an adjustment in which the detection adjuster orients the detection direction toward a space forward of the end point of the entrance/exit in the direction of travel of the traveling vehicle body. The detection adjuster may perform a fourth adjustment when the traveling vehicle body has traveled out of the entrance/exit, the fourth adjustment being an adjustment in which the detection adjuster orients the detection direction toward a space forward of the traveling vehicle body in the direction of travel of the traveling vehicle body.

In an aspect of a preferred embodiment of the present invention, the agricultural machine may further include an automatic operation controller to perform a first operation control in which the automatic operation controller controls automatic operation of the traveling vehicle body while causing a working device linked to the traveling vehicle body to do work on a ground, and a second operation control in which the automatic operation controller controls the automatic operation of the traveling vehicle body without causing the working device to do work on the ground. Before the automatic operation controller changes the second operation control to the first operation control or after the automatic operation controller changes the first operation control to the second operation control, when the traveling vehicle body is traveling toward the entrance/exit under the second operation control and a distance from the position of the traveling vehicle body to a start point of the entrance/exit is equal to or less than a predetermined value, the detection adjuster may perform the first adjustment to orient at least some of a plurality of the detection directions toward the end point of the entrance/exit and a portion of land surfaces in the vicinity of the end point by causing a detection range of the detector to move upward or downward. When the traveling vehicle body is traveling on the entrance/exit under the second operation control, the detection adjuster may perform the second adjustment to orient at least some of the plurality of detection directions toward the end point of the entrance/exit and/or a portion of land surfaces in the vicinity of the end point by causing the detection range to move upward or downward.

In an aspect of a preferred embodiment of the present invention, the detection adjuster may perform a third adjustment when the traveling vehicle body is traveling on the entrance/exit under the second operation control and a distance from the position of the traveling vehicle body to the end point of the entrance/exit is equal to or less than a predetermined value, the third adjustment being an adjustment in which the detection adjuster orients at least some of the plurality of detection directions toward a space forward of the end point of the entrance/exit and a land surface that is located forward of the end point by causing the detection range to move upward or downward. The detection adjuster may perform a fourth adjustment when the traveling vehicle body has travelled out of the entrance/exit under the second operation control, the fourth adjustment being an adjustment in which the detection adjuster orients at least some of the plurality of detection directions toward a space forward of the traveling vehicle body in the direction of travel of the traveling vehicle body and a portion of the land surface that is located forward of the traveling vehicle body by causing the detection range to move upward or downward.

In an aspect of a preferred embodiment of the present invention, when the traveling vehicle body is traveling toward somewhere other than the entrance/exit or when the traveling vehicle body is traveling toward the entrance/exit and the distance from the position of the traveling vehicle body to the position of the entrance/exit is greater than the predetermined value, the detection adjuster may orient a plurality of the detection directions toward a space forward of the traveling vehicle body in the direction of travel and a portion of the land surface that is located forward of the traveling vehicle body.

In an aspect of a preferred embodiment of the present invention, the information acquirer may acquire an angle of slope of the entrance/exit. When the angle of slope is equal to or greater than a threshold, the detection adjuster may adjust the detection direction based on the angle of slope.

In an aspect of a preferred embodiment of the present invention, the information acquirer may acquire, before the detection adjuster adjusts the detection direction(s), information relating to the entrance/exit from a memory or a storage which stores information relating to the agricultural field.

An agricultural machine according to an aspect of a preferred embodiment of the present invention includes a traveling vehicle body to travel, a detector to detect objects in a surrounding area of the traveling vehicle body, a detection adjuster to adjust a detection range of the detector, a position sensor to detect a position of the traveling vehicle body, and an information acquirer to acquire information relating to land surfaces including a first land surface and a second land surface on which the traveling vehicle body is to travel, wherein while the traveling vehicle body is traveling, the detection adjuster is operable to detect, based on the information relating to the land surfaces acquired by the information acquirer, a vertical angular difference between (i) the first land surface extending from the traveling vehicle body to a point at a predetermined distance forward from the traveling vehicle body in the direction of travel of the traveling vehicle body and (ii) the second land surface located forward of the point in the direction of travel of the traveling vehicle body, and to perform an adjustment of causing the detection range to move upward or downward based on the angular difference and a change in the position of the traveling vehicle body detected by the position sensor relative to the point.

In an aspect of a preferred embodiment of the present invention, when the second land surface slopes upward relative to the first land surface, the detection adjuster may perform an adjustment of causing the detection range to swing upward based on the angular difference as the position of the traveling vehicle body on the first land surface approaches the point which is a junction between the first land surface and the second land surface. The detection adjuster may perform an adjustment of causing the detection range to swing downward to return to where it was before upward swinging as the position of the traveling vehicle body on the second land surface goes away from the point.

In an aspect of a preferred embodiment of the present invention, when the second land surface slopes downward relative to the first land surface, the detection adjuster may perform an adjustment of causing the detection range to swing downward based on the angular difference as the position of the traveling vehicle body on the first land surface approaches the point which is a junction between the first land surface and the second land surface. The detection adjuster may perform an adjustment of causing the detection range to swing upward to return to where it was before downward swinging as the position of the traveling vehicle body on the second land surface goes away from the point.

In an aspect of a preferred embodiment of the present invention, when the traveling vehicle body is traveling on the first land surface toward the second land surface, the detection adjuster may orient the detection range and at least some of detection directions forming the detection range toward an end point of the second land surface. When the traveling vehicle body is traveling on the second land surface, the detection adjuster may orient the detection range and at least some of the detection directions toward the end point of the second land surface or a space forward of the end point in a direction of travel of the traveling vehicle body.

In an aspect of a preferred embodiment of the present invention, the information acquirer may acquire, before the detection adjuster adjusts the detection range, information relating to the land surface(s) from a memory or a storage which stores information relating to the agricultural field.

In an aspect of a preferred embodiment of the present invention, the detection adjuster may correct the detected result of the detector based on a result of the first or second adjustment to obtain a corrected detected result. The agricultural machine may further include a travel controller to control travel of the traveling vehicle body based on the detected result of the detector and the corrected detected result.

An agricultural machine according to an aspect of a preferred embodiment of the present invention includes a traveling vehicle body to travel, a raising/lowering device to change a heightwise position of a working device linked to the traveling vehicle body, a position sensor to detect a position of the traveling vehicle body, an information acquirer to acquire information relating to an entrance/exit of an agricultural field, and a raising/lowering controller to control operation of the raising/lowering device, wherein the raising/lowering controller is configured or programmed to acquire the position of the traveling vehicle body detected by the position sensor and a position and an angle of slope of the entrance/exit included in the information acquired by the information acquirer, when the traveling vehicle body is traveling toward the entrance/exit, when a distance from the position of the traveling vehicle body to a start point of the entrance/exit is equal to or greater than a first threshold, the raising/lowering controller is configured or programmed to cause the raising/lowering device to set a heightwise position of the working device to a first position, and when the distance from the position of the traveling vehicle body to the start point of the entrance/exit is less than the first threshold, the raising/lowering controller is configured or programmed to cause, based on the angle of slope of the entrance/exit, the raising/lowering device to set the heightwise position of the working device to a second position in which the working device is spaced above the land surface.

In an aspect of a preferred embodiment of the present invention, when the traveling vehicle body is traveling toward the entrance/exit that slopes upward, the raising/lowering controller may cause the second position to be higher than the first position. When the traveling vehicle body is traveling up the entrance/exit that slopes upward, while a distance from the position of the traveling vehicle body to the start point of the entrance/exit is less than the first threshold, the raising/lowering controller may cause the raising/lowering device to maintain the heightwise position of the working device at the second position.

In an aspect of a preferred embodiment of the present invention, when the traveling vehicle body is traveling on the entrance/exit, the raising/lowering controller may cause, based on the angle of slope of the entrance/exit, the raising/lowering device to set the heightwise position of the working device to a third position in which the working device is spaced above the land surface.

In an aspect of a preferred embodiment of the present invention, after the traveling vehicle body has traveled out of the entrance/exit, the raising/lowering controller may cause the raising/lowering device to set the heightwise position of the working device to a fourth position in which the working device is spaced above the land surface.

In an aspect of a preferred embodiment of the present invention, when the traveling vehicle body is traveling down the entrance/exit that slopes downward, when a distance from the position of the traveling vehicle body to the end point of the entrance/exit is equal to or greater than a second threshold, the raising/lowering controller may cause, based on the angle of slope of the entrance/exit, the raising/lowering device to set the heightwise position of the working device to the second position in which the working device is spaced above the land surface. When the distance from the position of the traveling vehicle body to the end point of the entrance/exit is less than the second threshold, the raising/lowering controller may cause, based on the angle of slope of the entrance/exit, the raising/lowering device to set the heightwise position of the working device to a third position which is higher than the second position. After the traveling vehicle body has traveled out of the entrance/exit, while the distance from the position of the traveling vehicle body to the end point of the entrance/exit is less than the second threshold, the raising/lowering controller may cause the raising/lowering device to maintain the heightwise position of the working device at the third position.

In an aspect of a preferred embodiment of the present invention, the agricultural machine may further include an automatic operation controller to perform a first operation control in which the automatic operation controller controls the automatic operation of the traveling vehicle body while causing the working device to do work on a ground, and a second operation control in which the automatic operation controller controls the automatic operation of the traveling vehicle body without causing the working device to do work on the ground. The raising/lowering controller may cause the raising/lowering device to set the heightwise position of the working device based on the angle of slope s of the entrance/exit, an angle of slope of a land surface that is located forward or rearward of the entrance/exit, and/or a change in the position of the traveling vehicle body relative to the entrance/exit when at least one of the traveling vehicle body is traveling under the second operation control toward the entrance/exit, the traveling vehicle body is traveling on the entrance/exit, and the traveling vehicle body is traveling out of the entrance/exit.

In an aspect of a preferred embodiment of the present invention, the raising/lowering controller may cause the raising/lowering device to cause the heightwise position of the working device to move gradually based on the angle of slope of the entrance/exit, the angle of slope of the land surface located forward or rearward of the entrance/exit, and/or a change in the position of the traveling vehicle body relative to the entrance/exit.

In an aspect of a preferred embodiment of the present invention, the information acquirer may acquire, before the raising/lowering device sets the heightwise position of the working device, information relating to the entrance/exit from a memory or a storage which stores information relating to the agricultural field.

An agricultural machine according to an aspect of a preferred embodiment of the present invention includes a traveling vehicle body to travel, a raising/lowering device to change a heightwise position of a working device linked to the traveling vehicle body, a position sensor to measure a position of the traveling vehicle body, an information acquirer to acquire information relating to land surfaces on which the traveling vehicle body is to travel, and a raising/lowering controller to control operation of the raising/lowering device, wherein the raising/lowering controller is configured or programmed to acquire the position of the traveling vehicle body detected by the position sensor and positions and angles of slope of the land surfaces included in the information acquired by the information acquirer, when the traveling vehicle body is traveling from a first land surface included in the land surfaces toward a second land surface included in the land surfaces, when a distance from the position of the traveling vehicle body to a start point of the second land surface is equal to or greater than the first threshold, the raising/lowering controller is configured or programmed to cause the raising/lowering device to set the heightwise position of the working device to the first position, and when the distance from the position of the traveling vehicle body to the start point of the second land surface is less than the first threshold, the raising/lowering controller is configured or programmed to cause, based on the angle of slope of the second land surface, the raising/lowering device to set the heightwise position of the working device to the second position in which the working device is spaced above the first land surface.

In an aspect of a preferred embodiment of the present invention, when the traveling vehicle body is traveling toward the second land surface that slopes upward, the raising/lowering controller may set the second position to be higher than the first position. When the traveling vehicle body is traveling up the second land surface, while a distance from the position of the traveling vehicle body to the start point of the second land surface is less than a first threshold, the raising/lowering controller may cause the raising/lowering device to maintain the heightwise position of the working device at the second position.

In an aspect of a preferred embodiment of the present invention, when the traveling vehicle body is traveling down the second land surface that slopes downward, when a distance from the position of the traveling vehicle body to the end point of the second land surface is equal to or greater than a second threshold, the raising/lowering controller may cause, based on the angle of slope of the second land surface, the raising/lowering device to set the heightwise position of the working device to the second position in which the working device is spaced above the land surface. When the distance from the position of the traveling vehicle body to the end point of the second land surface is less than the second threshold, the raising/lowering controller may cause, based on the angle of slope of the second land surface, the raising/lowering device to set the heightwise position of the working device to a third position which is higher than the second position. After the traveling vehicle body has traveled out of the second land surface, while the distance from the position of the traveling vehicle body to the end point of the second land surface is less than the second threshold, the raising/lowering controller may cause the raising/lowering device to maintain the heightwise position of the working device at the third position.

In an aspect of a preferred embodiment of the present invention, the information acquirer may acquire, before the raising/lowering device sets the heightwise position of the working device, information relating to the land surface(s) from a memory or a storage which stores map information.

In an aspect of a preferred embodiment of the present invention, the information acquirer may acquire information relating to the working device. The raising/lowering controller may set the heightwise position of the working device based on specifications of the working device acquired by the information acquirer.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 is a control block diagram of an agricultural machine.

FIG. 6 shows an example of changes in position of the agricultural machine which is traveling and changes in detection range.

FIG. 7C illustrates another example of the traveling state and the detection range of the agricultural machine.

FIG. 8 shows another example of changes in position of the agricultural machine which is traveling and changes in detection range.

FIG. 12 shows an example of changes in position of the agricultural machine which is traveling and changes in heightwise position of the working device.

FIG. 15 is a side view of an agricultural machine.

DETAILED DESCRIPTION OF THE PREFERRED EMBODIMENTS

Figure 1:
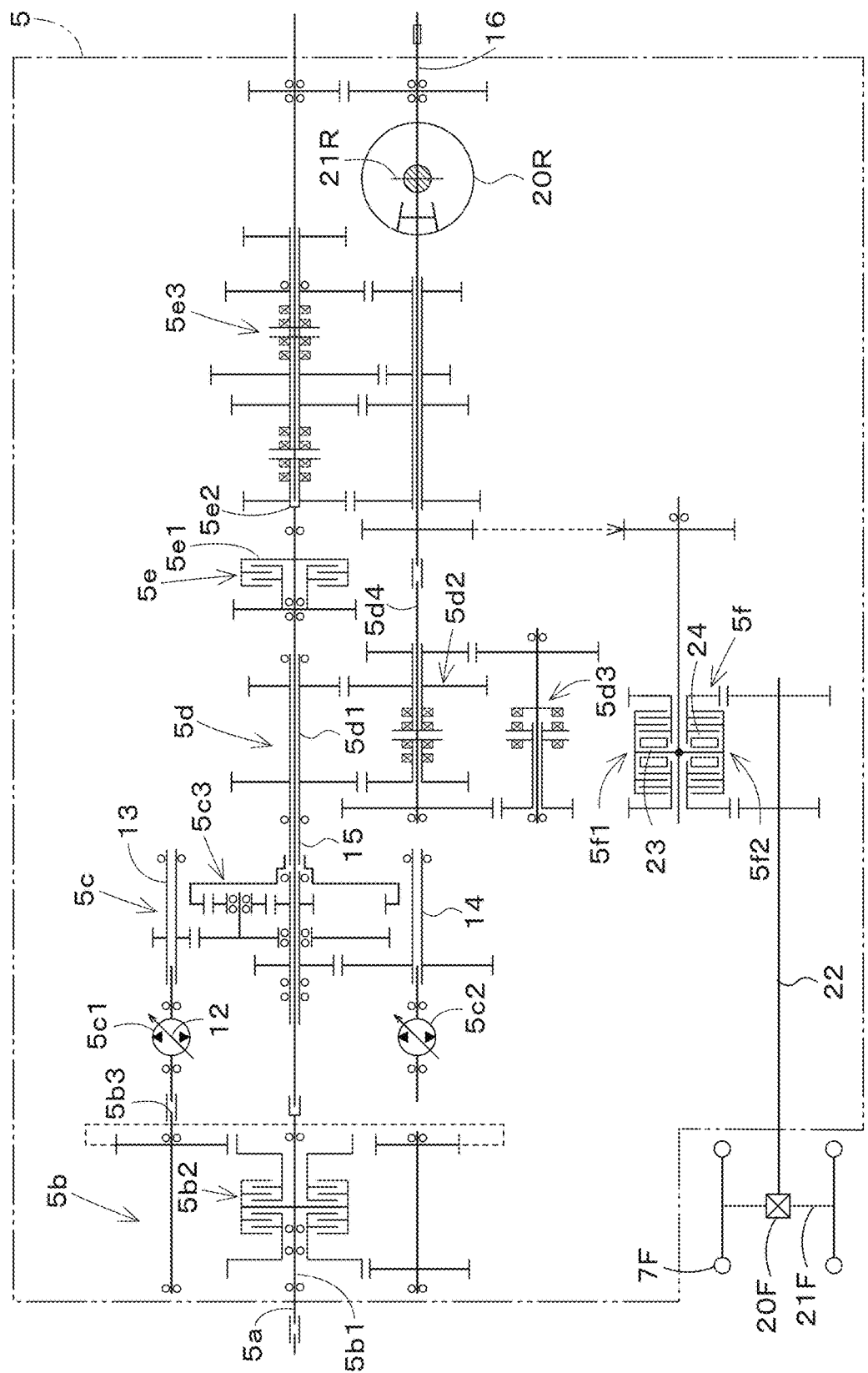
FIG. 1 is a block diagram of a transmission.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings.

FIG. 15 is a side view of an agricultural machine 1 of the present preferred embodiment. The agricultural machine 1 of the present preferred embodiment is a tractor as illustrated in FIG. 15. Alternatively, the agricultural machine may be some other machine for agricultural use, such as a rice transplanter or a combine.

As illustrated in FIG. 15, the agricultural machine 1 includes: a traveling vehicle body 3 with a traveling device 7; a prime mover 4; a transmission 5; and a raising/lowering device 8. The traveling device 7 is a wheeled traveling device including front wheel(s) 7F and rear wheel(s) 7R including tires. For another example, a traveling device including front wheel(s) and rear wheel(s) both or either of which include crawler(s) may be used. The traveling vehicle body 3 is configured to travel forward (leftward in FIG. 15) and rearward (rightward in FIG. 15) by driving of the traveling device 7.

The traveling vehicle body 3 includes the prime mover 4 in a front portion thereof. The prime mover 4 includes, for example, a diesel engine. For another example, the prime mover 4 may include some other internal combustion engine such as a gasoline engine, an electric motor, and/or the like.

The traveling vehicle body 3 is provided with a cabin 9 on an upper portion thereof. The cabin 9 is provided with an operator's seat 10 therein. The traveling vehicle body 3 is provided with the raising/lowering device 8 at the rear thereof. The raising/lowering device 8 can have the working device 2 attached thereto and detached therefrom.

The working device 2 serves to do various types of agricultural work with respect to an agricultural field (ground) and with respect to crops in an agricultural field, and is linked to the traveling vehicle body 3 via the raising/lowering device 8. The working device 2 includes, for example, a cultivator for cultivation, a fertilizer spreader for spreading fertilizer, an agricultural chemical spreader for spreading agricultural chemicals, a harvester for harvesting, a mower for mowing grass or the like, a tedder for tedding grass or the like, a rake for raking grass or the like, a baler for baling grass or the like, and/or the like. Such examples of the working device 2 are broadly divided into wheeled working devices which roll on a land surface and working devices without wheels. A working device 2 without wheels is supported on the traveling vehicle body 3 by the raising/lowering device 8 in a cantilevered manner, for example.

The transmission 5 is configured to change the propelling force of the traveling device 7 by changing speed stages and switch the traveling device 7 between forward and rearward traveling states.

FIG. 1 is a block diagram of the transmission 5. The transmission 5 includes a main shaft (propeller shaft) 5a, a shuttle unit 5b, a main transmission unit 5c, an auxiliary transmission unit 5d, a PTO power transmission unit 5e, and a front transmission unit 5f. The propeller shaft 5a is rotatably supported on a housing of the transmission 5, and power from a crankshaft of the prime mover 4 is transmitted to the propeller shaft 5a.

The shuttle unit 5b includes a shuttle shaft 5b1 and a forward/reverse switching unit 5b2. The shuttle shaft 5b1 receives power transmitted from the propeller shaft 5a. The forward/reverse switching unit 5b2 includes, for example, a hydraulic clutch and/or the like, and changes the direction of rotation of the shuttle shaft 5b1, i.e., switches the traveling state of the agricultural machine 1 between forward and reverse traveling states, by selectively engaging or disengaging the hydraulic clutch.

The main transmission unit 5c is a continuously variable transmission mechanism which steplessly speed-changes power inputted thereto. The continuously variable transmission mechanism includes a hydraulic pump 5c1, a hydraulic motor 5c2, and a planetary gear mechanism 5c3. The hydraulic pump 5c1 is rotated by power from an output shaft 5b3 of the shuttle unit 5b.

The hydraulic pump 5c1 is, for example, a variable displacement pump including a swash plate 12, and the flow rate of hydraulic fluid discharged from the hydraulic pump 5c1 can be changed by changing the angle of the swash plate 12 (swash plate angle) of the hydraulic pump 5c1.

The hydraulic motor 5c2 is a motor which is rotated by hydraulic fluid discharged from the hydraulic pump 5c1 via a fluid passage circuit such as pipe(s). The rotation speed of the hydraulic motor 5c2 can be changed by changing the angle of the swash plate 12 of the hydraulic pump 5c1 and/or power inputted into the hydraulic pump 5c1.

The planetary gear mechanism 5c3 includes a plurality of gears and power transmission shafts such as input and output shafts, and includes an input shaft 13 to receive power from the hydraulic pump 5c1, an input shaft 14 to receive power from the hydraulic motor 5c2, and an output shaft 15 to output power. The planetary gear mechanism 5c3 combines the power from the hydraulic pump 5c1 and the power from the hydraulic motor 5c2 and transmits the combined power to the output shaft 15.

With the main transmission unit 5c as described above, power outputted to the auxiliary transmission unit 5d can be changed by changing the angle of the swash plate 12 of the hydraulic pump 5c1, the rotation speed of the prime mover 4, and/or the like. Note that, although the main transmission unit 5c includes a continuously variable transmission mechanism, the main transmission unit 5c may be a multi-step transmission mechanism which changes speed stages using gears.

The auxiliary transmission unit 5d is a transmission mechanism which includes a plurality of multispeed gears and which speed-changes power. The auxiliary transmission unit 5d speed-changes the power inputted thereto from the output shaft 15 of the planetary gear mechanism 5c3 and outputs the speed-changed power, by appropriately changing the connection (meshing) of the plurality of gears.

The auxiliary transmission unit 5d includes an input shaft 5d1, a first speed change clutch 5d2, a second speed change clutch 5d3, and an output shaft 5d4. The input shaft 5d1 is a shaft to receive power from the output shaft 15 of the planetary gear mechanism 5c3, and inputs the received power into the first speed change clutch 5d2 and the second speed change clutch 5d3 via gear(s) and/or the like. The received power is changed by switching engaged and disengaged states of each of the first and second speed change clutches 5d2 and 5d3, and is outputted to the output shaft 5d4. The power outputted to the output shaft 5d4 is transmitted to a rear wheel differential 20R. The rear wheel differential 20R rotatably supports a rear axle 21R on which the rear wheels 7R are attached.

The PTO power transmission unit 5e includes a PTO clutch 5e1, a PTO propeller shaft 5e2, and a PTO speed change unit 5e3. The PTO clutch 5e1 includes, for example, a hydraulic clutch and/or the like, and switching between the following states is achieved by engaging or disengaging the hydraulic clutch: a state in which power from the propeller shaft 5a is transmitted to the PTO propeller shaft 5e2 (engaged state); and a state in which power from the propeller shaft 5a is not transmitted to the PTO propeller shaft 5e2 (disengaged state). The PTO speed change unit 5e3 includes speed change clutch(es) and a plurality of gears and/or the like, and changes power (rotation speed) inputted from the PTO propeller shaft 5e2 into the PTO speed change unit 5e3 and outputs the changed power. Power from the PTO speed change unit 5e3 is transmitted to a PTO shaft 16 via gear(s) and/or the like.

The front transmission unit 5f includes a first front speed change clutch 5f1 and a second front speed change clutch 5f2. The first front speed change clutch 5f1 and the second front speed change clutch 5f2 are configured to receive power transmitted from the auxiliary transmission unit 5d, and, for example, receive power from the output shaft 5d4 via gear(s) and transmission shaft(s). Power from the first front speed change clutch 5f1 and the second front speed change clutch 5f2 can be transmitted to a front axle 21F via a front transmission shaft 22. Specifically, the front transmission shaft 22 is connected to a front wheel differential 20F, and the front wheel differential 20F rotatably supports the front axle 21F on which the front wheels 7F are attached.

The first front speed change clutch 5f1 and the second front speed change clutch 5f2 each include a hydraulic clutch and/or the like. The first front speed change clutch 5f1 is connected with a fluid passage, and the fluid passage is connected to a control valve 23 to which hydraulic fluid discharged from a hydraulic pump is supplied. The first front speed change clutch 5f1 is selectively brought into an engaged state or a disengaged state depending on the degree of opening of the control valve 23. The second front speed change clutch 5f2 is connected with a fluid passage, and the fluid passage is connected with a control valve 24. The second front speed change clutch 5f2 is selectively brought into an engaged state or a disengaged state depending on the degree of opening of the control valve 24. The control valve 23 and the control valve 24 are each, for example, a two-way switching valve with a solenoid valve, and is selectively brought into a connected state or a disconnected state by energizing or deenergizing the solenoid of the solenoid valve.

When the first front speed change clutch 5f1 is in the disengaged state and the second front speed change clutch 5f2 is in the engaged state, power from the auxiliary transmission unit 5d is transmitted to the front wheels 7F via the second front speed change clutch 5f2. With this, four-wheel drive (4WD) in which the front wheels 7F and the rear wheels 7R are driven by power from the auxiliary transmission unit 5d is achieved and the rotation speed is substantially the same between the front wheels 7F and the rear wheels 7R (4WD constant speed state). On the contrary, when the first front speed change clutch 5f1 is in the engaged state and the second front speed change clutch 5f2 is in the disengaged state, four-wheel drive is achieved and the rotation speed of the front wheels 7F is greater than the rotation speed of the rear wheels 7R (4WD speedup state). Furthermore, when the first front speed change clutch 5f1 and the second front speed change clutch 5f2 are in the disengaged state, power from the auxiliary transmission unit 5d is not transmitted to the front wheels 7F, and therefore two-wheel drive (2WD) in which only the rear wheels 7R are driven by power from the auxiliary transmission unit 5d results. Note that the transmission 5 need only be capable of, for example, switching the traveling state of the traveling device 7 between forward and rearward traveling states, and the configuration thereof is not limited to that described above.

Figure 2:
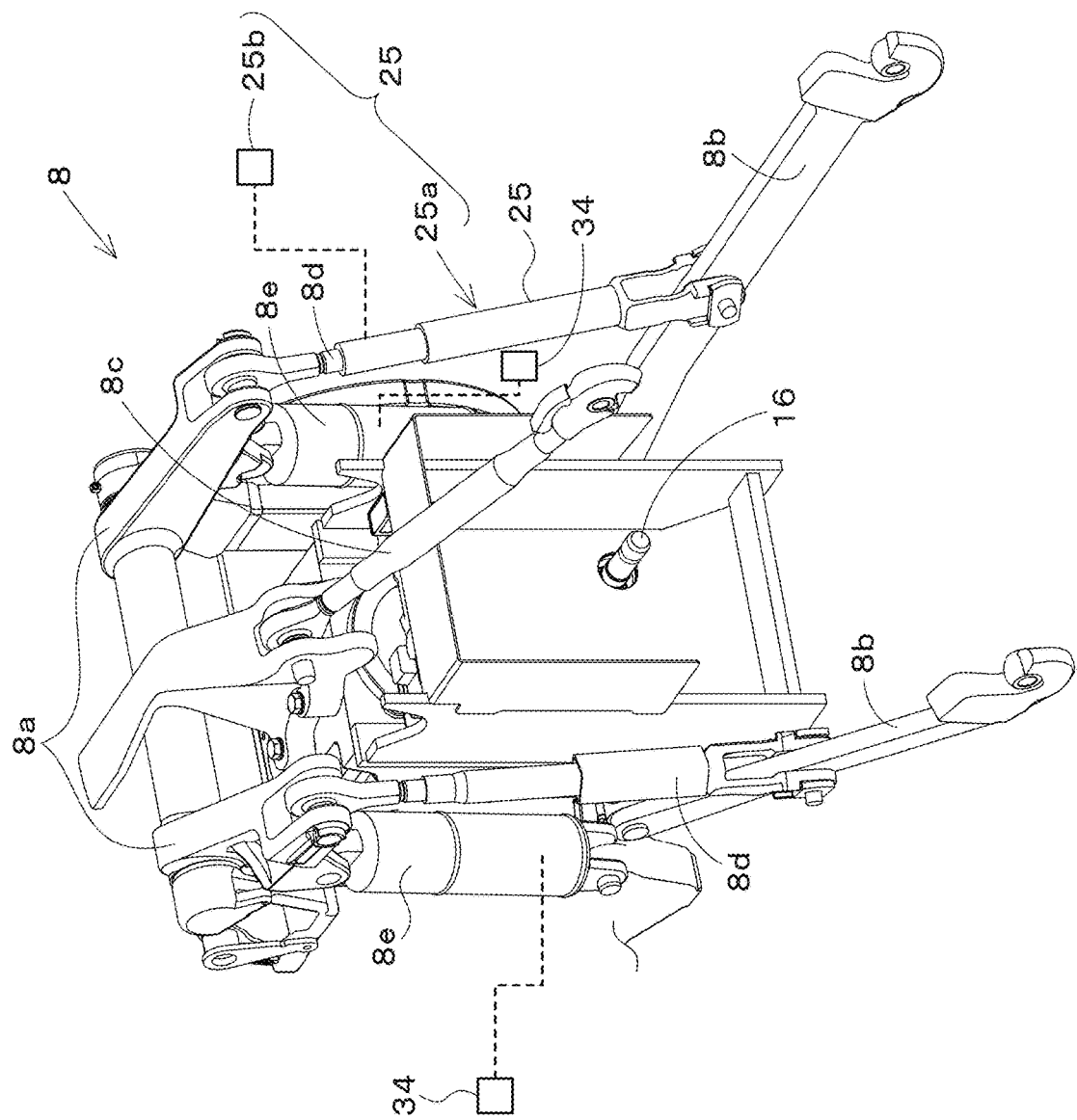
FIG. 2 is a perspective view of a raising/lowering device.

FIG. 2 is a rear perspective view of the raising/lowering device 8. The raising/lowering device 8 includes lift arms 8a, lower links 8b, a top link 8c, lift rods 8d, and lift cylinders 8e.

A front end of each lift arm 8a is supported on an upper rear portion of a case (transmission case) housing the transmission 5 such that the lift arm 8a is swingable up and down. The lift arm 8a is driven by a corresponding lift cylinder 8e to swing (raised or lowered). The lift cylinder 8e is a hydraulic cylinder. The lift cylinder 8e is connected to a hydraulic pump via a control valve 34. The control valve 34 is a solenoid valve or the like to cause the lift cylinder 8e to extend and retract.

A front end of each lower link 8b is supported on a lower rear portion of the transmission 5 such that the lower link 8b is swingable up and down. A front end of the top link 8c is supported, at a position higher than the lower link 8b, on a rear portion of the transmission 5 such that the top link 8c is swingable up and down. Each lift rod 8d connects a corresponding lift arm 8a and a corresponding lower link 8b. The working device 2 is linked to rear portions of the lower links 8b and the top link 8c.

When the lift cylinders 8e are driven (extend or retract), the lift arms 8a ascend or descend, and the lower links 8b connected to the lift arms 8a via the lift rods 8d also ascend or descend. With this, the working device 2 swings up or down (raised or lowered) about front portions of the lower links 8b.

The raising/lowering device 8 is provided with an angle changing unit 25. The angle changing unit 25 changes the posture of the working device 2 attached to the traveling vehicle body 3. The angle changing unit 25 includes: a changing cylinder 25a including a hydraulic cylinder; and a control valve 25b. The changing cylinder 25a is connected to a hydraulic pump via the control valve 25b. The control valve 25b is a solenoid valve or the like, and causes the changing cylinder 25a to extend and retract. The changing cylinder 25a connects a corresponding lift arm 8a and a corresponding lower link 8b.

FIG. 3 shows a control block diagram of the agricultural machine 1. The agricultural machine 1 includes a plurality of auxiliary valves 27. The plurality of auxiliary valves 27 are hydraulic switching valves to which hydraulic fluid is supplied from a hydraulic pump 28. The plurality of auxiliary valves 27 include output ports, and hydraulic hose(s) and/or the like can be connected to any of the output ports. It is possible to actuate various types of hydraulic attachment attached to the working device 2 by connecting the hydraulic hose(s) connected to any of the output ports of the auxiliary valves 27 to the hydraulic attachment that is attached to the working device 2.

The agricultural machine 1 includes a steering unit 11. The steering unit 11 includes a steering wheel 11a, a rotation shaft (steering shaft) 11b which rotates as the steering wheel 11a rotates, and an assist mechanism (power steering mechanism) 11c to assist the steering wheel 11a in steering.

The assist mechanism 11c includes a control valve 35 and a steering cylinder 32. The control valve 35 is, for example, a three-way switching valve which achieves multi-position switching by movement of a spool or the like. The switching of the control valve 35 may also be achieved by operating the rotation shaft 11b. The steering cylinder 32 is connected to arms (knuckle arms) 36 for changing the orientation of the front wheels 7F. Therefore, upon rotation operation of the steering wheel 11a, the position and the degree of opening of the control valve 35 change according to the operation, and the steering cylinder 32 extends or retracts leftward or rightward according to the position and the degree of opening of the control valve 35, making it possible to change the steering direction of the front wheels 7F. Note that the foregoing steering unit 11 is an example, and the foregoing configuration does not imply limitation.

The agricultural machine 1 includes a detection device 41. The detection device 41 includes a plurality of sensors to detect states of the agricultural machine 1. The detection device 41 includes a water temperature sensor 41a to detect water temperature, a fuel sensor 41b to detect the remaining amount of fuel, a prime mover rotation sensor (rotation sensor) 41c to detect the rotation speed of the prime mover 4, an accelerator pedal sensor 41d to detect the operation amount of an accelerator pedal, an angle-of-steering sensor 41e to detect the angle of steering by the steering unit 11 (i.e., a rotational angle of the steering wheel 11a), an angle sensor 41f to detect the angle of the lift arms 8a, an inclination detecting sensor 41g to detect the widthwise inclination (rightward inclination or leftward inclination) of the traveling vehicle body 3, a speed sensor 41h to detect vehicle speed (speed) of the traveling vehicle body 3, a PTO rotation sensor (rotation sensor) 41i to detect the rotation speed of the PTO shaft, a battery sensor 41j to detect the voltage of a storage battery such as a battery, a positioning device 41k to detect the position of the traveling vehicle body 3, and a detector 41L to detect objects in a surrounding area of the agricultural machine. The sensors and devices included in the detection device 41 are not limited to those listed above.

The positioning device 41k is configured to detect the position thereof (measured position information including latitude and longitude) using a satellite positioning system (positioning satellites) such as D-GPS, GPS, GLONASS, BeiDou, Galileo, and/or Michibiki. Specifically, the positioning device 41k receives satellite signals (positions of positioning satellites, time of transmission, correction information, and/or the like) from the positioning satellites, and detects the position (e.g., latitude and longitude) of the agricultural machine 1 based on the satellite signals, i.e., the position of the traveling vehicle body 3.

Note that the positioning device 41k may include inertial measurement unit(s) such as an acceleration sensor to detect acceleration and/or a gyroscope sensor to detect angular velocity. The inertial measurement unit is configured to detect the roll angle, the pitch angle, the yaw angle, and/or the like of the traveling vehicle body 3 using the acceleration sensor and/or the gyroscope sensor and correct the position of the traveling vehicle body 3 using the roll angle, the pitch angle, and/or the yaw angle. Note that the inertial measurement unit may be provided on the agricultural machine 1 independently of the positioning device 41k.

The detector 41L includes an optical or sonic sensor, a signal processing circuit, and/or the like. The optical sensor of the detector 41L includes, for example, an imaging device such as a camera, a Light Detection And Ranging (LiDAR), and/or the like. The imaging device includes a Charge Coupled Devices (CCD) camera including a CCD image sensor, a Complementary Metal Oxide Semiconductor (CMOS) camera including a CMOS image sensor, and/or the like. The imaging device captures an image of a surrounding area of the agricultural machine 1 and generates an image signal. The signal processing circuit detects whether or not there is an object, the position of the object, the type of the object, and/or the like based on the image signal outputted from the imaging device.

A LiDAR (laser sensor) emits pulsed measurement light (laser light) several millions of times per second from a light source such as a laser diode, and the measurement light is reflected by a rotating mirror to be scanned horizontally or vertically, to be thereby projected on a predetermined detection range. Then, the LiDAR receives, using photodetector(s), reflected light which is part of the measurement light that has been reflected at the object. The signal processing circuit detects whether or not there is an object, the position of the object, the type of the object, and/or the like based on a signal indicative of light reception outputted from the photodetector(s) of the LiDAR. Furthermore, the signal processing circuit detects the distance to the object based on the time from the emission of the measurement light by the LiDAR to the reception of the reflected light by the LiDAR (time of flight (TOF) method).

The sonic sensor of the detector 41L includes an airborne ultrasonic sensor such as sonar. The airborne ultrasonic sensor emits measurement waves (ultrasonic waves) to a predetermined detection range using a wave transmitter, and receives, using a wave receiver, reflected waves which are included in the measurement waves that have been reflected at a target. The signal processing circuit detects whether or not there is an object, the position of the object, the type of the object, and/or the like based on a signal outputted from the echo sounder receiver. Furthermore, the signal processing circuit detects the distance to the object based on the time from the emission of the measurement waves by the airborne ultrasonic sensor to the reception of the reflected waves (time of flight (TOF) method).

In the present preferred embodiment, the detector 41L may include all of an imaging device, a LiDAR (laser sensor), and an airborne ultrasonic sensor. Alternatively, the detector 41L may include at least one of them. The detector 41L may include a detector such as a sensor other than those listed above. The agricultural machine 1 may be provided with a detector 41L that includes the combination of an imaging device, a LiDAR (laser sensor), an airborne ultrasonic sensor, and some other detector. The constituents of the detector 41L are not limited to those described above.

A plurality of such detectors 41L are attached to the agricultural machine 1 so as to detect objects in a surrounding area including an area in front of the agricultural machine 1 (traveling vehicle body 3), areas leftward and rightward of the agricultural machine 1 (traveling vehicle body 3), and an area rearward of the agricultural machine 1 (traveling vehicle body 3). Therefore, detection directions (a detection direction is a direction in which a detector is oriented to detect objects) of the detectors 41L are forward, leftward, rightward, and rearward directions from the agricultural machine 1, and detection ranges (a detection range is a range monitored by a detector to detect objects) extend to a predetermined extent in front of, at the left and right sides of, and behind the agricultural machine 1. Note that the detection directions and detection ranges of the detectors 41L are not limited to front, left side, right side and behind the agricultural machine 1. Examples of objects detectable by the detectors 41L include agricultural fields, crops in agricultural fields, entrance/exits of agricultural fields, ground, land surfaces, other objects, obstacles, and humans.

The detection directions and the detection ranges of the detectors 41L are swingable up and down (along an up-and-down direction of the traveling vehicle body 3). Specifically, by pivoting a holder such as a bracket or a stay holding a detector 41L using an actuator such as an electric motor or a hydraulic cylinder, the detector 41L and the detection directions and the detection range thereof are caused to swing up and down.

In the case of a LiDAR or the like, the detection directions (directions in which light is projected) and the detection range may be caused to swing up and down in the following manner: a plurality of light sources are arranged along a vertical direction such that beams of measurement light emitted from the light sources are projected onto different positions along the up-and-down direction, and the light sources are selectively caused to emit light. Alternatively, the detection directions and the detection range may be caused to swing up and down by changing the angle of the rotating mirror of the LiDAR. In the case of an airborne ultrasonic sensor, the detection directions (directions in which waves are transmitted) and the detection range may be caused to swing up and down by changing the orientation of the wave transmitter. In the case of an imaging device, the detection directions and the detection range may be caused to swing up and down by changing the range of a captured image that is subjected to image processing.

The agricultural machine 1 includes an operator device 42. The operator device 42 includes a plurality of operation members. The operation members include a shuttle lever 42a for switching between forward and reverse of the traveling vehicle body 3, an ignition switch 42b for, for example, activating the prime mover 4, a PTO speed change lever 42c for setting the rotation speed of the PTO shaft, a transmission changeover switch 42d for switching between automatic transmission and manual transmission, a transmission shift lever 42e for manual operation to change speed stages (speed levels) of the transmission 5, an accelerator 42f for increasing and reducing vehicle speed, a raising/lowering switch 42g for controlling raising and lowering of a linkage (raising/lowering device) 8, a height setting dial 42h for setting the upper limit of the linking device (raising/lowering device) 8, a vehicle speed lever 42i for setting vehicle speed, a hydraulic operation actuator 42j, a rotation setter 42k for setting the upper limit of the rotation speed of the prime mover 4, a brake member 42L, other switch(es) 42m, and/or the like.

Setters such as the transmission changeover switch 42d, the height setting dial 42h, and the rotation setter 42k are provided in a console box disposed on one side of the operator's seat 10. Settings on actions of the agricultural machine 1 can be made by an operator seated on the operator's seat 10 operating such setters (the transmission changeover switch 42d, the height setting dial 42h, and the rotation setter 42k). Note that the operation members described above are examples, and the operation members included in the operator device 42 are not limited to those described above.

The agricultural machine 1 includes a display 50. The display 50 displays various information about the agricultural machine 1. The display 50 includes, for example, a liquid crystal panel and/or an organic EL panel. Screens on the display 50 can be changed and operated by manipulating hardware switch(es) provided on the operator's seat 10 and/or the display 50. Alternatively or additionally, the screens on the display 50 can be changed and operated by manipulating software switch(es) displayed on a screen.

The agricultural machine 1 includes a control device 40 and a memory or a storage 45 (hereinafter may be referred to as a memory 45). The control device 40 performs various types of control regarding the agricultural machine 1, and includes a CPU, electric/electronic circuit(s), and/or the like. The memory 45 includes nonvolatile memory(memories) and/or the like, and stores various information.

The control device 40 includes a speed change controller 40A, an engine controller 40B, a PTO controller 40C, a raising/lowering controller 40D, an automatic operation controller 40E, an angle controller 40F, an auxiliary hydraulic controller 40G, a detection adjuster 40H, and an information acquirer 40I.

The control device 40 is connected to a controller 2a of the working device 2 via an in-vehicle network N1. That is, the units 40A to 40H included in the control device 40 and the controller 2a of the working device 2 are connected via the in-vehicle network N1 and communicable with each other.

The speed change controller 40A performs speed change control. In the speed change control, when an automatic speed change function is active, the speed change controller 40A automatically switches between the main transmission unit 5c and the auxiliary transmission unit 5d and automatically changes the speed stage (speed level) of the transmission 5 to a predetermined speed stage (speed level), according to the state of the agricultural machine 1. Furthermore, in the speed change control, when the transmission changeover switch 42d is operated to select manual transmission, the seed change controller 40A automatically switches between the main transmission unit 5c and the auxiliary transmission unit 5d and changes the speed stage of the transmission 5 according to the speed stage (speed level) set using the transmission shift lever 42e.

The speed change controller 40A also performs travel switching control in which the speed change controller 40A switches the traveling device 7 between forward travel and rearward travel. In the travel switching control, for example, when the shuttle lever 42a is operated to select forward travel, the speed change controller 40A switches the forward/reverse switching unit 5b2 of the shuttle unit 5b to a forward travel state to cause the traveling vehicle body 3 to travel forward. In the travel switching control, when the shuttle lever 42a is operated to select rearward travel, the speed change controller 40A switches the forward/reverse switching unit 5b2 of the shuttle unit 5b to a rearward travel state to cause the traveling vehicle body 3 to travel rearward.

Furthermore, in the travel switching control, in the case of the 4WD state, the speed change controller 40A places the first front speed change clutch 5f1 in the disengaged state and places the second front speed change clutch 5f2 in the engaged state. In the case of the 4WD speedup state, the speed change controller 40A places the first front speed change clutch 5f1 in the engaged state and places the second front speed change clutch 5f2 in the disengaged state. In the case of the 2WD state, the speed change controller 40A places the first front speed change clutch 5f1 and the second front speed change clutch 5f2 in the disengaged state.

The engine controller 40B controls the prime mover 4. In engine control, when the ignition switch 42b is turned ON, the engine controller 40B activates the prime mover 4 through predetermined processing, and, when the ignition switch 42b is turned OFF, the engine controller 40B stops the driving of the prime mover 4. In the engine control, when the accelerator 42f is operated, the engine controller 40B changes the rotation speed of the prime mover 4 (hereinafter referred to as "prime mover rotation speed") according to the operation amount of the accelerator 42f to change the vehicle speed (speed) of the traveling vehicle body 3.

The PTO controller 40C performs PTO control. In the PTO control, when the PTO speed change lever 42c is operated, the PTO controller 40C changes PTO speed change gears included in the transmission 5 to change the rotation speed of the PTO shaft (hereinafter referred to as "PTO rotation speed").

The raising/lowering controller 40D controls raising/lowering of the working device 2. In the raising/lowering control, when a manual raising/lowering function is active, when the raising/lowering switch 42g is manually operated in the direction of raising (in the raising direction), the raising/lowering controller 40D controls the control valves 34 (FIG. 2) to cause the lift cylinders 8e to extend to thereby raise rear portions (portions closer to the working device 2) of the lift arms 8a. When the raising/lowering switch 42g is manually operated in the direction of lowering (in the lowering direction), the raising/lowering controller 40D controls the control valves 34 to cause the lift cylinders 8e to retract to thereby lower the rear portions (portions closer to the working device 2) of the lift arms 8a. When the position of the working device 2 (i.e., the angle of the lift arms 8a) reaches the upper limit (upper limit of height) set by the height setting dial 42h while the working device 2 is being raised by the raising/lowering device 8, the raising/lowering controller 40D causes the raising/lowering device 8 to stop the action of raising the working device 2.

Furthermore, in the raising/lowering control, when a rear-up function is active, upon rearward travel of the traveling vehicle body 3, the raising/lowering controller 40D automatically controls the control valves 34 to cause the lift cylinders 8e to extend, to thereby raise the rear portions (portions closer to the working device 2) of the lift arms 8a. Furthermore, in the raising/lowering control, when an auto-up function is active, if the angle of steering by the steering unit 11 is equal to or greater than a predetermined angle, the raising/lowering controller 40D automatically controls the control valves 34 to cause the lift cylinders 8e to extend, to thereby raise the rear portions (portions closer to the working device 2) of the lift arms 8a.

The automatic operation controller 40E controls the automatic operation of the agricultural machine 1. The automatic operation controller 40E is configured or programmed to perform line-based automatic operation control and autonomous automatic operation control. In the line-based automatic operation control, the automatic operation controller 40E controls the actions of the steering unit 11, the transmission 5, the prime mover 4, and/or the like so that the agricultural machine 1 (traveling vehicle body 3) moves along a predetermined planned travel line.

In the autonomous automatic operation control, based on the result of monitoring of a surrounding area of the agricultural machine 1 (traveling vehicle body 3) (the result of detection of object(s) in a surrounding area of the agricultural machine 1 (traveling vehicle body 3)) using the detector(s) 41L and/or the like, the automatic operation controller 40E sets the direction of travel (steering direction), vehicle speed (speed), and/or the like of the traveling vehicle body 3 and controls the actions of the steering unit 11, the transmission 5, the prime mover 4, and/or the like so that the set steering direction and vehicle speed are achieved. Note that a configuration in which the line-based automatic operation control and the autonomous automatic operation control are switchable using a switch or the like may be used. The automatic operation controller 40E may be configured to perform either the line-based automatic operation control or the autonomous automatic operation control. The configuration of the automatic operation controller 40E is not limited to those described above.

The automatic operation controller 40E is configured to perform a first operation control in which the automatic operation controller 40E controls the automatic operation of the traveling vehicle body 3 while causing the working device 2 to do work on the ground and a second operation control in which the automatic operation controller 40E controls the automatic operation of the traveling vehicle body 3 without causing the working device 2 to do work on the ground.

The angle controller 40F is configured or programmed to perform a positioning function, a leveling function, and/or a tilting function to control the angle of the working device 2. The angle controller 40F performs the positioning function (fixing function) by which the angle controller 40F outputs a control signal to the control valve 25b to fix the length of the changing cylinder 25a to a predetermined length. That is, the angle controller 40F fixes the angle in a width direction of the working device 2 to the horizontal plane set by the angle changing unit 25 (angle of a straight line connecting rear ends of the lower links 8*b* to each other with respect to the horizontal plane).

The angle controller 40F performs the leveling function by which the angle controller 40F outputs a control signal to the control valve 25*b* to cause the changing cylinder 25*a* to extend or retract, to thereby keep the angle in the width direction of the working device 2 set by the angle changing unit 25 so that the straight line connecting the rear ends of the lower links 8*b* is parallel to the horizontal plane. The angle controller 40F performs the tilting function by which the angle controller 40F outputs a control signal to the control valve 25*b* to cause the changing cylinder 25*a* to extend or retract, to thereby keep the angle in the width direction of the working device 2 set by the angle changing unit 25 so that the straight line connecting the rear ends of the lower links 8*b* is parallel to the agricultural field (ground).

The auxiliary hydraulic controller 40G controls one or more of the plurality of auxiliary valves 27 that are connected with hydraulic hose(s) and/or the like (such one or more of the plurality of auxiliary valves are "active control valves"). For example, when the hydraulic operation actuator 42*j* such as a swingable lever is operated, the auxiliary hydraulic controller 40G performs control to change the flow of hydraulic fluid outputted from a corresponding one or more of the auxiliary valves 27.

When the hydraulic operation actuator 42*j* is operated leftward, the auxiliary hydraulic controller 40G energizes solenoid(s) of corresponding one or more of the auxiliary valves 27 to move spool(s) of the one or more auxiliary valves 27, to thereby set the direction of flow of hydraulic fluid so that the hydraulic fluid flows in one direction. When the hydraulic operation actuator 42*j* is operated rightward, the auxiliary hydraulic controller 40G energizes solenoid(s) of corresponding one or more of the auxiliary valves 27 to move spool(s) of the one or more auxiliary valves 27, to thereby set the direction of flow of hydraulic fluid so that the hydraulic fluid flows in the opposite direction. Such control of the operation of the auxiliary valves 27 by the auxiliary hydraulic controller 40G enables operation of hydraulic attachment(s) of the working device 2.

The detection adjuster 40H controls driving of the detectors 41L. The detection adjuster 40H controls operation of one or more of actuators 43 that are for the detectors 41L to adjust detection directions and detection ranges of the detectors 41L by swinging the detection directions and the detection ranges up or down. The detection adjuster 40H corrects the detected results (results of object detection) by the detectors 41L based on the results of adjustment of the detection directions and detection ranges of the detectors 41L (whether they have been swung up or down, the angle of swinging, and/or the like).

The actuators 43 include the foregoing hydraulic cylinders, electric motors, control valves, solenoid valves, and the like. The operation of such actuators 43 is controlled by corresponding controllers 40D to 40I and the adjusting unit 40H.

The agricultural machine 1 includes a brake 44. The brake 44 serves to reduce the speed of the traveling vehicle body 3 and stop the traveling vehicle body 3 by putting the brakes on the wheels 7F and/or 7R of the traveling device 7. The automatic operation controller 40E controls the traveling state (vehicle speed) of the traveling vehicle body 3 by actuating the brake 44 automatically or in response to the operation of the brake member 42L and/or by adjusting the rotation speed of the prime mover 4 via the engine controller 40B.

The automatic operation controller 40E controls the traveling state (vehicle speed and/or the like) of the traveling vehicle body 3 based on the detected results of the detectors 41L and corrected detected results (the detected results corrected by the detection adjuster 40H), during automatic operation or manual operation of the traveling vehicle body 3. That is, the automatic operation controller 40E is a travel controller to control the traveling state of the traveling vehicle body 3.

The agricultural machine 1 includes a communication device 55. The communication device 55 includes a communication circuit for communication via the in-vehicle network N1 and a wireless communication circuit for wireless communication. The wireless communication circuit performs wireless communication directly or indirectly with an external apparatus 56 through, for example, wireless fidelity (Wi-Fi) (registered trademark) under the IEEE802.11 series of communication standards, Bluetooth (registered trademark) Low Energy (BLE), low-power, wide-area (LPWA), low-power wide-area network (LP-WAN), and/or the like. For another example, the communication device 55 may include a communication circuit communicable with the external apparatus 56 in a wireless manner via, for example, a mobile communication network, a data communication network, and/or the like.

The external apparatus 56 is, for example, a personal computer, a smartphone, a tablet computer, a PDA, a server, and/or the like. The external apparatus 56 includes a display unit 57, a controller 77, and a communication unit 78. The controller 77 controls the operation of the display unit 57 and the communication unit 78. The communication unit 78 performs wireless communication with the communication device 55 of the agricultural machine 1. The display unit 57 is configured to display various information about the agricultural machine 1 sent from the communication device 55.

The information acquirer 40I of the control device 40 of the agricultural machine 1 is configured to acquire agricultural field information. The agricultural field information includes information about agricultural field(s) in which the agricultural machine 1 is to do agricultural work, entrance/exit(s) of the agricultural field(s), agricultural road(s) in the vicinity of the agricultural field(s), land surface(s) thereof, and/or the like. For example, the agricultural field information may be included in map information including the agricultural field(s), and the map information and the agricultural field information may be pre-stored in an external storing unit such as a storage of the external apparatus 56, a server, or a cloud or in the memory 45 of the agricultural machine 1.

The map information and the agricultural field information may be prepared using an application program on the external apparatus 56, a server, or a cloud based on pass(es) previously traveled by the agricultural machine 1 or another vehicle during its travel on the agricultural field and the vicinity of the agricultural field, detected results of detector(s) provided on the agricultural machine 1 or the other vehicle, and/or image data obtained by capturing an airborne image by a drone flying around the agricultural field.

The information acquirer 40I is configured to acquire information relating to the working device 2 linked to the traveling vehicle body 3 via the raising/lowering device 8. The information relating to the working device 2 includes specifications such as the type, shape, weight, performance, function, identification information, and/or the like of the working device 2. The information relating to the working device 2 is, for example, pre-stored in a memory (not illustrated) provided in the working device 2, pre-inputted using the operator device 42 and stored in the memory 45, and/or pre-inputted on an application program on the external apparatus 56, a server, or a cloud and stored in a storage of the external apparatus 56, the server, or the cloud.

For example, the information acquirer 40I reads (acquires) the agricultural field information and the information relating to the working device 2 from the memory 45, and/or accesses the storage in the working device 2, the external apparatus 56, the server, or the cloud via the communication device 55 to receive (acquire) the agricultural field information and the information relating to the working device 2 from the memory 45 and/or the storage.

The information acquirer 40I acquires the agricultural field information at a point in time before the detection adjuster 40H adjusts detection ranges and detection directions, before the raising/lowering controller 40D causes the raising/lowering device 8 to set the heightwise position of the working device 2, and before the agricultural machine 1 causes the working device 2 to do work on the ground in the agricultural field. The information acquirer 40I acquires the information relating to the working device 2 when, for example, the working device 2 is connected to the control device 40 via the in-vehicle network N1.

Figure 4A:
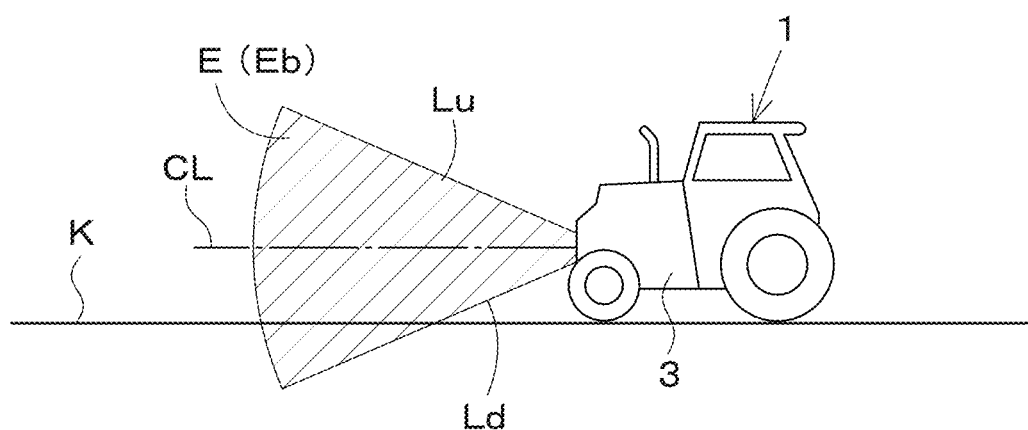
FIG. 4A illustrates an example of a detection range of a detector.
Figure 4B:
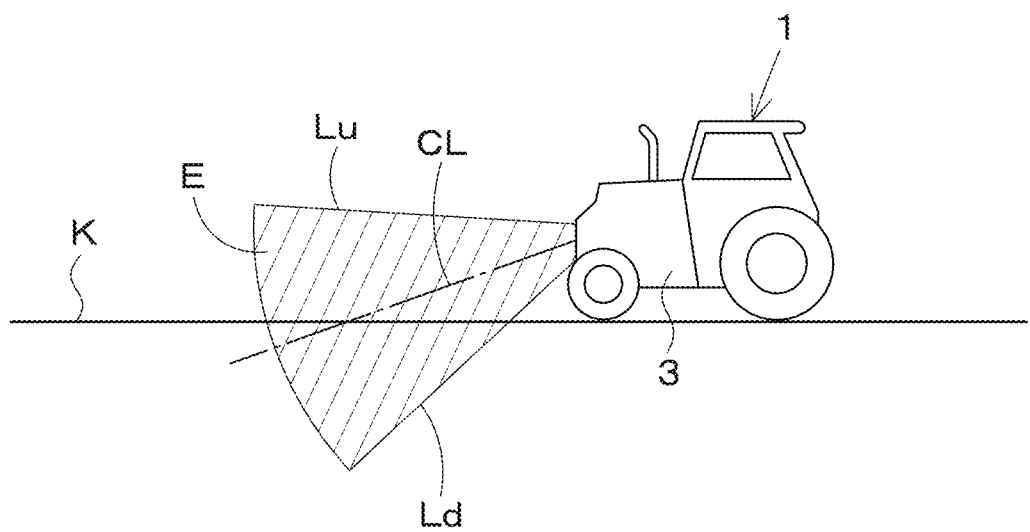
FIG. 4B illustrates another example of the detection range of the detector.
Figure 4C:
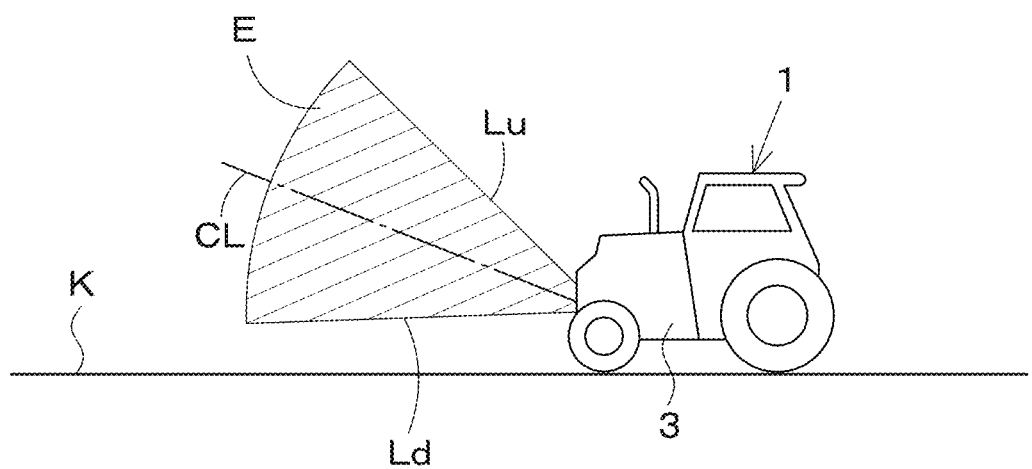
FIG. 4C illustrates a further example of the detection range of the detector.

FIGS. 4A to 4C each illustrate an example of a detection range E of a forward detector 41L to detect objects in an area forward (left in FIGS. 4A to 4C) of the traveling vehicle body 3 of the agricultural machine 1.

As illustrated in FIGS. 4A to 4C, the detection range E of the forward detector 41L fans out forward from the front portion of the traveling vehicle body 3. Detection directions of the forward detector 41L are directions from the front portion of the traveling vehicle body 3 to the front edge of the detection range E (details are not illustrated).

A detection range Eb illustrated in FIG. 4A is a reference detection range of the forward detector 41L. A central axis CL of the reference detection range E1b is set such that the central axis CL is parallel to a land surface K and the direction of forward travel (direction of travel) of the traveling vehicle body 3 (agricultural machine 1) and extends straight forward from the front portion of the traveling vehicle body 3. Therefore, the reference detection range Eb is set such that the detection range Eb is defined by lines Lu and Ld each of which is inclined about the front portion of the traveling vehicle body 3 upward or downward from the central axis CL by a predetermined angle. The reference detection range Eb includes a portion of the land surface K that is located forward of the traveling vehicle body 3.

The front edge of the detection range E, i.e., the maximum detectable distance of the detector 41L, can be adjusted by, for example, adjusting the resolution of an imaging device of the detector 41L, the light emitting power of light source(s) of a LiDAR of the detector 41L, or the power of the wave transmitter of an airborne ultrasonic sensor of the detector 41L. The maximum detectable distance is adjusted by the detection adjuster 40H.

As described earlier, the detection adjuster 40H is configured to adjust the detection directions and the detection range E of the detector 41L upward and downward. FIG. 4B illustrates a detection range E obtained by swinging down the reference detection range Eb in FIG. 4A. FIG. 4C illustrates a detection range E obtained by swinging up the reference detection range Eb in FIG. 4A As such, when the detection range E of the detector 41L is swung up or down, the detection directions of the detector 41L also swing up or down.

The detection ranges E and Eb are not limited to the size, outline, directions, and the like as illustrated in FIGS. 4A to 4C. For example, the reference detection range Eb may be set such that the detection range Eb is oriented diagonally downward or diagonally upward, by setting the central axis CL of the reference detection range Eb such that the central axis CL is inclined at a predetermined angle to the land surface K or to the direction of travel of the traveling vehicle body 3.

Figure 9A:
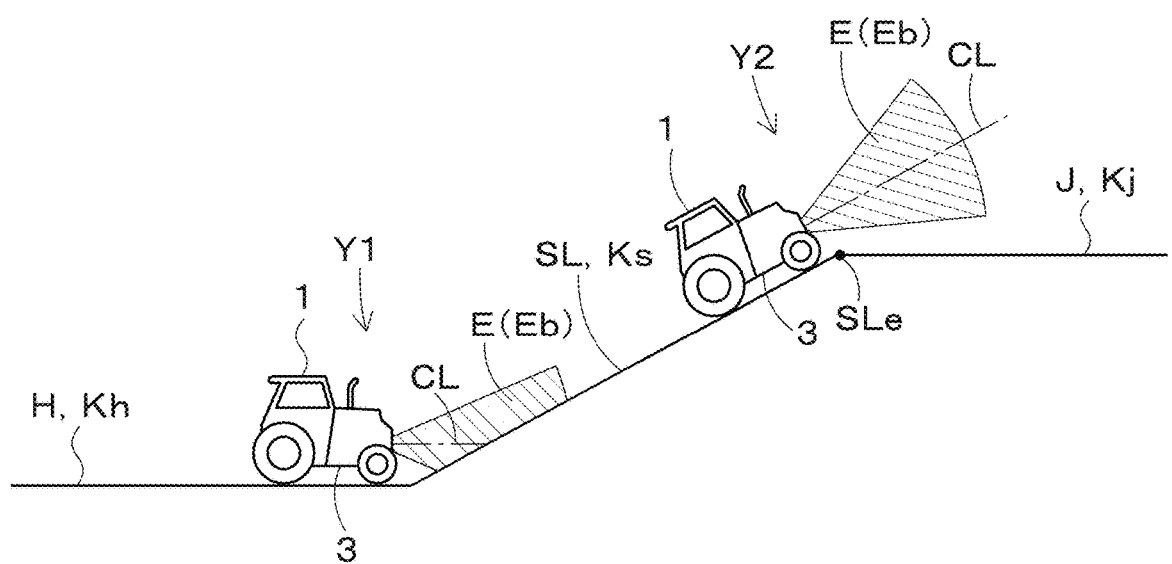
FIG. 9A illustrates an example of a problem to be solved by a preferred embodiment of the present invention.
Figure 9B:
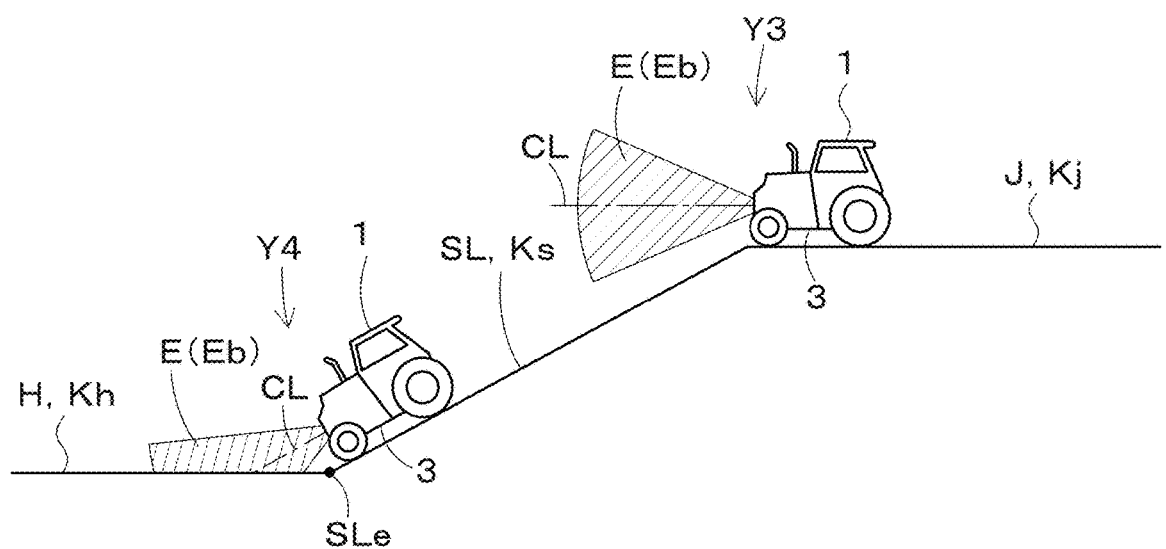
FIG. 9B illustrates an example of a problem to be solved by a preferred embodiment of the present invention.

FIGS. 9A and 9B illustrate an example of a problem to be solved by the present preferred embodiment. There may be cases in which an agricultural field H where the agricultural machine 1 does agricultural work has an entrance/exit SL for entrance and exit of the agricultural machine 1. The entrance/exit SL slopes at a predetermined angle, for example, due to the height difference between the agricultural field H and the surrounding pass or agricultural road J and/or the like or in order to achieve a large area in which crops are planted in the agricultural field H.

For convenience of description, when the agricultural machine 1 is moving from the agricultural field H toward the entrance/exit SL, i.e., when the agricultural machine 1 is traveling to go up the entrance/exit SL (traveling up a slope), one of the opposite ends of the entrance/exit SL that is closer to the agricultural field H (the boundary between the entrance/exit SL and the agricultural field H) is hereinafter referred to as a "start point SLs of the entrance/exit SL", whereas the other of the opposite ends of the entrance/exit SL that is closer to the agricultural road J (the boundary between the entrance/exit SL and the agricultural road J) is referred to as an "end point SLe of the entrance/exit SL". On the contrary, when the agricultural machine 1 is moving from the agricultural road J toward the entrance/exit SL, i.e., when the agricultural machine 1 is traveling to go down the entrance/exit SL (traveling down a slope), one of the opposite ends of the entrance/exit SL that is closer to the agricultural road J (the border between the entrance/exit SL and the agricultural road J) is referred to as a "start point SLs of the entrance/exit SL", whereas the other of the opposite ends of the entrance/exit SL that is closer to the agricultural field H (the border between the entrance/exit SL and the agricultural field H) is referred to as an "end point SLe of the entrance/exit SL".

In the example in FIGS. 9A and 9B, a land surface (may also be referred to as a "field surface") Kh of the agricultural field H and a land surface (may also be referred to as a "road surface") Kj of the agricultural road J are substantially horizontal, and the agricultural field H is located lower than the agricultural road J. The entrance/exit SL of the agricultural field H slopes with respect to the agricultural field H and the agricultural road J. (The same applies to examples in FIGS. 5A to 5G, FIGS. 7A to 7G, FIGS. 11A to 11E, and FIGS. 13A to 13F.)

For example, assume that, as illustrated in FIG. 9A, when the agricultural machine 1 performs automatic operation to travel forward from the agricultural field H to the agricultural road J outside the agricultural field H through the upward-sloping entrance/exit SL, a detection range E of a detector 41L provided at the front of the traveling vehicle body 3 is fixed to a reference detection range Eb (detection range is fixed).

In such a case, as the agricultural machine 1 travels on the agricultural field H and approaches the entrance/exit SL, a lower portion of the entrance/exit SL occupies a large amount of the detection range Eb, reducing the effective size of the detection range Eb (see arrow Y1 in FIG. 9A). Therefore, the vicinity of the upper end point SLe of the upper entrance/exit SL cannot be detected by the detector 41L, and a land surface Ks or other objects (such as obstacles) in the vicinity of the end point SLe cannot be detected.

After that, when the agricultural machine 1 travels up the entrance/exit SL1 (travels up a slope), the traveling vehicle body 3 is inclined diagonally upward and the detection range Eb is inclined diagonally upward. Then, as the agricultural machine 1 approaches the agricultural road J, the land surface Ks of the entrance/exit SL gradually goes out of the detection range Eb and the detection range Eb is directed toward the space above the agricultural road J (see arrow Y2 in FIG. 9A). This makes it impossible to detect the agricultural road J with the detector 41L, and also makes it impossible to detect the land surface Kj of the agricultural road J or other objects (such as obstacles) on the agricultural road J.

Assume that, as illustrated in FIG. 9B, also when the agricultural machine 1 travels forward from the agricultural road J to enter the agricultural field H through the downward-sloping entrance/exit SL, the detection range E of the detector 41L provided at the front of the traveling vehicle body 3 is fixed to the reference detection range Eb (detection range is fixed).

In such a case, when the agricultural machine 1 travels on the agricultural road J and approaches the entrance/exit SL1, the land surface Kj of the agricultural road J goes out of the detection range Eb and the detection range Eb is directed to the space above the entrance/exit SL (see arrow Y3 in FIG. 9B). This makes impossible to detect the lower entrance/exit SL or the lower end point SLe of the entrance/exit SL with the detector 41L and also makes it impossible to detect the land surface Ks of the entrance/exit SL, the land surface Kh of the agricultural field H in the vicinity of the end point SLe of the entrance/exit SL, or other objects (such as obstacles) on the land surfaces Ks and Kh.

When the agricultural machine 1 travels down the entrance/exit SL1 (travels down a slope), the traveling vehicle body 3 is inclined diagonally downward and the detection range Eb is inclined diagonally downward. Then, as the agricultural machine 1 approaches the agricultural field H, the land surface Kh of the agricultural field H1 in the vicinity of the end point SLe of the entrance/exit SL partially occupies the detection range Eb and the effective size of the detection range Eb decreases (see arrow Y4 in FIG. 9B). This makes it impossible to detect a forward area in the agricultural field H that the agricultural machine 1 is to travel after passing through the entrance/exit SL, and also makes it impossible to detect the land surface Kh in the forward area or other objects (such as obstacles) in the forward area.

If it is impossible to detect the entrance/exit SL, the land surfaces Ks, Kh, and Kj, or objects in front of the traveling vehicle body 3 in the direction of travel of the traveling vehicle body 3 with the detector 41L as described above, the agricultural machine 1 is prevented from traveling safely.

In view of the above-described problems, the detection adjuster 40H of the control device 40 adjusts the detection direction(s) and/or the detection range E of the detector 41L according to the conditions of the land surface(s) Kh, Ks, and/or Kj on which the traveling vehicle body 3 travels and/or changes in position of the traveling vehicle body 3 relative to the land surface(s) Kh, Ks, and/or Kj. Such adjusting operation is described with reference to FIGS. 5A to 8.

FIGS. 5A to 5G illustrate an example of the traveling state of the agricultural machine 1 and the detection range E of the detector 41L provided at the front of the traveling vehicle body 3 of the agricultural machine 1. FIG. 5H is a plan view of an example of the agricultural machine 1 and the agricultural field H. FIG. 6 shows an example of changes in position of the agricultural machine 1 which is traveling and changes in the detection range E.

The traveling state of the agricultural machine 1 and the detection range E illustrated in FIGS. 5A to 5G correspond to the traveling state of the agricultural machine 1 and the detection range E shown in FIG. 6. In the graph in FIG. 6, the horizontal axis represents the position of the traveling vehicle body 3 which is traveling, whereas the vertical axis represents the height of the detection range E relative to the traveling vehicle body 3 at a predetermined distance forward from the traveling vehicle body 3 in the direction of travel (forward travel). The long-narrow hatched area in the graph in FIG. 6 represents changes in the relative height of the detection range E against the position of the traveling vehicle body 3 which is traveling (the same applies to FIG. 8 [described later]).

For example, in the agricultural field H illustrated in FIG. 5H, the agricultural machine 1 (traveling vehicle body 3), which pulls the working device 2, does work on the ground while traveling from a work start point ST1 to a work end point EN. In so doing, the automatic operation controller 40E performs a first operation control in which the automatic operation controller 40E controls the automatic operation of the traveling vehicle body while causing the working device 2 to do work on the ground.

After the completion of the work on the ground, as illustrated in, for example, FIGS. 5A to 5G, the agricultural machine 1 (traveling vehicle body 3) is automatically operated to travel forward from the agricultural field H to go out of the agricultural field H to the agricultural road J through the upward-sloping entrance/exit SL. In so doing, the detection adjuster 40H acquires the position of the traveling vehicle body 3 detected by the positioning device 41k. The detection adjuster 40H also acquires the position and angle of slope θs of the land surface Ks of the entrance/exit SL and the positions and angles of slope θh and θj of the land surface Kh of the agricultural field H and the land surface Kj of the agricultural road J that are located forward and rearward of the entrance/exit SL, which are included in agricultural field information pre-acquired by the information acquirer 40I.

Figure 5A:
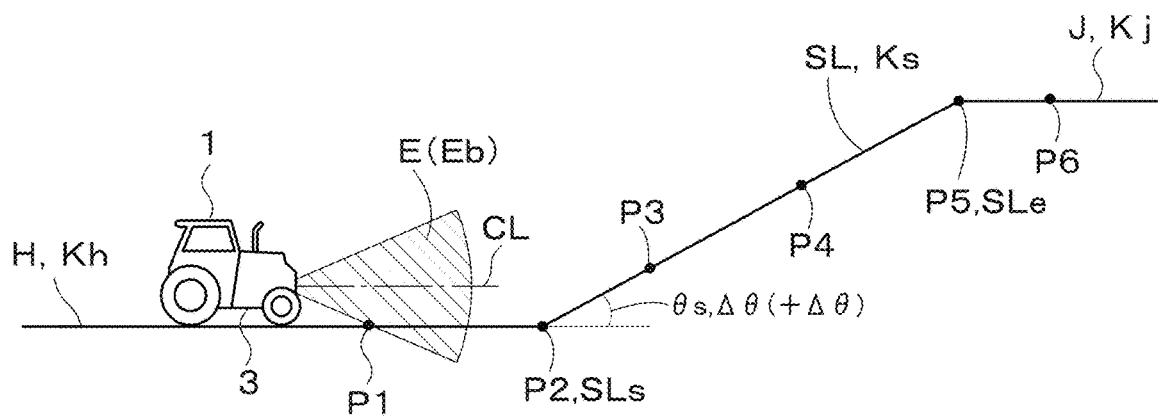
FIG. 5A illustrates an example of a traveling state and a detection range of the agricultural machine.

Note that the angle of slope θs of the land surface Ks of the entrance/exit SL is shown in FIG. 5A. The land surface Kh of the agricultural field H and the land surface Kj of the agricultural road J are horizontal, and therefore the angles of slope θh and θj (=0 degrees) of the land surfaces Kh and Kj are not shown. (The same applies to the examples in FIGS. 7A to 7G, FIGS. 11A to 11E, and FIGS. 13A to 13F [described later].) Furthermore, although the working device 2 is linked to the traveling vehicle body 3 of the agricultural machine 1 in FIG. 5H, the working device 2 is not illustrated in FIGS. 5A to 5G for convenience of illustration. (The same applies to FIGS. 7A to 7G [described later]).

The detection adjuster 40H detects, based on the agricultural field information pre-acquired by the information acquirer 40I, a vertical angular difference Δθ between (i) a first land surface extending from the traveling vehicle body 3 to a point at a predetermined distance forward from the traveling vehicle body 3 in the direction of travel of the traveling vehicle body (3) and (ii) a second land surface located forward of that point in the direction of travel of the traveling vehicle body (3). The angular difference Δθ is the angle of the second land surface to the first land surface.

Figure 5B:
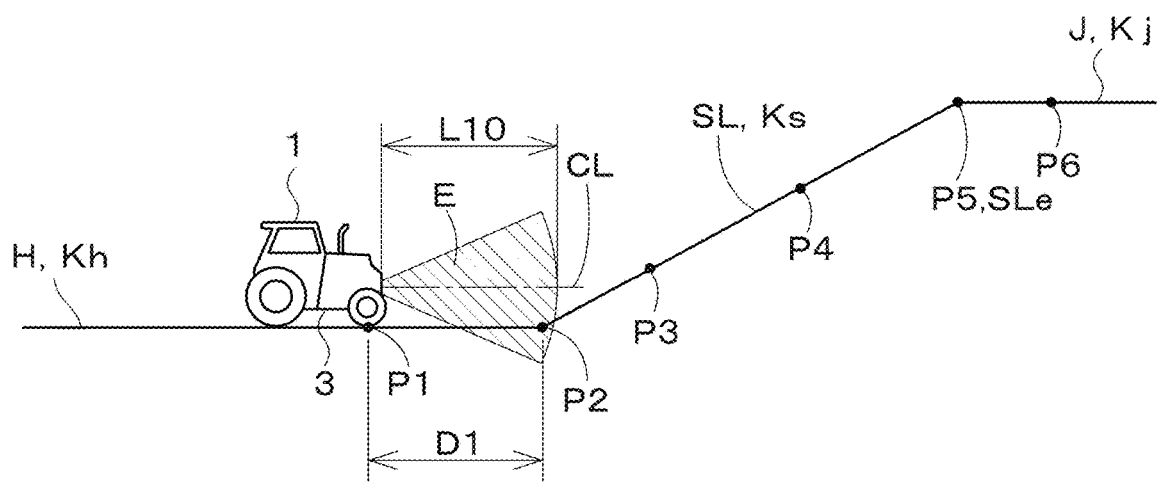
FIG. 5B illustrates an example of the traveling state and the detection range of the agricultural machine.

For example, when, as illustrated in FIG. 5A, the traveling vehicle body 3 is traveling on the agricultural field H toward the entrance/exit SL, the portion of the land surface Kh of the agricultural field H that extends from the traveling vehicle body 3 to a point P2 at a predetermined distance forward from the traveling vehicle body 3 in the direction of travel is the first land surface, and the land surface Ks of the entrance/exit SL that is located forward of the point P2 in the direction of travel is the second land surface. For example, when the angle of slope θh of the land surface Kh of the agricultural field H is 0 degrees (horizontal) and the angle of slope θs of the land surface Ks of the entrance/exit SL is 10 degrees, the angular difference Δθ between the land surfaces Kh and Ks is +10 degrees (Δθ=10 degrees−0 degrees=+10 degrees). Note that the point P2 shown in drawings such as FIGS. 5A and 5B is a junction point between the land surface Kh (first land surface) of the agricultural field H and the land surface Ks (second land surface) of the entrance/exit SL, and is located at the same position as the start point SLs of the entrance/exit SL.

Figure 5C:
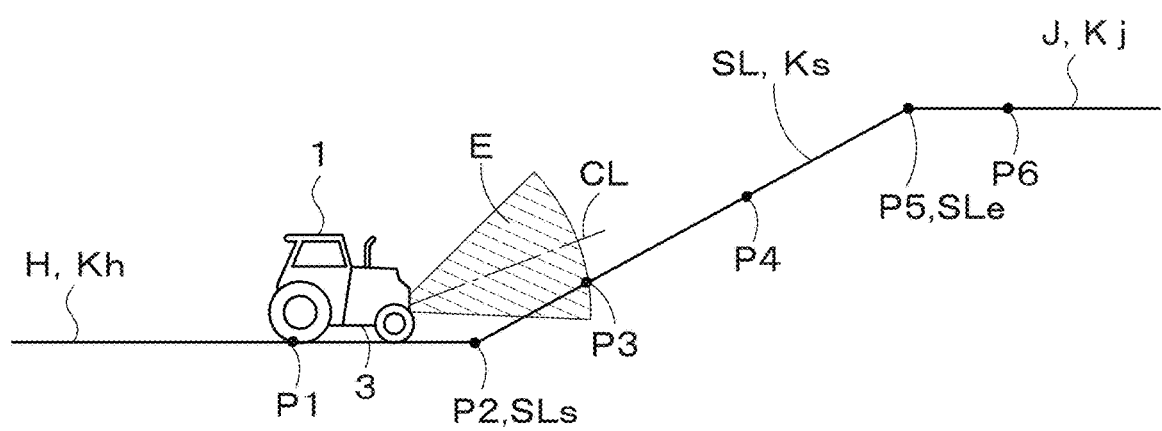
FIG. 5C illustrates an example of the traveling state and the detection range of the agricultural machine.
Figure 5D:
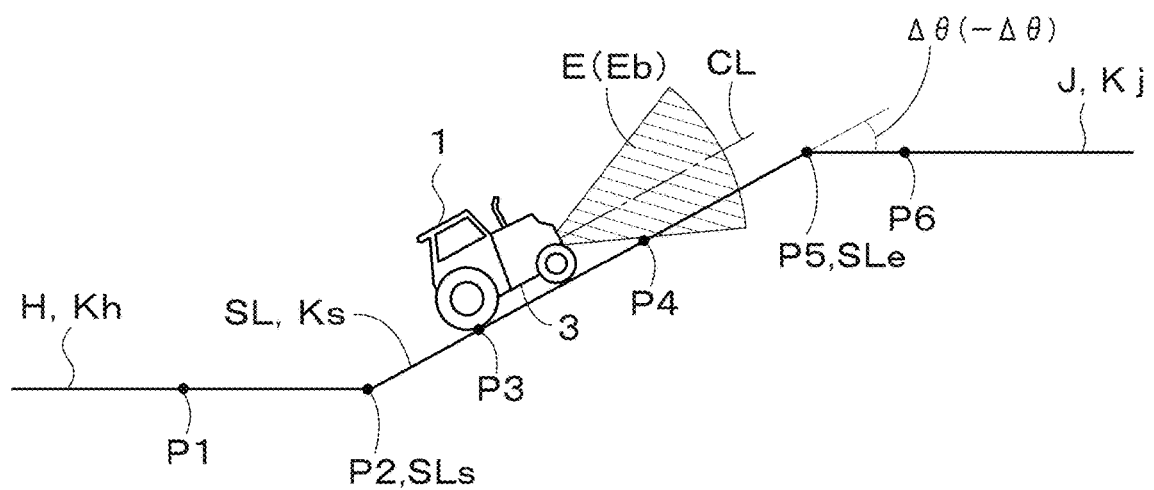
FIG. 5D illustrates an example of the traveling state and the detection range of the agricultural machine.

For example, when, as illustrated in FIG. 5D, the traveling vehicle body 3 is traveling on the entrance/exit SL toward the agricultural road J, the portion of the land surface Ks of the entrance/exit SL that extends from the traveling vehicle body 3 to a point P5 at a predetermined distance forward from the traveling vehicle body 3 in the direction of travel is the first land surface, and the land surface Kj of the agricultural road J that is located forward of the point P5 in the direction of travel is the second land surface. For example, when the angle of slope θs of the land surface Ks of the entrance/exit SL is 10 degrees and the angle of slope θj of the land surface Kj of the agricultural road J is 0 degrees (horizontal), the angular difference Δθ between the land surfaces Ks and Kj is −10 degrees (Δθ=0 degrees−10 degrees=−10 degrees). Note that the point P5 shown in drawings such as FIG. 5C is a junction point between the land surface Ks (first land surface) of the entrance/exit SL and the land surface Kj (second land surface) of the agricultural road J, and is located at the same position as the end point SLe of the entrance/exit SL. The agricultural road J is located higher than the agricultural field H.

In the example shown in FIGS. 5A to 5G and 6, the automatic operation controller 40E performs a second operation control in which the automatic operation controller 40E controls the automatic operation of the traveling vehicle body 3 without causing the working device 2 to do work on the ground. That is, FIGS. 5A to 5G and 6 illustrate the traveling state of the agricultural machine 1 after the automatic operation controller 40E has changed the first operation control (in which the automatic operation controller 40E controls the automatic operation of the traveling vehicle body while causing the working device 2 to do work on the ground) to the second operation control.

When the angle of slope θs (FIG. 5A) of the entrance/exit SL is less than a predetermined threshold, the detection adjuster 40H sets the detection range E of the detector 41L that extends forward of the traveling vehicle body 3 in the direction of travel to, for example, a reference detection range Eb having a central axis CL parallel to the land surface Kh of the agricultural field H (both the central axis CL and the land surface Kh are horizontal), That is, the detection adjuster 40H orients such a forward detection range E (Eb) and at least some of the detection directions forming the detection range E (Eb) toward a space forward of the traveling vehicle body 3 in the direction of travel and toward a land surface located forward of the traveling vehicle body 3 in the direction of travel.

After that, even when the traveling vehicle body 3 travels on the land surface Kh of the agricultural field H toward the entrance/exit SL or travels on the entrance/exit SL, the detection adjuster 40H maintains the forward detection range E (Eb) and the detection directions without adjusting the detection range E (Eb) or the detection directions.

Although the above description discusses a case in which the detection adjuster 40H compares the angle of slope θs of the entrance/exit SL and the threshold, the detection adjuster 40H may be configured to compare, with the threshold, the absolute value |Δθ| of the angular difference Δθ between the land surface Kh of the agricultural field H and the land surface Ks of the entrance/exit SL instead of the angle of slope θs of the entrance/exit SL. Alternatively, the detection adjuster 40H may be configured to compare, with respective corresponding thresholds, the angle of slope θs of the entrance/exit SL and the absolute value |Δθ| of the angular difference Δθ between the land surfaces Kh and Ks. In the present example, the angle of slope θs of the entrance/exit SL and the absolute value |Δθ| of the angular difference Δθ between the land surfaces Kh and Ks have the same value.

On the contrary, when the angle of slope θs of the entrance/exit SL (and/or the absolute value |Δθ| of the angular difference Δθ between the land surfaces Kh and Ks) is equal to or greater than the threshold, the detection adjuster 40H calculates, at predetermined intervals, the distance from the position of the traveling vehicle body 3 to the start point SLs (point P2) of the entrance/exit SL (calculates a change in the position of the traveling vehicle body 3 relative to the point P2). Next, the detection adjuster 40H adjusts the forward detection range E and the detection directions based on the angle of slope θs of the entrance/exit SL and/or the angular difference Δθ between the land surfaces Kh and Ks, and the distance from the position of the traveling vehicle body 3 to the start point SLs.

Specifically, when the traveling vehicle body 3 is traveling from the work end point EN1 (FIG. 5G) of the agricultural field H toward the entrance/exit SL, for example, as shown in FIG. 5A, the detection adjuster 40H sets the forward detection range E to the reference detection range Eb while the distance from the position of the traveling vehicle body 3 to the start point SLs of the entrance/exit SL is greater than a predetermined value (the left side of the point P1 in FIG. 5A).

That is, the detection adjuster 40H orients the forward detection range E (Eb) and at least some of the detection directions to a space forward of the traveling vehicle body 3 in the direction of travel of the traveling vehicle body 3, the portion of the land surface Kh of the agricultural field H that is located forward of the traveling vehicle body 3 in the direction of travel, and a lower portion of the land surface Ks of the entrance/exit SL. With this, as shown in the area on the left side of the point P1 in FIG. 6, the forward detection range E (Eb) with a predetermined vertical dimension is located at a predetermined height and moves in parallel to the land surface Kh of the agricultural field H.

Once the distance from the position of the traveling vehicle body 3 to the start point SLs of the entrance/exit SL has become equal to or less than the predetermined value (the area between the points P1 and P2 in FIGS. 5B and 5C), the detection adjuster 40H performs a first adjustment in which the detection adjuster 40H causes the forward detection range E to move upward and orients at least some of the forward detection directions toward the end point SLe of the entrance/exit SL, and the portion of the land surface(s) Ks (and/or Kj) in the vicinity of the end point SLe.

For example, when the traveling vehicle body 3 is traveling from the work end point EN1 (FIG. 5H) toward the entrance/exit SL (FIGS. 5A to 5C), the detection adjuster 40H starts the first adjustment after detecting at least the start point SLs of the entrance/exit SL with the detector 41L (see FIG. 5B). A distance D1 from the position (P1) of the traveling vehicle body 3 to the start point SLs (P2) of the entrance/exit SL here is set such that the distance D1 is less than the maximum detectable distance L10 of the detector 41L.

In the first adjustment in such a case, the detection adjuster 40H causes the forward detection range E and the detection directions to gradually swing upward based on the angle of slope θs of the entrance/exit SL and/or the angular difference Δθ between the land surfaces Kh and Ks, and the distance from the position of the traveling vehicle body 3 to the start point SLs (area between points P1 and P2 in FIG. 6).

More specifically, the angular difference Δθ between the land surfaces Kh and Ks is a positive value indicating that the land surface Ks of the entrance/exit SL slopes upward relative to the land surface Kh of the agricultural field H (FIG. 5A). Therefore, when the traveling vehicle body 3 is traveling on the land surface Kh of the agricultural field H toward the land surface Ks of the entrance/exit SL, the detection adjuster 40H causes, as the position of the traveling vehicle body 3 approaches the point P2, the forward detection range E and the detection directions to swing upward based on the angle of slope θs of the entrance/exit SL and/or the absolute value |Δθ| of the angular difference Δθ between the land surfaces Kh and Ks (area between points P1 and P2 in FIG. 5C and FIG. 6).

In so doing, the detection adjuster 40H may adjust (cause to swing upward) the forward detection range E and the detection directions such that the detection range E and the detection directions are oriented to the entire land surface Ks of the entrance/exit SL. Alternatively, the detection adjuster 40H may adjust the forward detection range E and the detection directions such that the detection range E and the detection directions are oriented to a portion of the land surface Ks in the vicinity of the end point SLe of the entrance/exit SL and the space above that portion of the land surface Ks.

The direction in which the forward detection range E and the detection directions are to be adjusted (to be swung) and the amount by which the forward detection range E and the detection directions are to be adjusted (to be swung), corresponding to the angle of slope θs of the entrance/exit SL and/or the angular difference Δθ between land surfaces and changes in position of the traveling vehicle body 3 relative to the entrance/exit SL or the second land surface (the distance and direction from the position of the traveling vehicle body 3 to the entrance/exit SL or the second land surface), may be pre-set and stored in a memory 45 and/or the like. In such a case, the detection adjuster 40H may be configured to read, from the memory 45 and/or the like, the direction in which the detection range E and the detection directions are to be adjusted and the amount by which the detection range E and the detection directions are to be adjusted when performing the first adjustment or any of second to fourth adjustments (described later). Alternatively, the detection adjuster 40H may calculate the direction in which the detection range E and the detection directions are to be adjusted and the amount by which the detection range E and the detection directions are to be adjusted using predetermined computing equations when performing any of the first to fourth adjustments. (The same applies to examples in FIGS. 7A to 8 [described later]).

Once the traveling vehicle body 3 has started traveling up the land surface Ks of the entrance/exit SL (traveling up a slope) (the right side of the point P2 in drawings such as FIGS. 5A to 5D), the detection adjuster 40H performs a second adjustment in which the detection adjuster 40H causes the forward detection range E to move downward and orients at least some of the forward detection directions toward the end point SLe of the entrance/exit SL and/or the portion of the land surface(s) Ks (and/or Kj) in the vicinity of the end point SLe.

In the second adjustment in such a case, the detection adjuster 40H causes the forward detection range E and the detection directions to gradually swing downward based on the angle of slope θs of the entrance/exit SL and/or the angular difference Δθ between the land surfaces Kh and Ks, and the distance from the position of the traveling vehicle body 3 to the start point SLs (area between points P2 and P3 in FIG. 6).

More specifically, when the traveling vehicle body 3 is traveling up the land surface Ks of the entrance/exit SL (traveling up a slope), the detection adjuster 40H causes, as the position of the traveling vehicle body 3 moves away from the point P2, the forward detection range E and the detection directions to swing downward based on the angle of slope θs of the entrance/exit SL and/or the absolute value |Δθ| of the angular difference Δθ between the land surfaces Kh and Ks.

In so doing, the detection adjuster 40H may adjust (cause to swing downward) the forward detection range E and the detection directions such that the detection range E and the detection directions are oriented to the entire portion of the land surface Ks of the entrance/exit SL that is located forward of the traveling vehicle body 3. Alternatively, the detection adjuster 40H may adjust the forward detection range E and the detection directions such that the detection range E and the detection directions are oriented toward a portion of the land surface Ks in the vicinity of the end point SLe of the entrance/exit SL and the space above that portion of the land surface Ks.

While the traveling vehicle body 3 is traveling up the land surface Ks of the entrance/exit SL (traveling up a slope), after the forward detection range E having swung downward in the second adjustment has matched the reference detection range Eb (point P3 in FIG. 6), the detection adjuster 40H maintains the detection range E at the reference detection range Eb (area between points P3 and P4 in FIG. 6).

That is, the detection adjuster 40H performs the second adjustment to orient the forward detection range E and at least some of the detection directions toward the end point SLe of the entrance/exit SL and/or a portion of the land surfaces Ks and Kj in the vicinity of the end point SLe. The portion of the land surfaces Ks and Kj in the vicinity of the end point SLe in such a case includes (i) a portion of the land surface Ks on the same side of the end point SLe of the entrance/exit SL as the traveling vehicle body 3 and (ii) a portion of the land surface Kj of the agricultural road J on the opposite side of the end point SLe from the traveling vehicle body 3.

As described above, as the traveling vehicle body 3 travels on the land surface Kh of the agricultural field H and approaches the entrance/exit SL, the detection adjuster 40H performs the first adjustment to cause the forward detection range E and the detection directions to gradually swing upward. As the traveling vehicle body 3 travels on the land surface Ks of the entrance/exit SL to move away from the agricultural field H, the detection adjuster 40H performs the second adjustment to cause the forward detection range E and the detection directions to gradually swing downward to return to where they were before the upward swinging (to the reference detection range Eb).

When the absolute value |Δθ| of the angular difference Δθ (FIG. 5D) between the land surface Ks of the entrance/exit SL and the land surface Kj of the agricultural road J is less than a threshold, the detection adjuster 40H maintains the forward detection range E at the reference detection range Eb even when the traveling vehicle body 3 traveling up the entrance/exit SL (traveling up a slope) approaches the agricultural road J. After that, the detection adjuster 40H maintains the forward detection range E (Eb) and the detection directions without adjusting them even when the traveling vehicle body 3 travels out of the entrance/exit SL and travels on the agricultural road J to move away from the entrance/exit SL.

On the contrary, when the absolute value |Δθ| of the angular difference Δθ between the land surfaces Ks and Kj is equal to or greater than the threshold, the detection adjuster 40H calculates, at predetermined intervals, the distance from the position of the traveling vehicle body 3 to the end point SLe (point P5) of the entrance/exit SL (calculates a change in the position of the traveling vehicle body 3 relative to the point P5) while the traveling vehicle body 3 is traveling up the entrance/exit SL (traveling up a slope) toward the agricultural road J. Next, the detection adjuster 40H adjusts the forward detection range E and the detection directions based on the angle of slope θs of the entrance/exit SL and/or the angular difference Δθ between the land surfaces Ks and Kj, and the distance from the position of the traveling vehicle body 3 to the end point SLe.

Specifically, once the distance from the position of the traveling vehicle body 3 to the end point SLe of the entrance/exit SL has become equal to or less than a predetermined value (the area between points P4 and P5 in FIGS. 5E and 5F), the detection adjuster 40H performs a third adjustment in which the detection adjuster 40H causes the forward detection range E to move downward and orients at least some of the forward detection directions toward a space forward of the end point SLe of the entrance/exit SL and the portion of the land surface Kj of the agricultural road J that is located forward of the end point SLe.

Figure 5E:
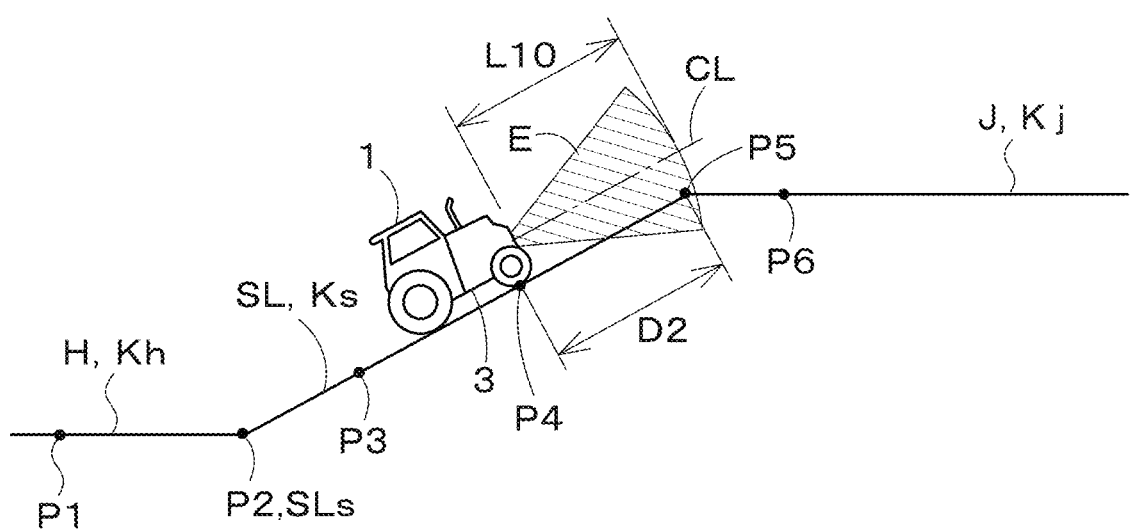
FIG. 5E illustrates an example of the traveling state and the detection range of the agricultural machine.
Figure 5F:
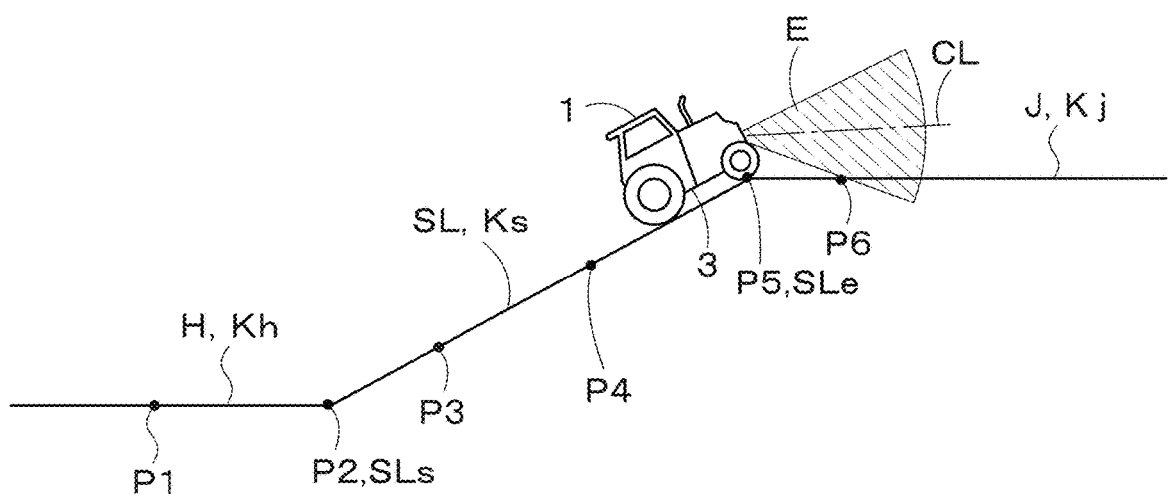
FIG. 5F illustrates an example of the traveling state and the detection range of the agricultural machine.

For example, when the traveling vehicle body 3 is traveling up the land surface Ks of the entrance/exit SL (traveling up a slope) (FIGS. 5D, 5E, and 5F), the detection adjuster 40H starts the third adjustment after detecting at least the end point SLe of the entrance/exit SL with the detector 41L (see FIG. 5E). A distance D2 from the position (P4) of the traveling vehicle body 3 to the end point SLe (P5) of the entrance/exit SL here is set such that the distance D2 is less than the maximum detectable distance L10 of the detector 41L.

In the third adjustment in such a case, the detection adjuster 40H causes the forward detection range E and the detection directions to gradually swing downward based on the angle of slope θs of the entrance/exit SL and/or the angular difference Δθ between the land surfaces Ks and Kj, and the distance from the position of the traveling vehicle body 3 to the end point SLe (area between points P4 and P5 in FIG. 6).

More specifically, the angular difference Δθ between the land surfaces Ks and Kj is a negative value indicating that the land surface Kj of the agricultural road J slopes downward relative to the land surface Ks of the entrance/exit SL (FIG. 5D). Therefore, when the traveling vehicle body 3 is traveling on the land surface Ks of the entrance/exit SL toward the land surface Kj of the agricultural road J, the detection adjuster 40H causes, as the position of the traveling vehicle body 3 approaches from the point P4 to the point P5 (FIGS. 5E and 5F), the forward detection range E and the detection directions to swing downward based on the angle of slope θs of the entrance/exit SL and/or the absolute value |Δθ| of the angular difference Δθ between the land surfaces Ks and Kj (area between points P4 and P5 in FIG. 6).

In so doing, the detection adjuster 40H may adjust (cause to swing downward) the forward detection range E and the detection directions such that the detection range E and the detection directions are oriented to the end point SLe of the entrance/exit SL or a portion of the land surface Ks of the entrance/exit SL and the land surface Kj of the agricultural road J in the vicinity of the end point SLe.

Once the traveling vehicle body 3 has passed through the end point SLe of the entrance/exit SL, i.e., once the traveling vehicle body 3 has started traveling on the land surface Kj (the right side of point P5 in FIGS. 5E to 5G), the detection adjuster 40H performs a fourth adjustment in which the detection adjuster 40H causes the forward detection range E to move upward and orients at least some of the forward detection directions toward a space forward of the traveling vehicle body 3 and the portion of the land surface Kj of the agricultural road J that is located forward of the traveling vehicle body 3.

In the fourth adjustment in such a case, the detection adjuster 40H causes the forward detection range E and the detection directions to gradually swing upward based on the angle of slope θs of the entrance/exit SL and/or the angular difference Δθ between the land surfaces Ks and Kj, and the distance from the position of the traveling vehicle body 3 to the end point SLe of the entrance/exit SL (the right side of point P5 in FIG. 6). More specifically, while the traveling vehicle body 3 having traveled out of through the entrance/exit SL is traveling on the agricultural road J, the detection adjuster 40H causes the forward detection range E and the detection directions to swing upward as the position of the traveling vehicle body 3 goes away from the point P5.

Figure 5G:
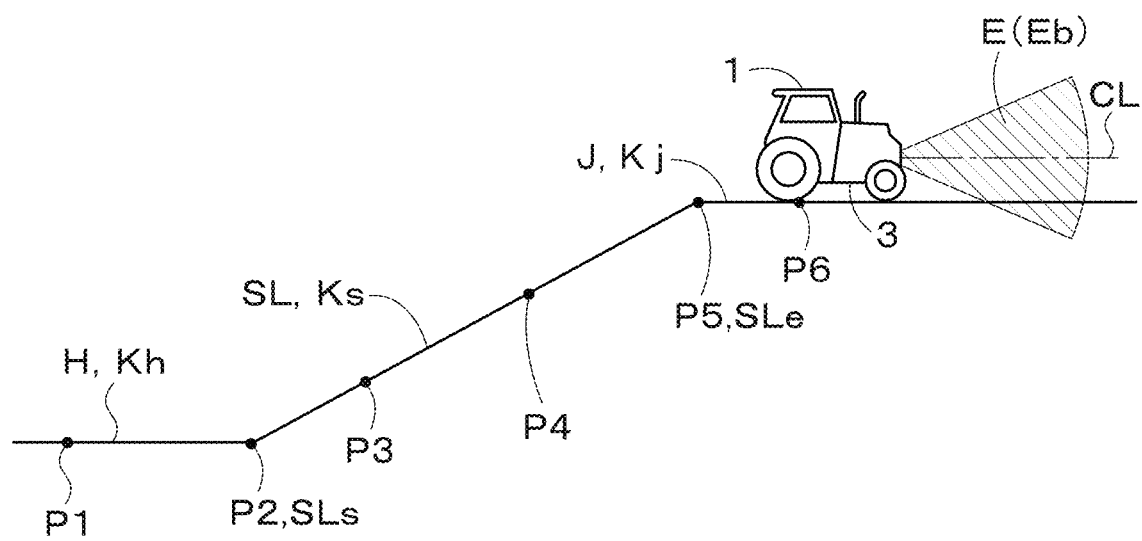
FIG. 5G illustrates an example of the traveling state and the detection range of the agricultural machine.
Figure 5H:
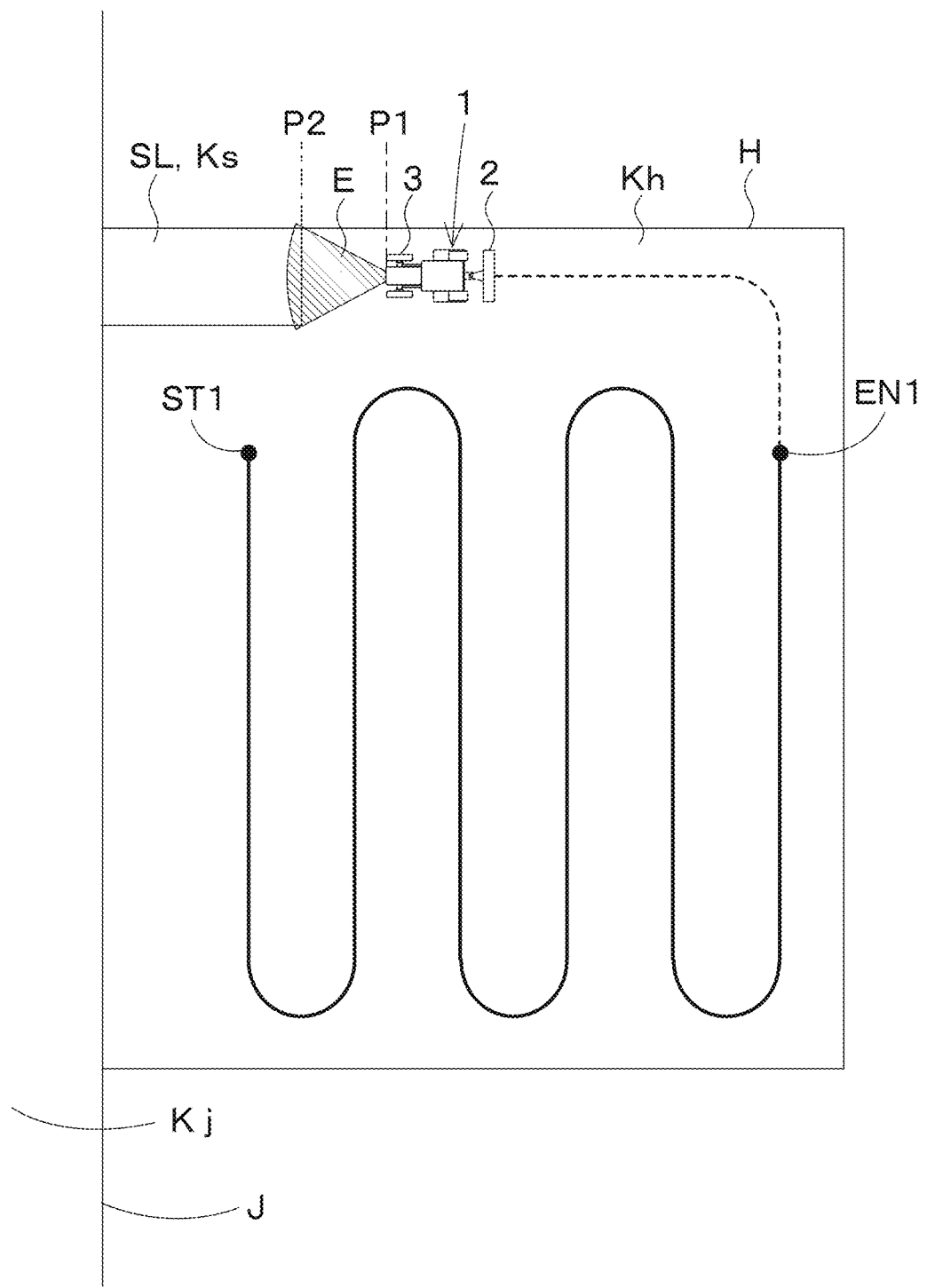
FIG. 5H is a plan view illustrating an example of an agricultural machine and an agricultural field.

Then, after the forward detection range E having swung upward in the fourth adjustment has matched the reference detection range Eb (point P6 in FIG. 6), the detection adjuster 40H maintains the detection range E (Eb) (the right side of the point P6 in FIG. 6, FIG. 5G). That is, the detection adjuster 40H performs the fourth adjustment to keep the forward detection range E and at least some of the forward detection directions oriented toward the portion of the agricultural road J that is located forward and the portion of the land surface Kj of the agricultural road J that is located forward. With this, as shown in the area on the right side of point P6 in FIG. 6, the forward detection range E (Eb) with a predetermined vertical dimension is located at a predetermined height and moves in parallel to the land surface Kj of the agricultural road J.

As described above, as the traveling vehicle body 3 travels on the land surface Ks of the entrance/exit SL and approaches the agricultural road J, the detection adjuster 40H performs the third adjustment to cause the forward detection range E and the detection directions to gradually swing downward. As the traveling vehicle body 3 travels out of the entrance/exit SL and travels on the land surface Kj of the agricultural road J to go way from the entrance/exit SL, the detection adjuster 40H performs the fourth adjustment to cause the forward detection range E and the detection directions to gradually swing upward to return to where they were before the downward swinging (to the reference detection range Eb).

FIGS. 7A to 7G illustrate another example of the traveling state of the agricultural machine 1 and the detection range E of the detector 41L provided at the front of the traveling vehicle body 3 of the agricultural machine 1. FIG. 8 shows an example of changes in position of the agricultural machine 1 which is traveling and changes in the detection range E. The traveling state of the agricultural machine 1 and the detection range E illustrated in FIGS. 7A to 7G correspond to the traveling state of the agricultural machine 1 and the detection range E shown in FIG. 8.

For example, as illustrated in FIGS. 7A to 7G, the detection adjuster 40H acquires the position of the traveling vehicle body 3 detected by the positioning device 41$k$ also when the agricultural machine 1 (traveling vehicle body 3) is automatically operated to travel forward from the agricultural road J outside the agricultural field H to enter the agricultural field H through the downward-sloping entrance/exit SL. The detection adjuster 40H also acquires the positions of the land surfaces Kj, Ks, and Kh and the angles of slope $\theta j$, $\theta s$, and $\theta h$ of the agricultural road J, the entrance/exit SL, and the agricultural field H which are included in agricultural field information pre-acquired by the information acquirer 40I.

The detection adjuster 40H detects, based on the agricultural field information pre-acquired by the information acquirer 40I, a vertical angular difference (relative angle) $\Delta\theta$ between (i) a first land surface extending from the traveling vehicle body 3 to a point at a predetermined distance forward from the traveling vehicle body 3 in the direction of travel and (ii) a second land surface located forward of that point in the direction of travel.

Figure 7A:
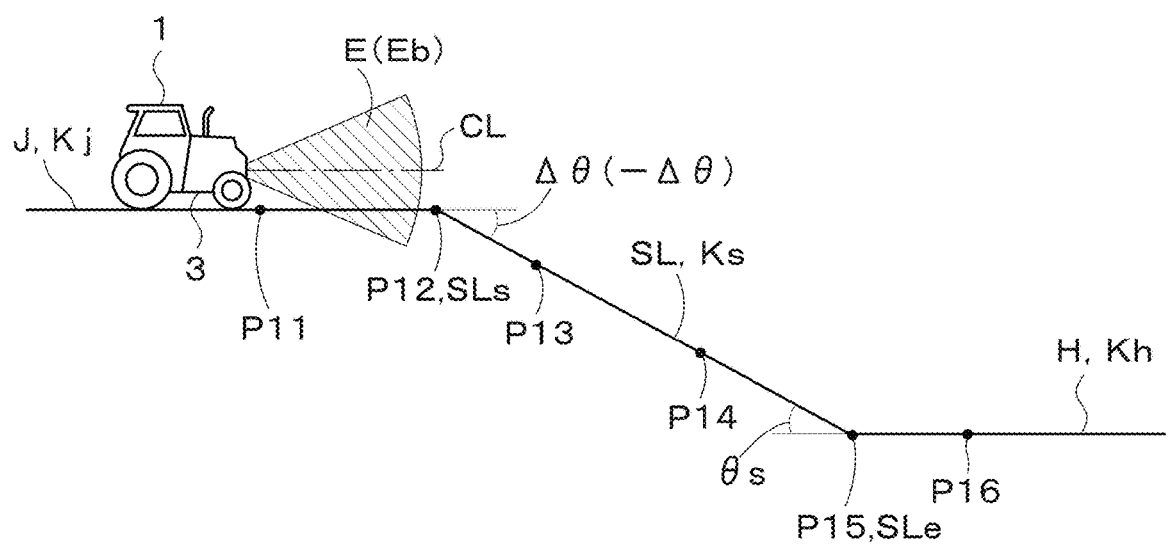
FIG. 7A illustrates another example of the traveling state and the detection range of the agricultural machine.

For example, when, as illustrated in FIG. 7A, the traveling vehicle body 3 is traveling on the agricultural road J toward the entrance/exit SL, the portion of the land surface Kj of the agricultural road J that extends from the traveling vehicle body 3 to a point P12 at a predetermined distance forward from the traveling vehicle body 3 in the direction of travel is the first land surface, and the land surface Ks of the entrance/exit SL that is located forward of the point P12 in the direction of travel is the second land surface. For example, when the angle of slope $\theta j$ of the land surface Kj of the agricultural road J is 0 degrees (horizontal) and the angle of slope $\theta s$ of the land surface Ks of the entrance/exit SL is 10 degrees, the angular difference $\Delta\theta$ between the land surfaces Kj and Ks is −10 degrees ($\Delta\theta=0$ degrees−10 degrees=−10 degrees). The point P12 shown in FIG. 7A is a junction point between the land surface Kj (first land surface) of the agricultural road J and the land surface Ks (second land surface) of the entrance/exit SL, and is located at the same position as the start point SLs of the entrance/exit SL.

Figure 7B:
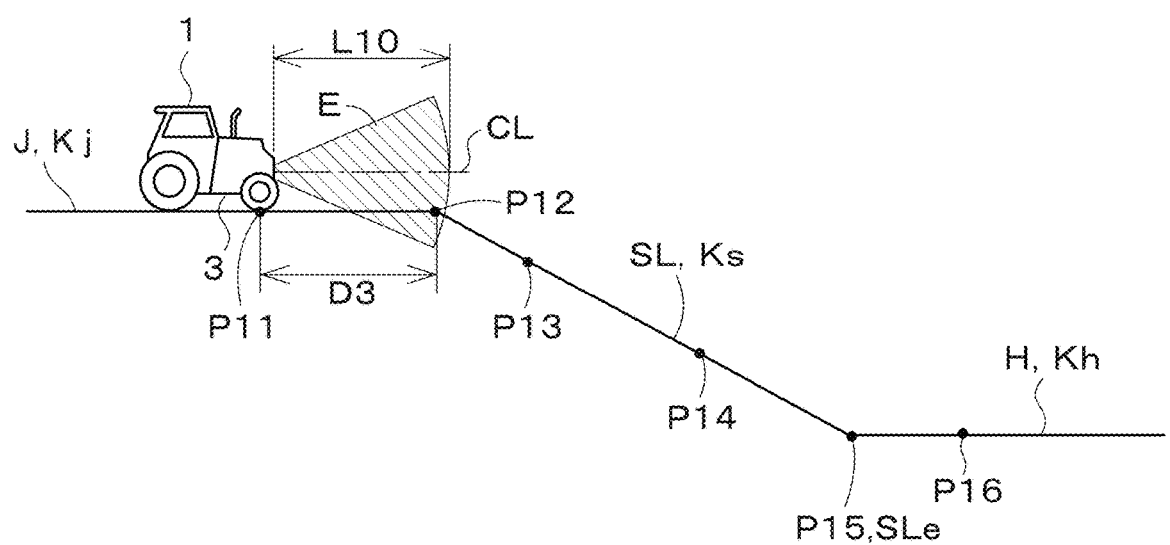
FIG. 7B illustrates another example of the traveling state and the detection range of the agricultural machine.
Figure 7D:
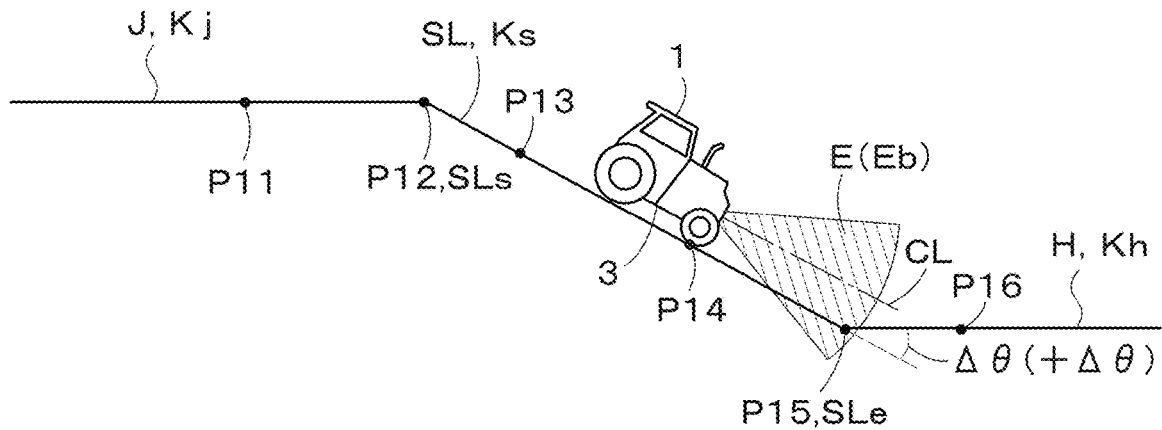
FIG. 7D illustrates another example of the traveling state and the detection range of the agricultural machine.

For example, when, as illustrated in FIG. 7D, the traveling vehicle body 3 is traveling on the entrance/exit SL toward the agricultural field H, the portion of the land surface Ks of the entrance/exit SL that extends from the traveling vehicle body 3 to a point P15 at a predetermined distance forward from the traveling vehicle body 3 in the direction of travel is the first land surface, and the land surface Kh of the agricultural field H that is located forward of the point P15 in the direction of travel is the second land surface. For example, when the angle of slope $\theta s$ of the land surface Ks of the entrance/exit SL is 10 degrees and the angle of slope $\theta h$ of the land surface Kh of the agricultural field H is 0 degrees (horizontal), the angular difference $\Delta\theta$ between the land surfaces Ks and Kh is +10 degrees ($\Delta\theta=10$ degrees−0 degrees=+10 degrees). Note that the point P15 shown in FIG. 7D is a junction point between the land surface Ks (first land surface) of the entrance/exit SL and the land surface Kh (second land surface) of the agricultural field H, and is located at the same position as the end point SLe of the entrance/exit SL. The agricultural field H is located lower than the agricultural road J.

In the example shown in FIGS. 7A to 8, the automatic operation controller 40E performs the second operation control in which the automatic operation controller 40E controls the automatic operation of the traveling vehicle body 3 without causing the working device 2 to do work on the ground. That is, FIGS. 7A to 8 illustrate the traveling state of the agricultural machine 1 before the automatic operation controller 40E changes the second operation control to the first operation control (in which the automatic operation controller 40E controls the automatic operation of the traveling vehicle body while causing the working device 2 to do work on the ground).

When the angle of slope $\theta s$ of the entrance/exit SL (and/or the absolute value $|\Delta\theta|$ of the angular difference $\Delta\theta$ between the land surfaces Kj and Ks) is less than a threshold, the detection adjuster 40H sets the detection range E of the detector 41L that extends forward of the traveling vehicle body 3 in the direction of travel to the reference detection range Eb. That is, the detection adjuster 40H orients such a forward detection range E (Eb) and at least some of the detection directions forming the detection range E (Eb) toward a space forward of the traveling vehicle body 3 in the direction of travel and toward a land surface located forward of the traveling vehicle body 3 in the direction of travel.

After that, even when the traveling vehicle body 3 travels on the land surface Kj of the agricultural road J toward the entrance/exit SL or travels on the entrance/exit SL, the detection adjuster 40H maintains the forward detection range E (Eb) and the detection directions without adjusting the detection range E (Eb) or the detection directions. In the present example, the angle of slope $\theta s$ of the entrance/exit SL and the absolute value $|\Delta\theta|$ of the angular difference $\Delta\theta$ between the land surfaces Kj and Ks have the same value.

On the contrary, when the angle of slope $\theta s$ of the entrance/exit SL (and/or the absolute value $|\Delta\theta|$ of the angular difference $\Delta\theta$ between the land surfaces Kj and Ks) is equal to or greater than the threshold, the detection adjuster 40H calculates, at predetermined intervals, the distance from the position of the traveling vehicle body 3 to the start point SLs (point P12) of the entrance/exit SL (calculates a change in the position of the traveling vehicle body 3 relative to the point P12). Next, the detection adjuster 40H adjusts the forward detection range E and the detection directions based on the angle of slope $\theta s$ of the entrance/exit SL and/or the angular difference $\Delta\theta$ between the land surfaces Kj and Ks, and the distance from the position of the traveling vehicle body 3 to the start point SLs.

Specifically, when the traveling vehicle body 3 is traveling on the agricultural road J toward the entrance/exit SL, for example, as shown in FIG. 7A, the detection adjuster 40H sets the forward detection range E to the reference detection range Eb while the distance from the position of the traveling vehicle body 3 to the start point SLs of the entrance/exit SL is greater than a predetermined value (the left side of the point P11 in FIG. 7A).

That is, the detection adjuster 40H orients the forward detection range E (Eb) and at least some of the detection directions toward a space forward of the traveling vehicle body 3 in the direction of travel of the traveling vehicle body 3 and the portion of the land surface Kj of the agricultural road J that is located forward of the traveling vehicle body 3 in the direction of travel. With this, as shown in the area on the left side of the point P11 in FIG. 8, the forward detection range E (Eb) with a predetermined vertical dimension is located at a predetermined height and moves in parallel to the land surface Kj of the agricultural road J.

Once the distance from the position of the traveling vehicle body 3 to the start point SLs of the entrance/exit SL has become equal to or less than the predetermined value (the area between the points P11 and P12 in FIGS. 7B and 7C), the detection adjuster 40H performs a first adjustment in which the detection adjuster 40H causes the forward detection range E to move upward and orients at least some of the forward detection directions toward the end point SLe of the entrance/exit SL and the portion of the land surface(s) Ks (and/or Kh) of the entrance/exit SL in the vicinity of the end point SLe.

For example, when the traveling vehicle body 3 is traveling from the agricultural road J toward the entrance/exit SL (FIGS. 7A to 7C), the detection adjuster 40H starts the first adjustment after detecting at least the start point SLs of the entrance/exit SL with the detector 41L (see FIG. 7B). A distance D3 from the position (P11) of the traveling vehicle body 3 to the start point SLs (P12) of the entrance/exit SL here is set such that the distance D3 is less than the maximum detectable distance L10 of the detector 41L.

In the first adjustment in such a case, the detection adjuster 40H causes the forward detection range E and the detection directions to gradually swing downward based on the angle of slope θs of the entrance/exit SL and/or the angular difference Δθ between the land surfaces Kj and Ks, and the distance from the position of the traveling vehicle body 3 to the start point SLs of the entrance/exit SL (area between points P11 and P12 in FIG. 8).

More specifically, the angular difference Δθ between the land surfaces Kj and Ks is a negative value indicating that the land surface Ks of the entrance/exit SL slopes downward relative to the land surface Kj of the agricultural road J. Therefore, when the traveling vehicle body 3 is traveling on the land surface Kj toward the land surface Ks, the detection adjuster 40H causes, as the position of the traveling vehicle body 3 approaches the point P12, the forward detection range E and the detection directions to swing downward based on the angle of slope θs of the entrance/exit SL and/or the absolute value |Δθ| of the angular difference Δθ between the land surfaces Kj and Ks (area between points P11 and P12 in FIG. 7A and FIG. 8).

In so doing, the detection adjuster 40H may adjust (cause to swing downward) the forward detection range E and the detection directions such that the detection range E and the detection directions are oriented to the entire land surface Ks of the entrance/exit SL. Alternatively, the detection adjuster 40H may adjust the forward detection range E and the detection directions such that the detection range E and the detection directions are oriented to a portion of the land surface Ks of the entrance/exit SL and the land surface Kh of the agricultural field H in the vicinity of the end point SLe of the entrance/exit SL.

Once the traveling vehicle body 3 has started traveling down the land surface Ks of the entrance/exit SL (traveling down a slope) (the right side of the point P12 in FIGS. 7A to 7D), the detection adjuster 40H performs a second adjustment in which the detection adjuster 40H causes the forward detection range E to move upward and orients at least some of the forward detection directions toward the end point SLe of the entrance/exit SL and the portion of the land surface(s) Ks (and/or Kh) in the vicinity of the end point SLe.

In the second adjustment in such a case, the detection adjuster 40H causes the forward detection range E and the detection directions to gradually swing upward based on the angle of slope θs of the entrance/exit SL and/or the angular difference Δθ between the land surfaces Kj and Ks, and the distance from the position of the traveling vehicle body 3 to the start point SLs of the entrance/exit SL (area between points P12 and P13 in FIG. 8).

More specifically, when the traveling vehicle body 3 is traveling down the land surface Ks of the entrance/exit SL (traveling down a slope), the detection adjuster 40H causes, as the position of the traveling vehicle body 3 moves away from the point P12, the forward detection range E and the detection directions to swing upward based on the angle of slope θs of the entrance/exit SL and/or the absolute value |Δθ| of the angular difference Δθ between the land surfaces Kj and Ks.

In so doing, the detection adjuster 40H may adjust (cause to swing upward) the forward detection range E and the detection directions such that the detection range E and the detection directions are oriented to the entire portion of the land surface Ks of the entrance/exit SL that is located forward of the traveling vehicle body 3. Alternatively, the detection adjuster 40H may adjust the forward detection range E and the detection directions such that the detection range E and the detection directions are oriented toward a portion of the land surface Ks of the entrance/exit SL and the land surface Kh of the agricultural field H in the vicinity of the end point SLe of the entrance/exit SL.

While the traveling vehicle body 3 is traveling down the land surface Ks of the entrance/exit SL (traveling down a slope), after the forward detection range E having swung upward in the second adjustment has matched the reference detection range Eb (point P13 in FIG. 8), the detection adjuster 40H maintains the detection range E (Eb) (area between points P13 and P14 in FIGS. 7D and 8). That is, the detection adjuster 40H performs the second adjustment to orient the forward detection range E and at least some of the detection directions toward the end point SLe of the entrance/exit SL and a portion of the land surfaces Ks and Kh that is located in the vicinity of the end point SLe.

As described above, as the traveling vehicle body 3 travels on the land surface Kj of the agricultural road J and approaches the entrance/exit SL, the detection adjuster 40H performs the first adjustment to cause the forward detection range E and the detection directions to gradually swing downward. As the traveling vehicle body 3 travels on the land surface Ks of the entrance/exit SL to move away from the agricultural road J, the detection adjuster 40H performs the second adjustment to cause the forward detection range E and the detection directions to gradually swing upward to return to where they were before the downward swinging (to the reference detection range Eb).

When the absolute value |Δθ| of the angular difference Δθ between the land surface Ks of the entrance/exit SL and the land surface Kh of the agricultural field H is less than a threshold, the detection adjuster 40H maintains the forward detection range E at the reference detection range Eb even when the traveling vehicle body 3 traveling down the entrance/exit SL (traveling down a slope) approaches the agricultural road J. After that, the detection adjuster 40H maintains the forward detection range E (Eb) and the detection directions without adjusting them even when the traveling vehicle body 3 travels out of the entrance/exit SL and travels on the agricultural field H to move away from the entrance/exit SL.

On the contrary, when the absolute value |Δθ| of the angular difference Δθ between the land surfaces Ks and Kh is equal to or greater than the threshold, the detection adjuster 40H calculates, at predetermined intervals, the distance from the position of the traveling vehicle body 3 to the end point SLe (point P15) of the entrance/exit SL (calculates a change in the position of the traveling vehicle body 3 relative to the point P15) while the traveling vehicle body 3 is traveling down the entrance/exit SL (traveling down a slope) toward the agricultural field H. Next, the detection adjuster 40H adjusts the forward detection range E and the detection directions based on the angle of slope θs of the entrance/exit SL and/or the angular difference Δθ between the land surfaces Ks and Kh, and the distance from the position of the traveling vehicle body 3 to the end point SLe.

Specifically, once the distance from the position of the traveling vehicle body 3 to the end point SLe of the entrance/exit SL has become equal to or less than a predetermined value (the area between points P14 and P15 in FIGS. 7E and 7F), the detection adjuster 40H performs a third adjustment in which the detection adjuster 40H causes the forward detection range E to move upward and orients at least some of the detection directions toward a space forward of the end point SLe of the entrance/exit SL, i.e., the agricultural field H, and the land surface Kh of the agricultural field H located forward of the end point SLe.

Figure 7E:
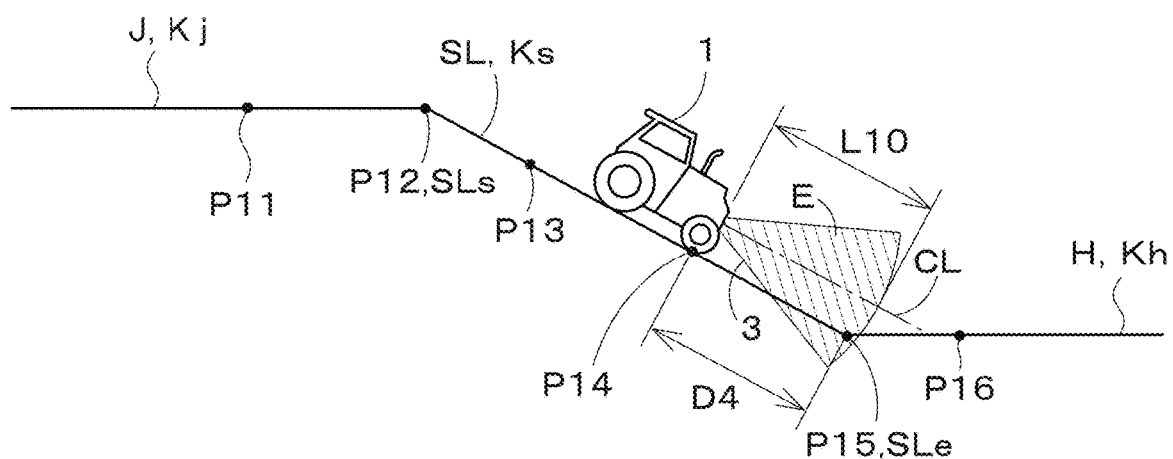
FIG. 7E illustrates another example of the traveling state and the detection range of the agricultural machine.
Figure 7F:
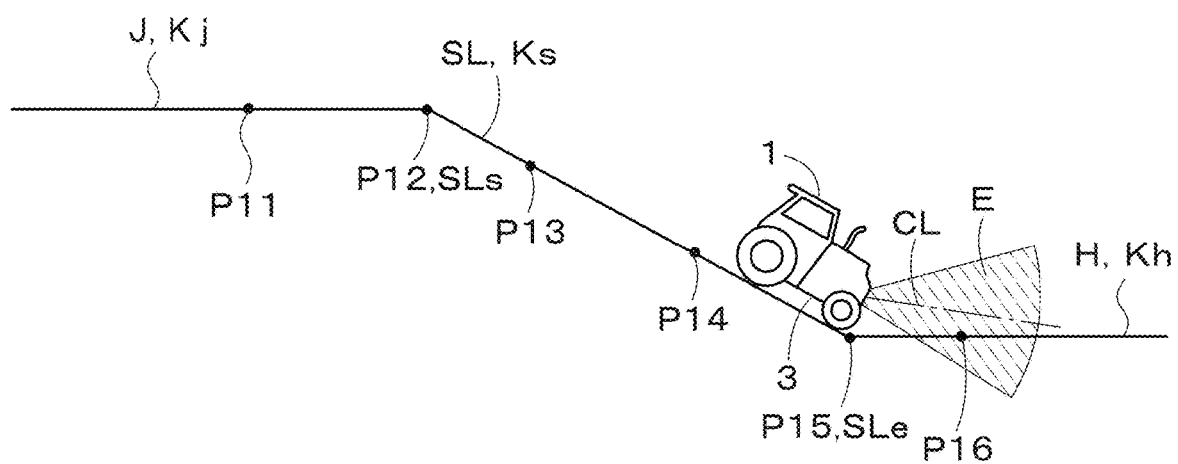
FIG. 7F illustrates another example of the traveling state and the detection range of the agricultural machine.

For example, when the traveling vehicle body 3 is traveling down the land surface Ks of the entrance/exit SL (traveling down a slope) (FIGS. 7D, 7E, and 7F), the detection adjuster 40H starts the third adjustment after detecting at least the end point SLe of the entrance/exit SL with the detector 41L (see FIG. 7E). A distance D4 from the position (P14) of the traveling vehicle body 3 to the end point SLe (P15) of the entrance/exit SL here is set such that the distance D4 is less than the maximum detectable distance L10 of the detector 41L.

In the third adjustment in such a case, the detection adjuster 40H causes the forward detection range E and the detection directions to gradually swing upward based on the angle of slope θs of the entrance/exit SL and/or the angular difference Δθ between the land surfaces Ks and Kh, and the distance from the position of the traveling vehicle body 3 to the end point SLe (area between points P14 and P15 in FIG. 8).

More specifically, the angular difference Δθ between the land surfaces Ks and Kh is a positive value indicating that the land surface Kh of the agricultural field H slopes upward relative to the land surface Ks of the entrance/exit SL. Therefore, when the traveling vehicle body 3 is traveling on the land surface Ks of the entrance/exit SL toward the land surface Kh of the agricultural field H, the detection adjuster 40H causes, as the position of the traveling vehicle body 3 approaches from the point P14 to the point P15 (FIGS. 7E and 7F), the forward detection range E and the detection directions to swing upward based on the angle of slope θs of the entrance/exit SL and/or the absolute value |Δθ| of the angular difference Δθ between the land surfaces Ks and Kh (area between points P14 and P15 in FIG. 8).

In so doing, the detection adjuster 40H may adjust (cause to swing upward) the forward detection range E and the detection directions such that the detection range E and the detection directions are oriented to the end point SLe of the entrance/exit SL or a portion of the land surface Ks of the entrance/exit SL and the land surface Kh of the agricultural field H that is in the vicinity of the end point SLe.

Once the traveling vehicle body 3 has passed through the end point SLe of the entrance/exit SL, i.e., once the traveling vehicle body 3 has started traveling on the agricultural field H (the right side of the point P15 in FIGS. 7E to 7G), the detection adjuster 40H performs a fourth adjustment in which the detection adjuster 40H causes the forward detection range E to move downward and orients at least some of the forward detection directions toward a portion of the agricultural field H that is located forward of the traveling vehicle body 3 and a portion of the land surface Kh of the agricultural field H that is located forward of the traveling vehicle body 3.

In the fourth adjustment in such a case, the detection adjuster 40H causes the forward detection range E and the detection directions to gradually swing downward based on the angle of slope θs of the entrance/exit SL and/or the angular difference Δθ between the land surfaces Ks and Kh, and the distance from the position of the traveling vehicle body 3 to the end point SLe of the entrance/exit SL (area between the points P15 and P16 in FIG. 8).

More specifically, while the traveling vehicle body 3 having traveled out of the entrance/exit SL is traveling on the agricultural field H, the detection adjuster 40H causes the forward detection range E and the detection directions to swing downward as the position of the traveling vehicle body 3 goes away from the point P15.

Figure 7G:
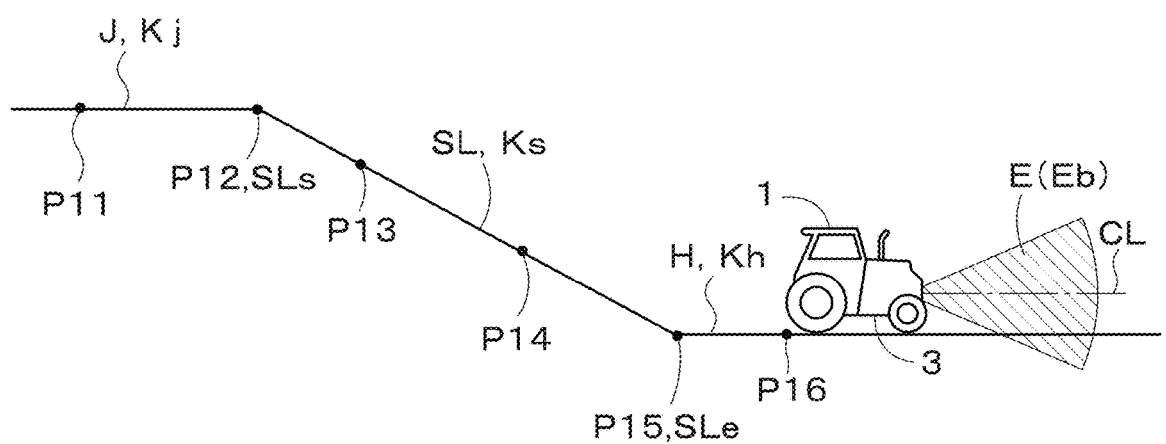
FIG. 7G illustrates another example of the traveling state and the detection range of the agricultural machine.

Then, after the forward detection range E having swung downward in the fourth adjustment has matched the reference detection range Eb (point P16 in FIG. 8), the detection adjuster 40H maintains the detection range E (Eb) (the right side of the point P16 in FIG. 8, and FIG. 7G). That is, the detection adjuster 40H performs the fourth adjustment to keep the forward detection range E and at least some of the detection directions oriented toward the portion of the agricultural field H that is located forward and the portion of the land surface Kh of the agricultural field H that is located forward. With this, as shown in the area on the right side of the point P16 in FIG. 8, the forward detection range E (Eb) with a predetermined vertical dimension is located at a predetermined height and moves in parallel to the land surface Kh of the agricultural field H.

As described above, as the traveling vehicle body 3 travels on the land surface Ks of the entrance/exit SL and approaches the agricultural field H, the detection adjuster 40H performs the third adjustment to cause the forward detection range E and the detection directions to gradually swing upward. As the traveling vehicle body 3 travels out of the entrance/exit SL and travels on the land surface Kh of the agricultural field H to go way from the entrance/exit SL, the detection adjuster 40H performs the fourth adjustment to cause the forward detection range E and the detection directions to gradually swing downward to return to where they were before the upward swinging (to the reference detection range Eb).

When the traveling vehicle body 3 is traveling on the agricultural field H or the agricultural road J toward somewhere other than the entrance/exit SL, the detection adjuster 40H adjusts the forward detection range E and the detection directions such that the forward detection range E and the detection directions are oriented toward a space forward of the traveling vehicle body 3 in the direction of travel and the portion of the land surface Kh or Kj that is located forward of the traveling vehicle body 3. Also when the traveling vehicle body 3 is traveling on the agricultural field H or the agricultural road J toward the entrance/exit SL and the distance from the position of the traveling vehicle body 3 to the position of the entrance/exit SL is greater than the predetermined value, the detection adjuster 40H adjusts the forward detection range E and the detection directions such that the forward detection range E and the detection directions are oriented to a space forward of the traveling vehicle body 3 in the direction of travel and the portion of the land surface Kh or Kj that is located forward of the traveling vehicle body 3.

While the traveling vehicle body 3 of the agricultural machine 1 is traveling as described above, the automatic operation controller 40E controls the travel of the traveling vehicle body 3 according to the detected result of the detector 41L, i.e., according to the result of object detection. Specifically, for example, when the detector 41L detects an obstacle in front of the traveling vehicle body 3 in the direction of travel, the automatic operation controller 40E actuates the brake 44 to reduce the vehicle speed of the traveling vehicle body 3 or stop the traveling vehicle body 3 in order to avoid a collision between the traveling vehicle body 3 and the obstacle. The automatic operation controller 40E may be configured to, according to the conditions of the land surface(s) Kh, Ks, and/or Kj on which the traveling vehicle body 3 travels, control the driving of the prime mover 4 to increase the speed of the traveling vehicle body 3 and/or control the drive state of the traveling device 7 (such as 4WD state or 2DW state).

While the traveling vehicle body 3 is traveling, after the detection adjuster 40H adjusts the detection range E and the detection directions of the detector 41L as described earlier, the detection adjuster 40H may correct the detected result of the detector 41L (such as the position at which the object has been detected) according to the result of the adjustment (whether the adjustment has been performed or not, the angle of adjustment, the position after the adjustment, and/or the like). In such a case, the automatic operation controller 40E controls the travel of the traveling vehicle body 3 according to the detected result of the detector 41L and the corrected detected result.

In the above-described preferred embodiment, an example case is discussed in which the detection range E and the detection directions oriented in the direction of travel are adjusted upward or downward when the agricultural machine 1 travels on the sloping entrance/exit SL of the agricultural field H and before and after the agricultural machine 1 travels on the sloping entrance/exit SL of the agricultural field H. Note, however, that the detection adjuster 40H may adjust the detection range E and the detection directions oriented in the direction of travel upward or downward also when the agricultural machine 1 travels on a sloping land surface and before and after the agricultural machine 1 travels on the sloping land surface.

For example, the detection adjuster 40H may adjust the detection range E and the detection directions oriented in the direction of travel upward or downward also when the agricultural machine 1 (traveling vehicle body 3) travels over an elevated place such as a hill or a ridge in the agricultural field (travels up a slope and immediately down the slope). In such a case, the detection adjuster 40H may adjust the detection range E and the detection directions oriented in the direction of travel upward or downward as shown in FIGS. 5A to 6 when the agricultural machine 1 goes from a lower land surface to a higher land surface through a sloping land surface. Immediately after that, the detection adjuster 40H may adjust the detection range E and the detection directions oriented in the direction of travel upward or downward as shown in FIGS. 7A to 8 when the agricultural machine 1 goes from the higher land surface to the lower land surface through the sloping land surface.

In the above-described preferred embodiment, an example case is discussed in which the detection range E and the detection directions of the detector 41L oriented in the direction of travel are adjusted according to the conditions of the land surface(s) Kh, Ks, and/or Kj (changes in angle of slope) on which the traveling vehicle body 3 travels and according to changes in position of the traveling vehicle body 3 relative to the land surface(s) Kh, Ks, and/or Kj (the distance and direction from the position of the traveling vehicle body 3 to the start point or the end point of the land surface Ks, i.e., the distance between the start point/end point and the traveling vehicle body 3 approaching it and the distance between the start point/end point and the traveling vehicle body 3 going away from it) when the agricultural machine 1 is automatically operated to travel forward. However, for example, the detection range E and the detection directions of the detector 41L oriented in the direction of travel may be adjusted according to the conditions of the land surface(s) on which the traveling vehicle body 3 travels and according to changes in relative position of the traveling vehicle body 3 also when the agricultural machine 1 is manually operated to travel forward or rearward and/or when the agricultural machine 1 is automatically operated to travel rearward.

There may be cases in which, when the agricultural machine 1 travels on the sloping land surface Ks and before and after entering the sloping land surface Ks, for example, the working device 2 linked to the traveling vehicle body 3 in a cantilevered manner contacts the land surface Kh, Ks, or Kj and/or the center of gravity of the agricultural machine 1 is raised depending on the heightwise position of the working device 2, resulting in prevention of safe travel of the traveling vehicle body 3. For the purpose of avoiding this, the raising/lowering controller 40D of the control device 40 causes the raising/lowering device 8 to set (change) the heightwise position of the working device 2 according to the conditions of the land surfaces Kh, Ks, and/or Kj on which the traveling vehicle body 3 travels and changes in position of the traveling vehicle body 3 relative to the land surfaces Kh, Ks, and/or Kj. The following discusses setting of the heightwise position of the working device 2 with reference to FIGS. 10A to 12B.

Figure 10A:
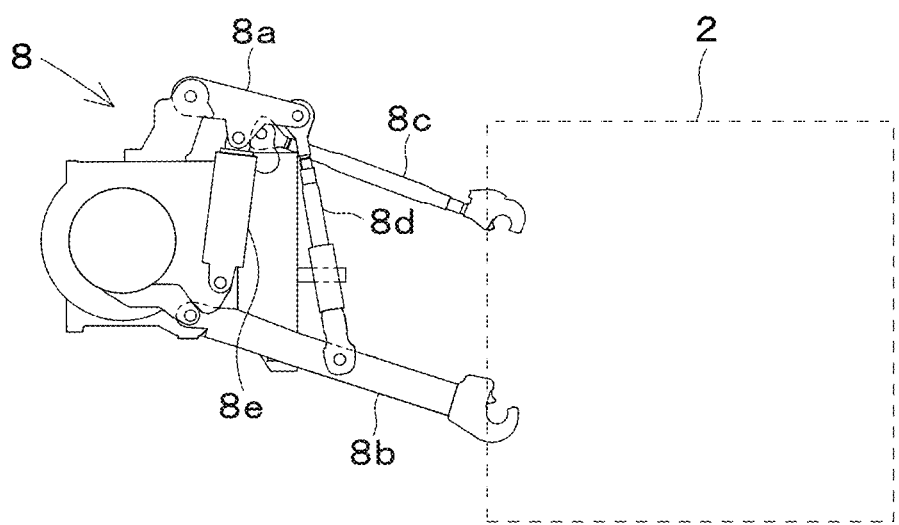
FIG. 10A illustrates a raising/lowering device and how a working device is raised and lowered.
Figure 10B:
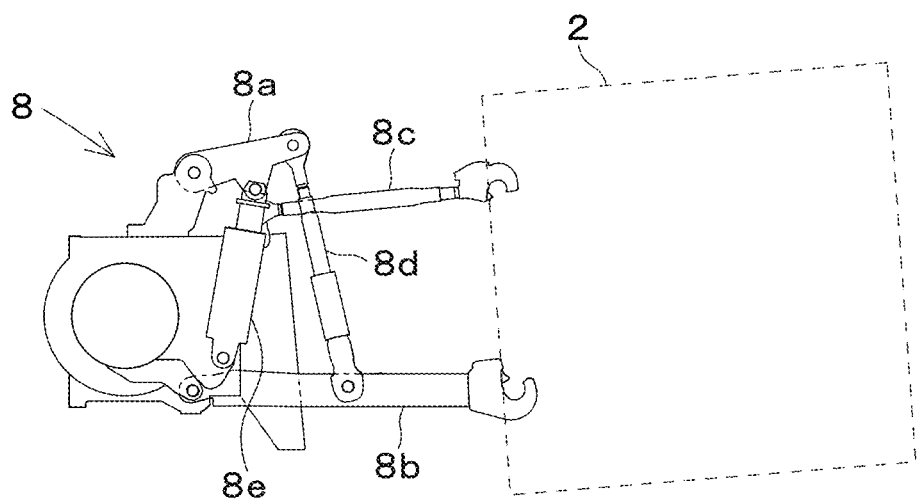
FIG. 10B illustrates the raising/lowering device and how the working device is raised and lowered.
Figure 10C:
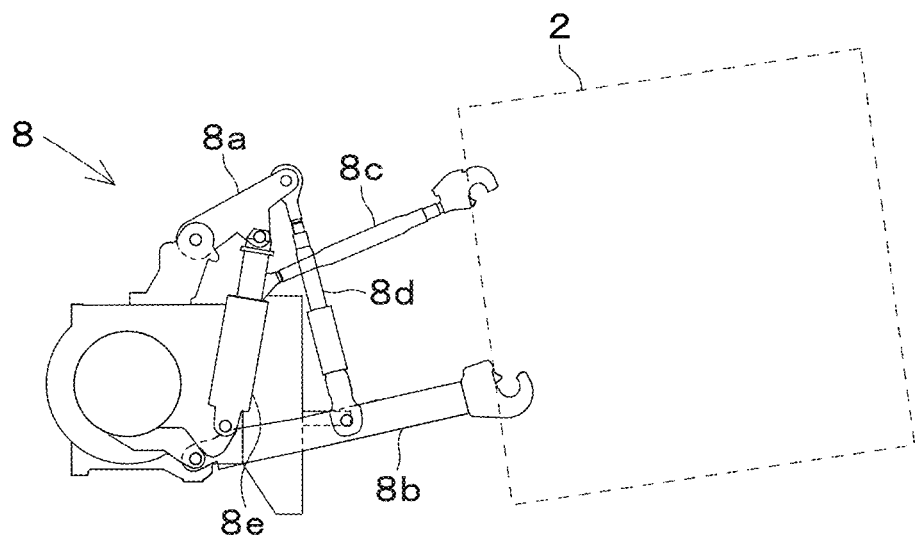
FIG. 10C illustrates the raising/lowering device and how the working device is raised and lowered.

FIGS. 10A to 10C illustrate the raising/lowering device 8 and how the working device 2 is raised and lowered. As illustrated in FIGS. 10A to 10C, the raising/lowering controller 40D causes the lift cylinders 8e of the raising/lowering device 8 to extend or retract to cause the lift arms 8a and the lower links 8b to ascend or descend, thereby causing the working device 2, which is linked to the rear portions of the lower links 8b and the rear portion of the top link 8c in a cantilevered manner, to swing up or down (raised or lowered) about the front portions of the lower links 8b.

FIG. 10A illustrates the working device 2 fully lowered by the raising/lowering device 8. FIG. 10C illustrates the working device 2 fully raised by the raising/lowering device 8. The raising/lowering controller 40D adjusts the degree of extension of the lift cylinders 8e, thereby setting the heightwise position of the working device 2 between the fully raised position in which the working device 2 is fully raised and the fully lowered position in which the working device 2 is fully lowered and placing the working device 2 in that heightwise position. FIG. 10B illustrates the working device 2 kept in an intermediate heightwise position by the raising/lowering device 8 by maintaining the lower links 8b and the top links 8c horizontal.

When work on the ground is performed with the working device 2, the raising/lowering controller 40D causes the raising/lowering device 8 to lower the working device 2 to set the working device 2 at a predetermined height close to the ground in the agricultural field. In such a case, the working device 2 contacts the ground in the agricultural field or is spaced above the ground in the agricultural field depending on the type of work on the ground and the specifications (type, shape, and/or the like) of the working device 2.

When work on the ground is not performed with the working device 2, the raising/lowering controller 40D causes the raising/lowering device 8 to raise the working device 2 to set the working device 2 at a predetermined height above the ground in the agricultural field. For example, the heightwise position (height above the ground or land surface) of the working device 2 when work on the ground is not performed with the working device 2 is set higher than the heightwise position of the working device 2 when work on the ground is performed with the working device 2.

FIGS. 11A to 11E illustrate an example of the traveling state of the agricultural machine 1 and the heightwise position of the working device 2. FIG. 12 shows an example of changes in the position of the agricultural machine 1 which is traveling and changes in the heightwise position of the working device 2.

The traveling state of the agricultural machine 1 and the heightwise position of the working device 2 shown in FIGS. 11A to 11E correspond to the traveling state of the agricultural machine 1 and the heightwise position of the working device 2 shown in FIG. 12. In the graph in FIG. 12, the horizontal axis represents the position of the traveling vehicle body 3 which is traveling, whereas the vertical axis represents the heightwise position (height above the land surface on which the traveling vehicle body 3 is located) of the working device 2. The thick solid line in the graph in FIG. 12 represents changes in the heightwise position of the working device 2 against the position of the agricultural machine 1 which is traveling (the same applies to FIG. 14 [described later]).

For example, as illustrated in FIGS. 11A to 11E, when the agricultural machine 1 (traveling vehicle body 3) is automatically operated to travel forward from the agricultural field H to go out of the agricultural field H to the agricultural road J through the upward-sloping entrance/exit SL, the raising/lowering controller 40D acquires the position of the traveling vehicle body 3 detected by the positioning device 41*k*. The raising/lowering controller 40D also acquires the positions and angles of slopes θh, θs, and θj of the agricultural field H, the entrance/exit SL, and the agricultural road J which are included in agricultural field information pre-acquired by the information acquirer 40I. The raising/lowering controller 40D also acquires information relating to the working device 2 which is pre-acquired by the information acquirer 40I.

Figure 11A:
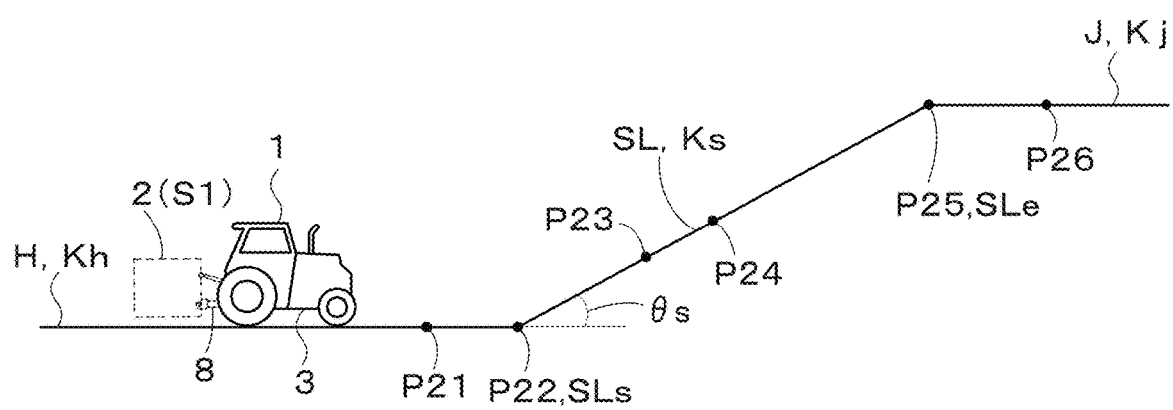
FIG. 11A illustrates an example of a traveling state of an agricultural machine and a heightwise position of a working device.
Figure 11B:
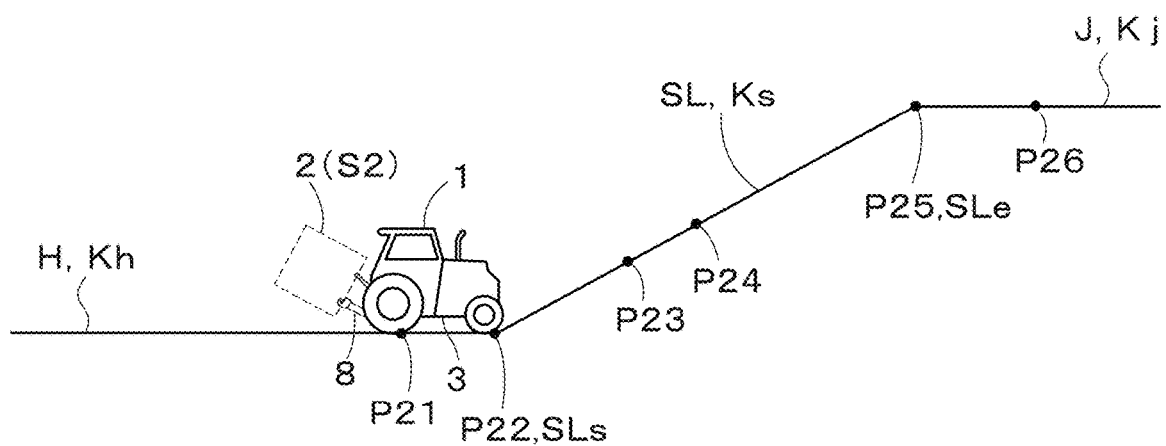
FIG. 11B illustrates an example of the traveling state of the agricultural machine and the heightwise position of the working device.
Figure 11C:
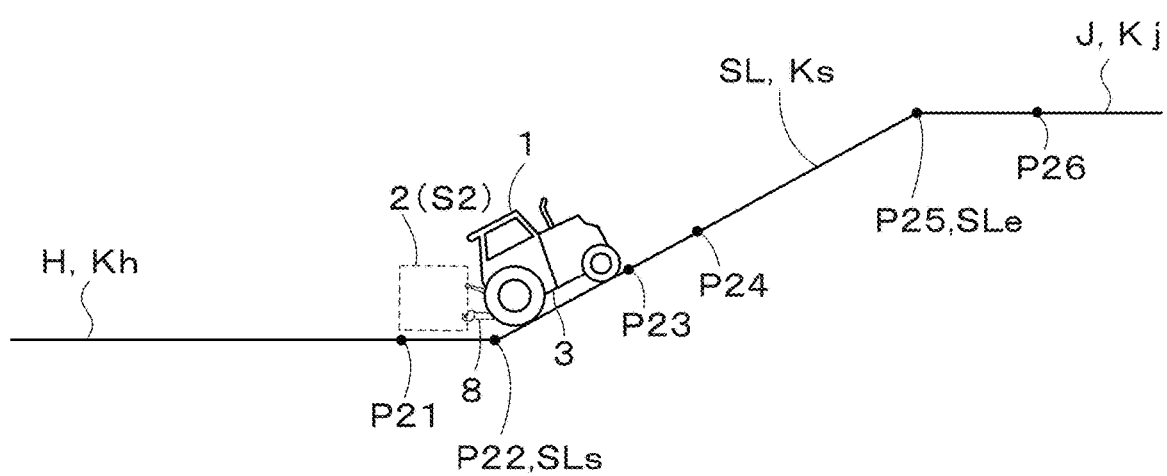
FIG. 11C illustrates an example of the traveling state of the agricultural machine and the heightwise position of the working device.

In the example shown in FIGS. 11A to 12, the automatic operation controller 40E performs a second operation control in which the automatic operation controller 40E controls the automatic operation of the traveling vehicle body 3 without causing the working device 2 to do work on the ground. That is, FIGS. 11A to 12 illustrate the traveling state of the agricultural machine 1 after the automatic operation controller 40E has changed the first operation control (in which the automatic operation controller 40E controls the automatic operation of the traveling vehicle body while causing the working device 2 to do work on the ground) to the second operation control.

For example, in the agricultural field H shown in FIG. 5H, the agricultural machine 1 (traveling vehicle body 3) tows the working device 2 and does work on the ground while traveling from the work start point ST1 to the work end point EN1. After the completion of the work on the ground, when the agricultural machine 1 (traveling vehicle body 3) travels from the work end point EN1 toward the entrance/exit SL, the raising/lowering controller 40D first causes the raising/lowering device 8 to set the heightwise position of the working device 2 to a first position S1.

The first position S1 is a position in which the working device 2 is spaced above the land surface Kh of the agricultural field H and is higher than the heightwise position of the working device 2 during work on the ground. That is, the first position S1 is for the traveling vehicle body 3 to travel after the completion of work on the ground while keeping the working device 2 out of contact with the land surface Kh of the agricultural field H. The first position S1 may be predetermined based on the specifications (shape and weight) of the working device 2 and/or the like included in the information relating to the working device 2 and stored in the memory 45 and/or the like as, for example, the heightwise position of the working device 2 not for work on the ground in the agricultural field H. The raising/lowering controller 40D may be configured to, when work on the ground in the agricultural field H is not performed, read the first position S1 from the memory 45 and/or the like and cause the raising/lowering device 8 to set the heightwise position of the working device 2 to the first position S1.

After the completion of work on the ground, when the traveling vehicle body 3 is traveling on the land surface Kh of the agricultural field H (first land surface) toward the land surface Ks of the sloping entrance/exit SL (second land surface) (the left side of point P22 in FIG. 11A), the raising/lowering controller 40D calculates, at predetermined intervals, the distance from the position of the traveling vehicle body 3 to the start point SLs (point P22) of the entrance/exit SL (calculates changes in the position of the traveling vehicle body 3 relative to the entrance/exit SL). Next, the raising/lowering controller 40D causes the raising/lowering device 8 to set (change) the heightwise position of the working device 2 based on the angle of slope θs of the entrance/exit SL and the distance from the position of the traveling vehicle body 3 to the start point SLs.

Specifically, once the distance from the position of the traveling vehicle body 3 to the start point SLs of the entrance/exit SL has become less than a first threshold (FIGS. 11A to 11C and the area between points P21 and P22 in FIG. 12), the raising/lowering controller 40D causes the raising/lowering device 8 to set the heightwise position of the working device 2 to a second position S2 based on the angle of slope θs of the entrance/exit SL. That is, once the distance from the position of the traveling vehicle body 3 to the start point SLs of the entrance/exit SL (point P22) has become less than the first threshold, the raising/lowering controller 40D starts causing the raising/lowering device 8 to change the heightwise position of the working device 2 from the first position S1 to the second position S2.

The second position S2 is a position in which the working device 2 is spaced above the land surface Kh and is higher than the first position S1. The second position S2 is decided so that, when the traveling vehicle body 3 travels from the agricultural field H to the entrance/exit SL and the working device 2 moves from a space above the land surface Kh of the agricultural field H to a space above the land surface Ks of the entrance/exit SL, the working device 2 in this position will not contact the land surface Kh and will not raise the center of gravity of the agricultural machine 1 to the extent that the stability of the agricultural machine 1 decreases.

The raising/lowering controller 40D calculates such a second position S2 based on the angle of slope θs of the entrance/exit SL and the specifications of the working device 2, and controls the degree of extension of the lift cylinders 8e of the raising/lowering device 8 so that the working device 2 is placed in the second position S2. The raising/lowering controller 40D causes the raising/lowering device 8 to cause the working device 2 to gradually swing (move) upward as the traveling vehicle body 3 approaches the start point SLs based on the angle of slope θs of the entrance/exit SL and the distance from the position of the traveling vehicle body 3 to the start point SLs of the entrance/exit SL, to place the working device 2 in the second position S2 (area between points P21 and P22 in FIG. 12, and FIG. 11B). For example, when the position of the traveling vehicle body 3 reaches the start point SLs of the entrance/exit SL, the working device 2 reaches the second position S2.

That is, the raising/lowering controller 40D causes the raising/lowering device 8 to set the heightwise position of the working device 2 to the second position S2 so that the working device 2 does not contact the land surface Kh of the agricultural field H or the land surface Ks of the entrance/exit SL while the posture of the traveling vehicle body 3 changes during a period from when the front wheels of the traveling vehicle body 3 pass through the start point SLs of the entrance/exit SL to when the rear wheels of the traveling vehicle body 3 pass through the start point SLs. With this, the heightwise position of the working device 2 is switched between at least two positions (at least the first position S1 and the second position S2) within a period from when the agricultural machine 1 (traveling vehicle body 3) starts traveling from a point EN1 (FIG. 5H) at which the work on the ground ends to when the agricultural machine 1 (traveling vehicle body 3) reaches the entrance/exit SL. When the working device 2 is switched between its heightwise positions, the first position S1 is set so that the traveling vehicle body 3 will travel while keeping the working device 2 out of contact with the ground regardless of the angle of slope θs, whereas the second position S2 is set according to the angle of slope θs of the entrance/exit SL.

Once the traveling vehicle body 3 has started traveling up the entrance/exit SL (traveling up a slope), the raising/lowering controller 40D calculates, at predetermined intervals, the distance from the position of the traveling vehicle body 3 to the start point SLs and the distance from the position of the traveling vehicle body 3 to the end point SLe of the entrance/exit SL (point P25) (calculates changes in the position of the traveling vehicle body 3 relative to the entrance/exit SL). Next, the raising/lowering controller 40D causes the raising/lowering device 8 to set the heightwise position of the working device 2 based on the angle of slope θs of the entrance/exit SL and the distance from the position of the traveling vehicle body 3 to the start point SLs and the distance from the position of the traveling vehicle body 3 to the end point SLe.

Specifically, when the distance from the traveling vehicle body 3 to the start point SLs of the entrance/exit SL is less than a second threshold after the traveling vehicle body 3 started traveling up the entrance/exit SL (traveling up a slope) (FIG. 11C and the area between points P22 and P23 in FIG. 12), the raising/lowering controller 40D causes the raising/lowering device 8 to maintain the position of the working device 2 at the second position S2.

Next, once the distance from the position of the traveling vehicle body 3 to the start point SLs of the entrance/exit SL has become equal to or greater than the second threshold (FIGS. 11D and 11E, and point P23 in FIG. 12), the raising/lowering controller 40D causes the raising/lowering device 8 to set the heightwise position of the working device 2 to a third position S3 based on the angle of slope θs of the entrance/exit SL.

The third position S3 is lower than the second position S2 but is higher than the first position S1. The third position S3 is decided so that, when the traveling vehicle body 3 travels on the entrance/exit SL, the working device 2 in this position will not contact the land surface Ks of the entrance/exit SL and will not raise the center of gravity of the agricultural machine 1 to the extent that the stability of the agricultural machine 1 decreases.

The raising/lowering controller 40D calculates such a third position S3 based on the angle of slope θs of the entrance/exit SL and the specifications of the working device 2, and controls the degree of extension of the lift cylinders 8e of the raising/lowering device 8 so that the working device 2 is placed in the third position S3. The raising/lowering controller 40D causes the raising/lowering device 8 to cause the working device 2 to gradually swing (move) downward as the traveling vehicle body 3 goes away from the start point SLs based on the angle of slope θs of the entrance/exit SL and the distance from the position of the traveling vehicle body 3 to the start point SLs of the entrance/exit SL, to place the working device 2 in the third position S3 (FIG. 11D and the area between points P23 and P24 in FIG. 12).

After that, while the traveling vehicle body 3 is traveling up the entrance/exit SL (traveling up a slope) (FIG. 11D and the area between points P24 and P25 in FIG. 12), the raising/lowering controller 40D causes the raising/lowering device 8 to maintain the heightwise position of the working device 2 at the third position S3.

Then, once the traveling vehicle body 3 has traveled out of the entrance/exit SL (FIGS. 11D and 11E, and point P25 in FIG. 12), the raising/lowering controller 40D causes the raising/lowering device 8 to set the heightwise position of the working device 2 to a fourth position S4.

The fourth position S4 is a position in which the working device 2 is spaced above the land surface Kj of the agricultural road J and is lower than the third position S3. The fourth position S4 may be preset based on the specifications of the working device 2 and/or the like and stored in the memory 45 and/or the like as, for example, the heightwise position of the working device 2 for the agricultural road J. The raising/lowering controller 40D may be configured or programmed to, when traveling on the agricultural road J, read the fourth position S4 from the memory 45 and cause the raising/lowering device 8 to set the heightwise position of the working device 2 to the fourth position S4.

Figure 11D:
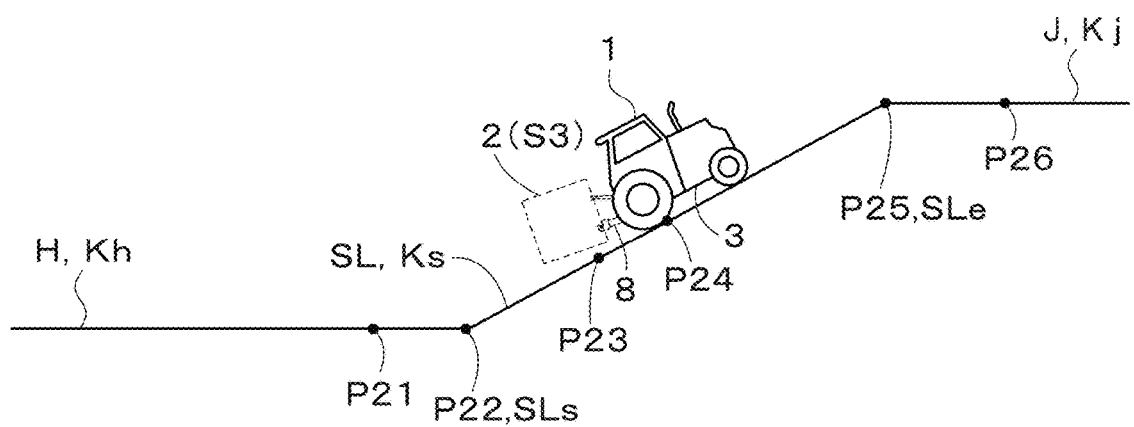
FIG. 11D illustrates an example of the traveling state of the agricultural machine and the heightwise position of the working device.
Figure 11E:
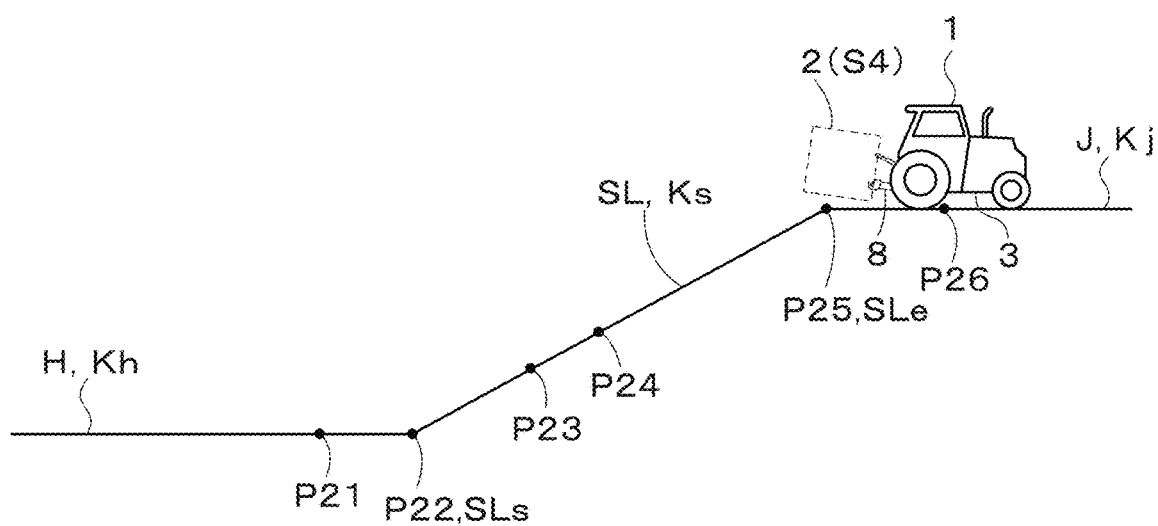
FIG. 11E illustrates an example of the traveling state of the agricultural machine and the heightwise position of the working device.

The raising/lowering controller 40D causes the raising/lowering device 8 to cause the working device 2 to gradually swing downward as the traveling vehicle body 3 goes away from the entrance/exit SL based on the distance from the position of the traveling vehicle body 3 to the end point SLe of the entrance/exit SL, to place the working device 2 in the fourth position S4 (FIGS. 11D and 11E, and the area between points P25 and P26 in FIG. 12).

After that, while the traveling vehicle body 3 is traveling on the agricultural road J (the right side of point P26 in FIG. 11E and FIG. 12), the raising/lowering controller 40D causes the raising/lowering device 8 to maintain the heightwise position of the working device 2 at the fourth position S4.

The heightwise positions S1 to S4 of the working device 2 as described above are examples, and do not imply any limitation. For example, the third position S3 of the working device 2 while the traveling vehicle body 3 is traveling on the sloping entrance/exit SL may be the same as the first position S1 or lower than the first position S1 relative to the traveling vehicle body 3. The fourth position S4 may be the same as the first position S1 or lower than the first position S1 relative to the traveling vehicle body 3, or may be the same as the third position S3 or higher than the third position S3 relative to the traveling vehicle body 3. When the traveling vehicle body 3 is traveling on a land surface of the agricultural field H, the agricultural road J, or the like that is far away from the entrance/exit SL of the agricultural field H without doing work on the ground, the raising/lowering device 8 may set the heightwise position of the working device 2 to a position differing from the first position S1 or the fourth position S4.

FIGS. 13A to 13F illustrate another example of the traveling state of the agricultural machine 1 and the heightwise position of the working device 2. FIG. 14 shows another example of changes in the position of the agricultural machine 1 which is traveling and changes in the heightwise position of the working device 2. The traveling state of the agricultural machine 1 and the heightwise position of the working device 2 shown in FIGS. 13A to 13F correspond to the traveling state of the agricultural machine 1 and the heightwise position of the working device 2 shown in FIG. 14.

For example, as illustrated in FIGS. 13A to 13F, when the agricultural machine 1 is automatically operated to travel forward from the agricultural road J to enter the agricultural field H through the downward-sloping entrance/exit SL, the raising/lowering controller 40D acquires the position of the traveling vehicle body 3 detected by the positioning device 41*k*. The raising/lowering controller 40D also acquires the positions and angles of slopes θj, θs, and θh of the agricultural road J, the entrance/exit SL, and the agricultural field H that are included in the agricultural field information pre-acquired by the information acquirer 40I. The raising/lowering controller 40D also acquires information relating to the working device 2 which is pre-acquired by the information acquirer 40I.

Figure 13A:
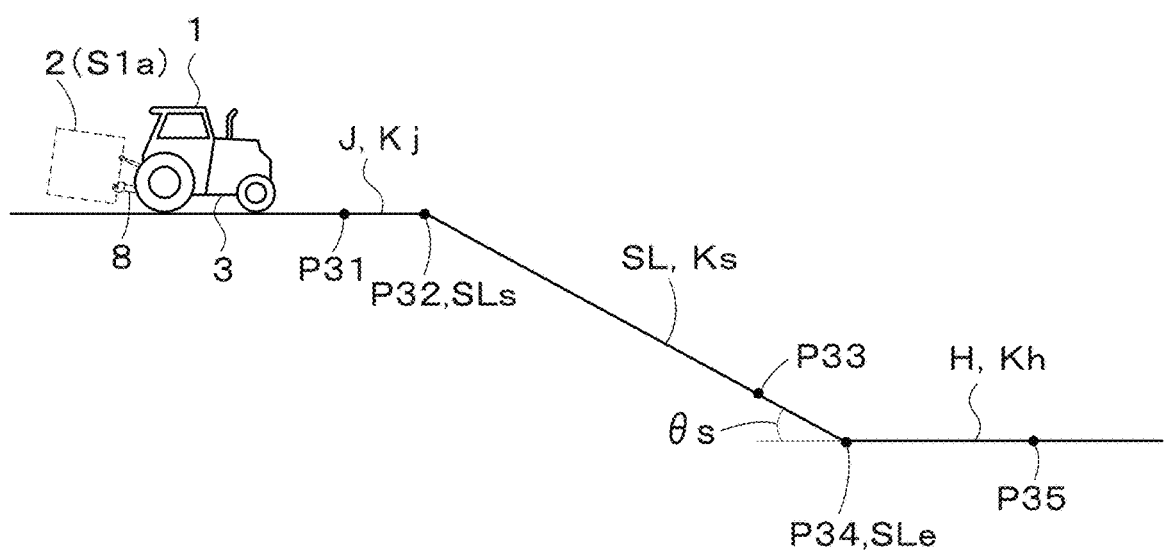
FIG. 13A illustrates another example of the traveling state of the agricultural machine and the heightwise position of the working device.
Figure 13B:
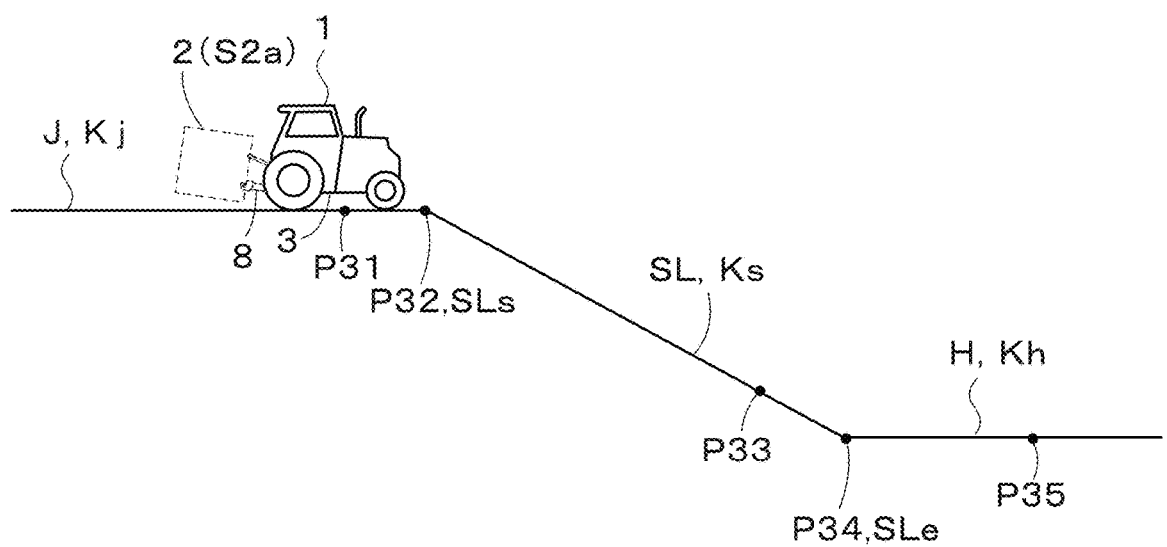
FIG. 13B illustrates another example of the traveling state of the agricultural machine and the heightwise position of the working device.
Figure 13C:
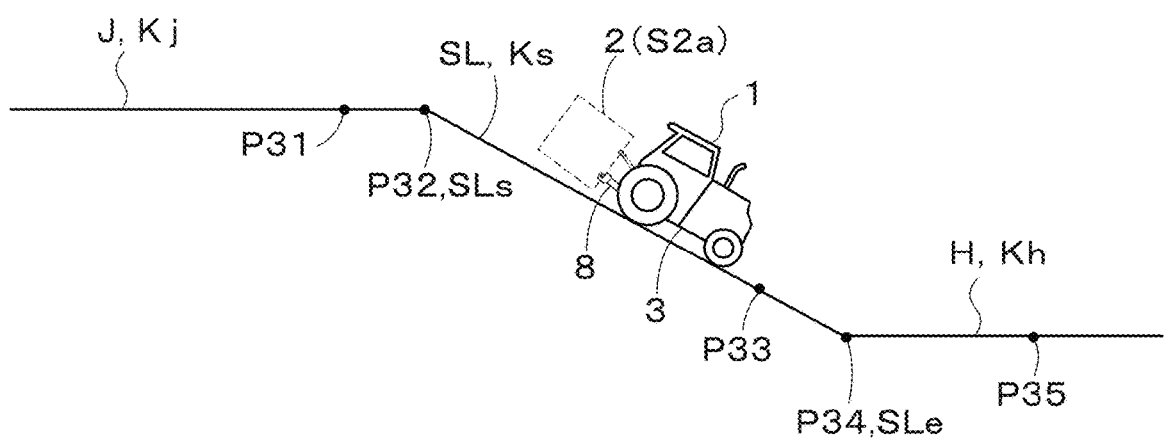
FIG. 13C illustrates another example of the traveling state of the agricultural machine and the heightwise position of the working device.
Figure 13D:
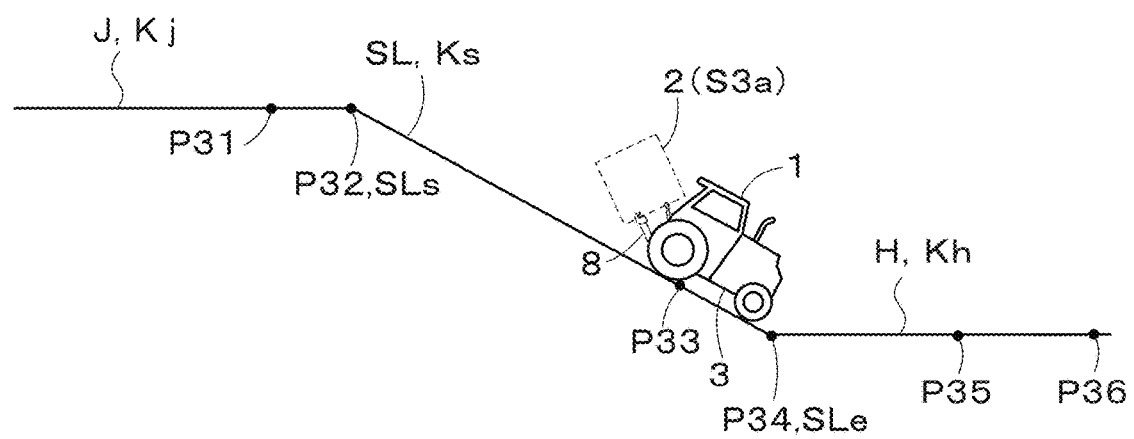
FIG. 13D illustrates another example of the traveling state of the agricultural machine and the heightwise position of the working device.
Figure 13E:
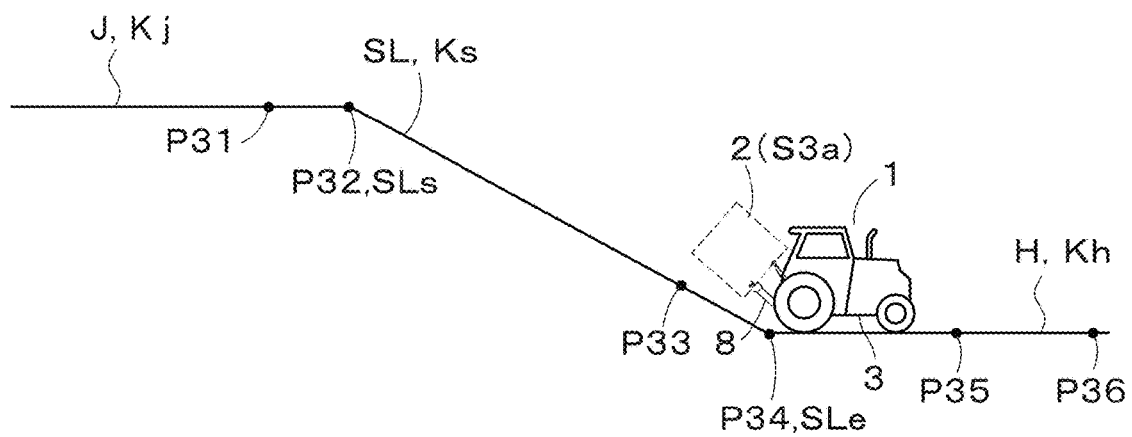
FIG. 13E illustrates another example of the traveling state of the agricultural machine and the heightwise position of the working device.
Figure 13F:
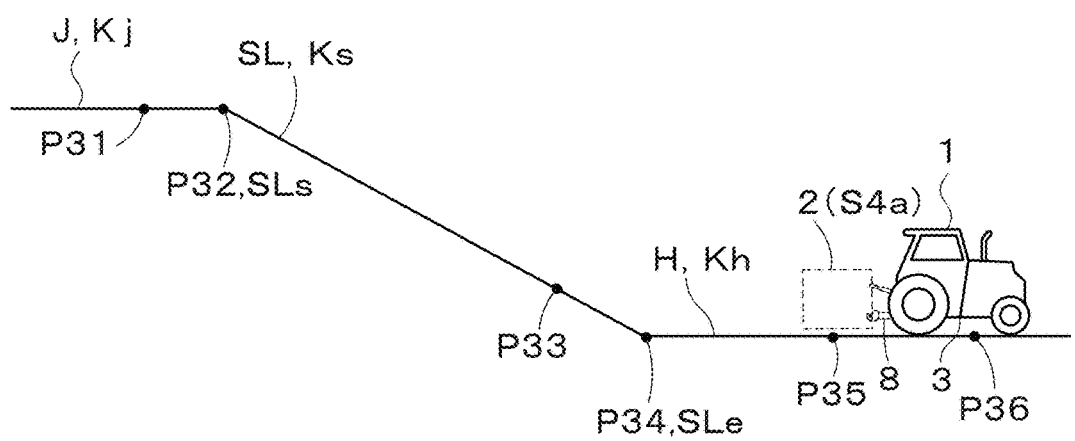
FIG. 13F illustrates another example of the traveling state of the agricultural machine and the heightwise position of the working device.
Figure 14:
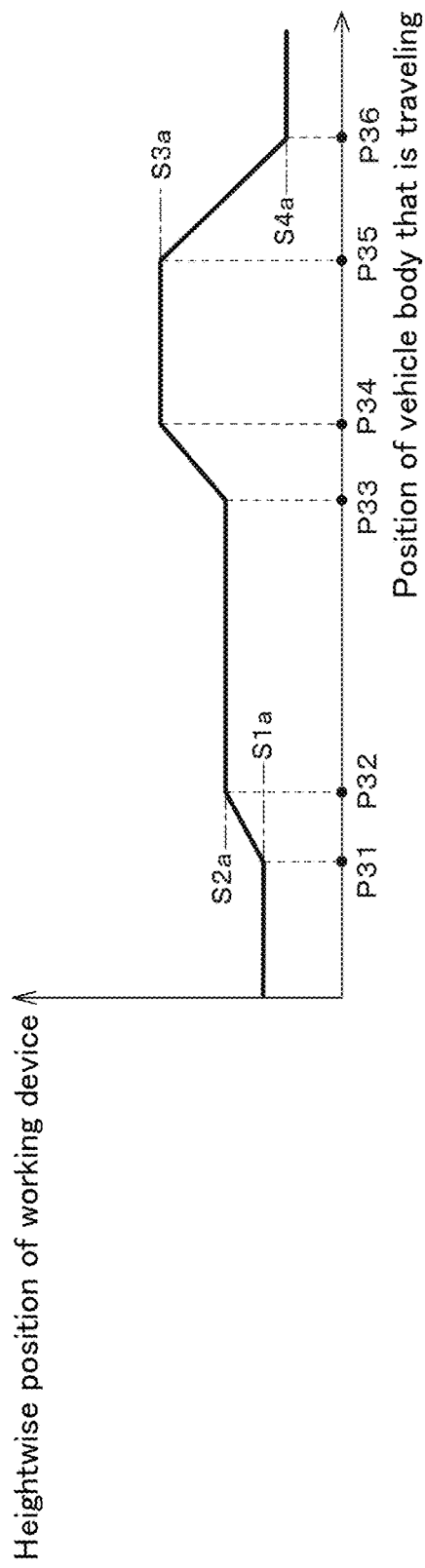
FIG. 14 shows another example of changes in position of the agricultural machine which is traveling and changes in heightwise position of the working device.

In the example shown in FIGS. 13A to 14, the automatic operation controller 40E performs a second operation control in which the automatic operation controller 40E controls the automatic operation of the traveling vehicle body 3 without causing the working device 2 to do work on the ground. That is, FIGS. 13A to 14 illustrate the traveling state of the agricultural machine 1 before the automatic operation controller 40E changes the second operation control to the first operation control (in which the automatic operation controller 40E controls the automatic operation of the traveling vehicle body while causing the working device 2 to do work on the ground).

When the agricultural machine 1 (traveling vehicle body 3) travels on the agricultural road J toward the sloping entrance/exit SL, the raising/lowering controller 40D first causes the raising/lowering device 8 to set the heightwise position of the working device 2 to a first position S1*a*. The first position S1*a* is a position in which the working device 2 is spaced above the land surface Kj of the agricultural road J and is higher than the heightwise position of the working device 2 during work on the ground. That is, the first position S1*a* is for the traveling vehicle body 3 to travel while maintaining the working device 2 out of contact with the land surface Kj of the agricultural road J. The first position S1*a* may be pre-set based on the specifications of the working device 2 and/or the like and stored in the memory 45 and/or the like as, for example, the heightwise position of the working device 2 for the agricultural road J. The raising/lowering controller 40D may be configured to, when traveling on the agricultural road J, read the first position S1*a* from the memory 45 and cause the raising/lowering device 8 to set the heightwise position of the working device 2 to the first position S1*a*.

When the traveling vehicle body 3 is traveling on the land surface Kj of the agricultural road J (first land surface) toward the land surface Ks of the sloping entrance/exit SL (second land surface) (the left side of point P32 in FIG. 13A), the raising/lowering controller 40D calculates, at predetermined intervals, the distance from the position of the traveling vehicle body 3 to the start point SLs (point P32) of the entrance/exit SL (calculates changes in the position of the traveling vehicle body 3 relative to the entrance/exit SL). Next, the raising/lowering controller 40D causes the raising/lowering device 8 to set (change) the heightwise position of the working device 2 based on the angle of slope θs of the entrance/exit SL and the distance from the position of the traveling vehicle body 3 to the start point SLs.

Specifically, once the distance from the position of the traveling vehicle body 3 to the start point SLs of the entrance/exit SL has become less than a first threshold (FIGS. 13A to 13C and the area between point P31 and point P32 in FIG. 14), the raising/lowering controller 40D causes the raising/lowering device 8 to set the heightwise position of the working device 2 to a second position S2*a* based on the angle of slope θs of the entrance/exit SL. That is, once the distance from the position of the traveling vehicle body 3 to the start point SLs of the entrance/exit SL (point P32) has become less than the first threshold, the raising/lowering controller 40D starts causing the raising/lowering device 8 to change the heightwise position of the working device 2 from the first position S1*a* to the second position S2*a*.

The second position S2*a* is a position in which the working device 2 is spaced above the land surface Kj of the agricultural road J and is higher than the first position S1*a*. The second position S2*a* is decided so that, when the traveling vehicle body 3 travels from the agricultural road J to the entrance/exit SL and the working device 2 moves from a space above the land surface Kj of the agricultural road J to a space above the land surface Ks of the entrance/exit SL, the working device 2 in this position will not contact the land surface Kj and will not raise the center of gravity of the agricultural machine 1 to the extent that the stability of the agricultural machine 1 decreases.

The raising/lowering controller 40D calculates such a second position S2*a* based on the angle of slope θs of the entrance/exit SL and the specifications of the working device 2, and controls the degree of extension of the lift cylinders 8*e* of the raising/lowering device 8 so that the working device 2 is placed in the second position S2*a*. The raising/lowering controller 40D causes the raising/lowering device 8 to cause the working device 2 to gradually swing upward as the traveling vehicle body 3 approaches the start point SLs based on the angle of slope θs of the entrance/exit SL and the distance from the position of the traveling vehicle body 3 to the start point SLs of the entrance/exit SL, to place the working device 2 in the second position S2*a* (area between points P31 and P32 in FIG. 14). For example, when the position of the traveling vehicle body 3 reaches the start point SLs (point P32) of the entrance/exit SL, the working device 2 reaches the second position S2a.

That is, the raising/lowering controller 40D causes the raising/lowering device 8 to set the heightwise position of the working device 2 to the second position S2 so that the working device 2 does not contact the land surface Kj of the agricultural road J or the land surface Ks of the entrance/exit SL while the posture of the traveling vehicle body 3 changes during a period from when the front wheels of the traveling vehicle body 3 pass through the start point SLs of the entrance/exit SL to when the rear wheels of the traveling vehicle body 3 pass through the start point SLs. With this, the heightwise position of the working device 2 is switched between at least two positions (at least the first position S1a and the second position S2a) before the agricultural machine 1 (traveling vehicle body 3) traveling on the agricultural road J reaches the entrance/exit SL. When the working device 2 is switched between its heightwise positions, the first position S1a is set so that the traveling vehicle body 3 will travel while keeping the working device 2 out of contact with the ground regardless of the angle of slope θs, whereas the second position S2a is set according to the angle of slope θs of the entrance/exit SL.

Once the traveling vehicle body 3 has started traveling down the entrance/exit SL (traveling down a slope), the raising/lowering controller 40D calculates, at predetermined intervals, the distance from the position of the traveling vehicle body 3 to the end point SLe of the entrance/exit SL (point P34) (calculates changes in the position of the traveling vehicle body 3 relative to the entrance/exit SL). Next, the raising/lowering controller 40D causes the raising/lowering device 8 to set the heightwise position of the working device 2 based on the angle of slope θs of the entrance/exit SL and the distance from the position of the traveling vehicle body 3 to the end point SLe.

Specifically, while the distance from the traveling vehicle body 3 to the end point SLe of the entrance/exit SL is equal to or greater than a second threshold after the traveling vehicle body 3 started traveling down the entrance/exit SL (traveling down a slope) (FIG. 13C and the area between points P32 and P33 in FIG. 14), the raising/lowering controller 40D causes the raising/lowering device 8 to maintain the heightwise position of the working device 2 at the second position S2a. Note that the second threshold for downward travel may be the same as or different from the second threshold for upward travel.

Next, once the distance from the position of the traveling vehicle body 3 to the end point SLe of the entrance/exit SL has become less than the second threshold (FIG. 13D and the area between points P33 and P34 in FIG. 14), the raising/lowering controller 40D causes the raising/lowering device 8 to set the heightwise position of the working device 2 to a third position S3a based on the angle of slope θs of the entrance/exit SL. That is, once the distance from the position of the traveling vehicle body 3 to the end point SLe of the entrance/exit SL (point P34) has become less than the second threshold, the raising/lowering controller 40D starts causing the raising/lowering device 8 to change the heightwise position of the working device 2 from the second position S2a to the third position S3a.

The third position S3a is higher than the second position S2a. The third position S3a is decided so that, when the traveling vehicle body 3 travels on the entrance/exit SL, the working device 2 in this position will not contact the land surface Ks of the entrance/exit SL and will not raise the center of gravity of the agricultural machine 1 to the extent that the stability of the agricultural machine 1 decreases.

The raising/lowering controller 40D calculates such a third position S3a based on the angle of slope θs of the entrance/exit SL and the specifications of the working device 2, and controls the degree of extension of the lift cylinders 8e of the raising/lowering device 8 so that the working device 2 is placed in the third position S3a. The raising/lowering controller 40D causes the raising/lowering device 8 to cause the working device 2 to gradually swing upward as the traveling vehicle body 3 approaches the end point SLe based on the angle of slope θs of the entrance/exit SL and the distance from the position of the traveling vehicle body 3 to the end point SLe of the entrance/exit SL, to place the working device 2 in the third position S3a (the area between points P33 and P34 in FIG. 14). For example, when the position of the traveling vehicle body 3 reaches the end point SLe (point P34) of the entrance/exit SL, the working device 2 reaches the third position S3a.

That is, the raising/lowering controller 40D causes the raising/lowering device 8 to set the heightwise position of the working device 2 to the third position S3a so that the working device 2 does not contact the land surface Ks of the entrance/exit SL or the land surface Kh of the agricultural field H while the posture of the traveling vehicle body 3 changes during a period from when the front wheels of the traveling vehicle body 3 pass through the end point SLe of the entrance/exit SL to when the rear wheels of the traveling vehicle body 3 pass through the end point SLe. With this, the heightwise position of the working device 2 is switched between at least three positions (at least the first position S1a, the second position S2a, and the third position S3a) before the agricultural machine 1 (traveling vehicle body 3) traveling on the agricultural road J reaches the agricultural field H through the entrance/exit SL. With the working device 2 is switched between its heightwise positions, the third position S3a is set according to the angle of slope θs of the entrance/exit SL.

After the traveling vehicle body 3 travels out of the entrance/exit SL and starts traveling on the agricultural field H, while the distance from the position of the traveling vehicle body 3 to the end point SLe of the entrance/exit SL is less than a second threshold (FIG. 13E and the area between points P34 and P35 in FIG. 14), the raising/lowering controller 40D causes the raising/lowering device 8 to maintain the heightwise position of the working device 2 at the third position S3a.

Next, once the distance from the position of the traveling vehicle body 3 to the end point SLe of the entrance/exit SL has become equal to or greater than the second threshold (FIG. 13F and the area on the right side of point P35 in FIG. 14), the raising/lowering controller 40D causes the raising/lowering device 8 to set the heightwise position of the working device 2 to a fourth position S4a.

The fourth position S4a is a position in which the working device 2 is spaced above the land surface Kh of the agricultural field H and is lower than the third position S3a. The fourth position S4a may be predetermined based on the specifications of the working device 2 and/or the like and stored in the memory 45 and/or the like as, for example, the heightwise position of the working device 2 not for work on the ground in the agricultural field H. The raising/lowering controller 40D may be configured to, when work on the ground is not performed in the agricultural field H, read the fourth position S4a from the memory 45 and/or the like and cause the raising/lowering device 8 to set the heightwise position of the working device 2 to the fourth position S4a.

The raising/lowering controller 40D causes the raising/lowering device 8 to cause the working device 2 to gradually swing downward as the traveling vehicle body 3 goes away from the entrance/exit SL based on the distance from the position of the traveling vehicle body 3 to the end point SLe of the entrance/exit SL (based on changes in position of the traveling vehicle body 3 relative to the entrance/exit SL), to place the working device 2 in the fourth position S4*a* (the area between points P35 and P36 in FIG. 14).

After that, while the traveling vehicle body 3 is traveling on the agricultural field H without going toward the entrance/exit SL (the right side of point P36 in FIG. 14), the raising/lowering controller 40D causes the raising/lowering device 8 to maintain the heightwise position of the working device 2 at the fourth position S4*a* while work on the ground is not performed with the working device 2.

The heightwise positions S1*a* to S4*a* of the working device 2 as described above are examples, and do not imply any limitation. For example, the second position S2*a* may be the same as the first position S1*a* or lower than the first position S1*a* relative to the traveling vehicle body 3 for the purpose of, for example, preventing the center of gravity of the agricultural machine 1 from being raised and the agricultural machine 1 becoming unstable when the agricultural machine 1 travels down the entrance/exit SL (travels town a slope). The fourth position S4*a* may be the same as the first position S1*a* or lower than the first position S1*a* relative to the traveling vehicle body 3, and may be the same as the second position S2*a* or higher than the second position S2*a* relative to the traveling vehicle body 3. When the traveling vehicle body 3 is traveling on a land surface of the agricultural field H, the agricultural road J, or the like that is far away from the entrance/exit SL of the agricultural field H while doing no work on the ground, the raising/lowering device 8 may set the heightwise position of the working device 2 to a position differing from the fourth position S4*a* or the first position S1*a*.

The raising/lowering controller 40D may change, based on the angle of slope θs of the entrance/exit SL and/or the specifications (such as front-rear dimension, height, weight, and/or shape) of the working device 2, the first to fourth thresholds which are to be compared with changes in the position of the traveling vehicle body 3 relative to the entrance/exit SL (distance and direction). By changing the first to fourth thresholds, it is possible to adjust the durations in which the heightwise positions S1 to S4 and S1*a* to S4*a* of the working device 2 are set.

In the above-described preferred embodiment, an example case is discussed in which the raising/lowering device 8 is caused to raise or lower the working device 2 when the agricultural machine 1 travels on the sloping entrance/exit SL of the agricultural field H and before and after the agricultural machine 1 travels on the sloping entrance/exit SL. Note, however, that the raising/lowering device 8 may be caused to raise or lower the working device 2 also when the agricultural machine 1 travels on a sloping land surface other than the entrance/exit SL of the agricultural field H and before and after the agricultural machine 1 travels on a sloping land surface other than the entrance/exit SL based on the angle of slope of the land surface, changes in position of the traveling vehicle body 3 relative to the land surface, the specifications of the working device 2, and/or the like as described above.

In the above-described preferred embodiment, an example case is discussed in which the working device 2 is linked at the rear of the traveling vehicle body 3 of the agricultural machine 1. Note, however, that working device (s) linked at the front and/or the rear of a traveling vehicle body of an agricultural machine may be raised or lowered according to, for example, the conditions of land surface(s) on which the agricultural machine travels.

In the above-described preferred embodiment, an example case is discussed in which, when the agricultural machine 1 is automatically operated to travel forward, the working device 2 is automatically raised or lowered according to, for example, the conditions of land surfaces on which the agricultural machine 1 travels. Note, however, that also when, for example, the agricultural machine 1 is manually operated to travel forward or rearward or when automatically operated to travel rearward, the working device 2 may be automatically raised or lowered according to, for example, the conditions of land surfaces on which the agricultural machine 1 travels.

The agricultural machine 1 according to the present preferred embodiment as has been discussed may include the following features and achieves the following effects.

An agricultural machine 1 according to a preferred embodiment includes a traveling vehicle body 3 to travel, a detector 41L to detect objects in a surrounding area of the traveling vehicle body 3, a detection adjuster 40H to adjust a detection direction of the detector 41L, a positioning device 41*k* to detect a position of the traveling vehicle body 3, and an information acquirer 40I to acquire information relating to an entrance/exit SL of an agricultural field H, wherein the detection adjuster 40H is operable to perform a first adjustment when the traveling vehicle body 3 is traveling toward the entrance/exit SL and a distance from the position of the traveling vehicle body 3 detected by the positioning device 41*k* to a position of the entrance/exit SL included in the information relating to the entrance/exit SL acquired by the information acquirer 40I is equal to or less than a predetermined value, the first adjustment being an adjustment in which the detection adjuster 40H orients the detection direction toward an end point SLe of the entrance/ exit SL, and a second adjustment when the traveling vehicle body 3 is traveling on the entrance/exit SL, the second adjustment being an adjustment in which the detection adjuster 40H orients the detection direction toward the end point SLe of the entrance/exit SL or a space forward of the end point SLe in a direction of travel of the traveling vehicle body 3.

With this, when the traveling vehicle body 3 of the agricultural machine 1 travels and approaches the entrance/ exit SL of the agricultural field H, the detection direction of the detector 41L is oriented toward the end point SLe of the entrance/exit SL, whereas when the traveling vehicle body 3 is traveling on the entrance/exit SL, the detection direction is oriented toward the end point SLe of the entrance/exit SL or a space forward of the end point SLe. This makes it possible to detect, with the detector 41L, objects located on the entrance/exit SL and objects located forward of the entrance/exit SL. This makes it possible to achieve high detection performance of the detector 41L even if changes occur in the conditions (such as angles of slope θh and θs) of the land surfaces Kh and Ks of the agricultural field H, the entrance/exit SL, and/or the like on which the agricultural machine 1 travels, and achieve stable travel of the agricultural machine 1.

In a preferred embodiment, the detection adjuster 40H may perform a third adjustment when the traveling vehicle body 3 is traveling on the entrance/exit SL and a distance from the position of the traveling vehicle body 3 to the end point SLe of the entrance/exit SL is equal to or less than a predetermined value, the third adjustment being an adjustment in which the detection adjuster 40H orients the detection direction toward a space forward of the end point SLe of the entrance/exit SL in the direction of travel of the traveling vehicle body 3. The detection adjuster 40H may perform a fourth adjustment when the traveling vehicle body 3 has traveled out of the entrance/exit SL, the fourth adjustment being an adjustment in which the detection adjuster 40H orients the detection direction toward a space forward of the traveling vehicle body 3 in the direction of travel of the traveling vehicle body 3.

With this, when the traveling vehicle body 3 of the agricultural machine 1 travels on the entrance/exit SL of the agricultural field H and approaches the end point SLe of the entrance/exit SL, the detection direction of the detector 41L is oriented toward a space forward of the end point SLe of the entrance/exit SL, whereas when the traveling vehicle body 3 has traveled out of the entrance/exit SL, the detection direction is oriented toward a space forward of the traveling vehicle body 3. This makes it possible to detect, with the detector 41L, objects located forward of the entrance/exit SL. This makes it possible to achieve high detection performance of the detector 41L even if changes occur in the conditions of the land surfaces Ks and Kj of the entrance/exit SL, the agricultural road J located forward of the entrance/exit SL, and/or the like on which the agricultural machine 1 travels, and achieve stable travel of the agricultural machine 1.

In a preferred embodiment, the agricultural machine 1 may further include an automatic operation controller 40E to perform a first operation control in which the automatic operation controller 40E controls automatic operation of the traveling vehicle body 3 while causing a working device 2 linked to the traveling vehicle body 3 to do work on a ground, and a second operation control in which the automatic operation controller 40E controls the automatic operation of the traveling vehicle body 3 without causing the working device 2 to do work on the ground. Before the automatic operation controller 40E changes the second operation control to the first operation control or after the automatic operation controller 40E changes the first operation control to the second operation control, when the traveling vehicle body 3 is traveling toward the entrance/exit SL under the second operation control and a distance from the position of the traveling vehicle body 3 to a start point SLs of the entrance/exit SL is equal to or less than a predetermined value, the detection adjuster 40H may perform the first adjustment to orient at least some of a plurality of the detection directions toward the end point SLe of the entrance/exit SL and a portion of land surfaces (Ks and Kh) or (Ks and Kj) in the vicinity of the end point SLe by causing a detection range E of the detector 14L to move upward or downward. When the traveling vehicle body 3 is traveling on the entrance/exit SL under the second operation control, the detection adjuster 40H may perform the second adjustment to orient at least some of the plurality of detection directions toward the end point SLe of the entrance/exit SL and/or a portion of land surfaces (Ks and Kh) or (Ks and Kj) in the vicinity of the end point SLe by causing the detection range E to move upward or downward.

With this, in the case where the agricultural machine 1 enters the agricultural field H under the second operation control before the agricultural machine 1 does work on the ground in the agricultural filed H under the first operation control or in the case where the agricultural machine 1 goes out of the agricultural field H under the second operation control after the agricultural machine 1 does work on the ground in the agricultural filed H under the first operation control, when the traveling vehicle body 3 approaches the entrance/exit SL, the detection range E of the detector 41L moves upward or downward and at least some of the detection directions of the detector 41L are oriented toward the end point SLe of the entrance/exit SL and a portion of the land surfaces Ks and Kh or the land surfaces Ks and Kj in the vicinity of the end point SLe. When the traveling vehicle body 3 is traveling on the entrance/exit SL under the second operation control, the detection range E moves upward or downward and at least some of the detection directions are oriented toward the end point SLe of the entrance/exit SL and/or a portion of land surfaces Ks and Kh or the land surfaces Ks and Kj in the vicinity of the end point SLe. This makes it possible to detect, with the detector 41L, objects located on the entrance/exit SL and objects located forward of the entrance/exit S before and while the agricultural machine 1 travels on the entrance/exit SL under the second operation control, making it possible to achieve high detection performance of the detector 41L and achieve stable travel of the agricultural machine 1.

In a preferred embodiment, the detection adjuster 40H may perform a third adjustment when the traveling vehicle body 3 is traveling on the entrance/exit SL under the second operation control and a distance from the position of the traveling vehicle body 3 to the end point SLe of the entrance/exit SL is equal to or less than a predetermined value, the third adjustment being an adjustment in which the detection adjuster 40H orients at least some of the plurality of detection directions toward a space forward of the end point SLe of the entrance/exit SL and a land surface Kh, Kj that is located forward of the end point SLe by causing the detection range E to move upward or downward. The detection adjuster 40H may perform a fourth adjustment when the traveling vehicle body 3 has travelled out of the entrance/exit SL under the second operation control, the fourth adjustment being an adjustment in which the detection adjuster 40H orients at least some of the plurality of detection directions toward a space forward of the traveling vehicle body 3 in the direction of travel of the traveling vehicle body 3 and a portion of the land surface Kh, Kj that is located forward of the traveling vehicle body 3 by causing the detection range E to move upward or downward.

With this, when the traveling vehicle body 3 of the agricultural machine 1 travels on the entrance/exit SL and approaches the end point SLe of the entrance/exit SL under the second operation control, the detection range E of the detector 41L moves upward or downward and at least some of the detection directions of the detector 41L are oriented toward a space forward of the end point SLe of the entrance/exit SL and a land surface Kh, Kj that is located forward of the end point SLe. When the traveling vehicle body 3 is traveling out of the entrance/exit SL under the second operation control, the detection range E moves upward or downward and at least some of the detection directions are oriented toward a space forward of the traveling vehicle body 3 in the direction of travel of the traveling vehicle body 3 and a portion of the land surface Kh, Kj that is located forward of the traveling vehicle body 3. This makes it possible to detect, with the detector 41L, objects located forward of the agricultural machine 1 before and after the agricultural machine 1 travels through the entrance/exit SL under the second operation control before or after doing work on the ground in the agricultural field H under the first operation control, making it possible to achieve high detection performance of the detector 41L and achieve stable travel of the agricultural machine 1.

In a preferred embodiment, when the traveling vehicle body 3 is traveling toward somewhere other than the entrance/exit SL or when the traveling vehicle body 3 is traveling toward the entrance/exit SL and the distance from the position of the traveling vehicle body 3 to the position of the entrance/exit SL is greater than the predetermined value, the detection adjuster 40H may orient a plurality of the detection directions toward a space forward of the traveling vehicle body 3 in the direction of travel and a portion of the land surface Kh, Ks, Kj that is located forward of the traveling vehicle body 3.

With this, while the agricultural machine 1 is traveling somewhere distant from the entrance/exit SL of the agricultural field H, the detection directions of the detector 41L are oriented toward a space forward of the traveling vehicle body 3 in the direction of travel and a portion of the land surface Kh, Ks, Kj that is located forward of the traveling vehicle body 3 This makes it possible to detect, with the detector 41L, objects located forward of the traveling vehicle body 3, and achieve high detection performance of the detector 41L and achieve stable travel of the agricultural machine 1.

In a preferred embodiment, the information acquirer 40I may acquire an angle of slope θs of the entrance/exit SL. When the angle of slope θs is equal to or greater than a threshold, the detection adjuster 40H may adjust the detection direction based on the angle of slope θs. With this, when the angle of slope θs of the entrance/exit SL of the agricultural field H is large, it is possible to automatically adjust the detection direction of the detector 41L according to the angle of slope θ of the entrance/exit SL before and after the agricultural machine 1 travels on the entrance/exit SL, to thereby achieve high detection performance of the detector 41L. Furthermore, the detection direction of the detector 41L is not adjusted unnecessarily when the angle of slope θs of the entrance/exit SL of the agricultural field H is small, making it possible to reduce the processing load of the detection adjuster 40H and the detector 41L.

For example, the detection direction(s) may be adjusted, during travel of the agricultural machine 1, based on a result of monitoring of a surrounding area (detected result) of the agricultural machine 1 with the detector 41L. In such a case, if it is possible to properly detect with the detector 41L the conditions of land surfaces Kh, Ks, and/or Kj and/or the like in the surrounding area, it would be possible to adjust the detection direction(s) according to the conditions of the land surfaces Kh, Ks, and/or Kj in real-time However, there may be cases in which, as described with reference to FIGS. 9A and 9B, the conditions of the surrounding area may not be properly detected with the detector 41L, for example, before and while the agricultural machine 1 travels on the entrance/exit SL of the agricultural field H. In such a case, the detection direction(s) of the detector 41L also cannot be appropriately adjusted.

In this regard, in a preferred embodiment, the information acquirer 40I acquires, before the detection adjuster 40H adjusts the detection direction(s), information relating to the entrance/exit SL from a memory 45 (and/or a memory or a storage of an external apparatus 56, a server, and/or a memory of the working device 2) which stores information relating to the agricultural field H. This makes it possible to appropriately adjust the detection direction(s) of the detector 41L based on the information relating to the entrance/exit SL pre-acquired by the information acquirer 40I when the agricultural machine 1 travels on the entrance/exit SL of the agricultural field H and before and after the agricultural machine 1 travels on the entrance/exit SL of the agricultural field H, making it possible to reliably achieve high detection performance of the detector 41L.

An agricultural machine 1 according to a preferred embodiment includes a traveling vehicle body 3 to travel, a detector 41L to detect objects in a surrounding area of the traveling vehicle body 3, a detection adjuster 40H to adjust a detection range E of the detector 41L, a positioning device 41k to detect a position of the traveling vehicle body 3, and an information acquirer 40I to acquire information relating to land surfaces Kh, Ks, Kj including a first land surface and a second land surface on which the traveling vehicle body 3 is to travel, wherein while the traveling vehicle body 3 is traveling, the detection adjuster 40H is operable to detect, based on the information relating to the land surfaces Kh, Ks, Kj acquired by the information acquirer 40I, a vertical angular difference Δθ between (i) the first land surface Kh, Ks, Kj extending from the traveling vehicle body 3 to a point P2, P5, P12, P15 at a predetermined distance forward from the traveling vehicle body 3 in the direction of travel of the traveling vehicle body 3 and (ii) the second land surface Kh, Ks, Kj located forward of the point P2, P5, P12, P15 in the direction of travel of the traveling vehicle body 3, and to perform an adjustment of causing the detection range E to move upward or downward based on the angular difference Δθ and a change in the position of the traveling vehicle body 3 detected by the positioning device 41k relative to the point P2, P5, P12, P15.

With this, when the traveling vehicle body 3 of the agricultural machine 1 travels from the first land surface Kh, Ks, Kj to the second land surface Ks, Kj, Kh, the detection range E of the detector 41L moves upward or downward and is appropriately adjusted based on the angular difference Δθ between the first land surface Kh, Ks, Kj and the second land surface Ks, Kj, Kh and a change in the position of the traveling vehicle body 3 relative to the land surfaces Kh, Ks, Kj. This makes it possible to sequentially scan the first land surface Kh, Ks, Kj, the second land surface Ks, Kj, Kh, and an area forward of the second land surface Ks, Kj, Kh and detect with the detector 41L objects on these surfaces. This makes it possible to achieve high detection performance of the detector 41L even if changes occur in the conditions of the land surfaces Kh, Ks, Kj on which the agricultural machine 1 travels and achieve stable travel of the agricultural machine 1.

In a preferred embodiment, when the second land surface Ks, Kj, Kh slopes upward relative to the first land surface Kh, Ks, Kj, the detection adjuster 40H may perform an adjustment of causing the detection range E to swing upward based on the angular difference Δθ as the position of the traveling vehicle body 3 on the first land surface Kh, Ks, Kj approaches the point P2, P5, P12, P15 which is a junction between the first land surface Kh, Ks, Kj and the second land surface Ks, Kj, Kh. The detection adjuster 40H may perform an adjustment of causing the detection range E to swing downward to return to where it was before upward swinging as the position of the traveling vehicle body 3 on the second land surface Ks, Kj, Kh goes away from the point P2, P5, P12, P15.

With this, when the traveling vehicle body 3 of the agricultural machine 1 travels from the first land surface Kh, Ks, Kj to the upward-sloping second land surface Ks, Kj, Kh, the detection range E of the detector 41L swings upward or downward and is appropriately adjusted based on the angular difference Δθ between the first land surface Kh, Ks, Kj and the second land surface Ks, Kj, Kh and a change in the position of the traveling vehicle body 3 relative to the land surfaces Kh, Ks, Kj. This makes it possible to sequentially and reliably scan the first land surface Kh, Ks, Kj, the upward-sloping second land surface Ks, Kj, Kh, and an area forward of the second land surface Ks, Kj, Kh and more reliably detect with the detector 41L objects on these surfaces. This makes it possible to achieve high detection performance of the detector 41L even if changes occur in the angles of slope of the land surfaces Kh, Ks, Kj on which the agricultural machine 1 travels, and achieve stable travel of the agricultural machine 1.

In a preferred embodiment, when the second land surface Ks, Kj, Kh slopes downward relative to the first land surface Kh, Ks, Kj, the detection adjuster 40H may perform an adjustment of causing the detection range E to swing downward based on the angular difference $\Delta\theta$ as the position of the traveling vehicle body 3 on the first land surface Kh, Ks, Kj approaches the point P2, P5, P12, P15 which is a junction between the first land surface Kh, Ks, Kj and the second land surface Ks, Kj, Kh. The detection adjuster 40H may perform an adjustment of causing the detection range E to swing upward to return to where it was before downward swinging as the position of the traveling vehicle body 3 on the second land surface Ks, Kj, Kh goes away from the point P2, P5, P12, P15.

With this, when the traveling vehicle body 3 of the agricultural machine 1 travels from the first land surface Kh, Ks, Kj to the downward-sloping second land surface Ks, Kj, Kh, the detection range E of the detector 41L swings upward or downward and is appropriately adjusted based on the angular difference $\Delta\theta$ between the first land surface Kh, Ks, Kj and the second land surface Ks, Kj, Kh and a change in the position of the traveling vehicle body 3 relative to the land surfaces Kh, Ks, Kj. This makes it possible to sequentially and reliably scan the first land surface Kh, Ks, Kj, the downward-sloping second land surface Ks, Kj, Kh, and an area forward of the second land surface Ks, Kj, Kh and more reliably detect with the detector 41L objects on these surfaces. This makes it possible to achieve high detection performance of the detector 41L even if changes occur in the angles of slope of the land surfaces Kh, Ks, Kj on which the agricultural machine 1 travels, and achieve stable travel of the agricultural machine 1.

In a preferred embodiment, when the traveling vehicle body 3 is traveling on the first land surface Kh, Ks, Kj toward the second land surface Ks, Kj, Kh, the detection adjuster 40H may orient the detection range E and at least some of detection directions forming the detection range E toward an end point of the second land surface Ks, Kj, Kh. When the traveling vehicle body 3 is traveling on the second land surface Ks, Kj, Kh, the detection adjuster 40H may orient the detection range E and at least some of the detection directions toward the end point of the second land surface Ks, Kj, Kh or a space forward of the end point in a direction of travel of the traveling vehicle body 3.

With this, when the traveling vehicle body 3 of the agricultural machine 1 is traveling on the first land surface Kh, Ks, Kj toward the second land surface Ks, Kj, Kh and when the traveling vehicle body 3 is traveling on the second land surface Ks, Kj, Kh, it is possible to more reliably detect with the detector 41L objects on the first land surface Kh, Ks, Kj and the second land surface Ks, Kj, Kh and objects located forward of the second land surface Ks, Kj, Kh. This makes it possible to achieve even higher detection performance of the detector 41L.

In a preferred embodiment, the information acquirer 40I may acquire, before the detection adjuster 40H adjusts the detection range E, information relating to the land surface(s) Kh, Ks, and/or Kj from a memory 45 (and/or a memory or a storage of an external apparatus 56, a server, and/or a memory of the working device 2) which stores information relating to the agricultural field H. This makes it possible to appropriately adjust the detection direction(s) of the detector 41L based on the information relating to the land surface(s) Kh, Ks, and/or Kj pre-acquired by the information acquirer 40I when the agricultural machine 1 travels on the land surface(s) Kh, Ks, and/or Kj and before and after the agricultural machine 1 travels on the land surface(s) Kh, Ks, and/or Kj, making it possible to reliably achieve high detection performance of the detector 41L.

In a preferred embodiment, the detection adjuster 40H may correct the detected result of the detector 41L based on a result of the first or second adjustment to obtain a corrected detected result. The agricultural machine 1 may further include a travel controller (automatic operation controller) 40E to control travel of the traveling vehicle body 3 based on the detected result of the detector 41L and the corrected detected result. With this, the detected result of the detector 41L is corrected according to the result of the adjustment of the detection direction(s) and the detection range E of the detector 41L, making it possible to achieve high object detection performance of the detector 41L. Furthermore, since the travel of the traveling vehicle body 3 is controlled based on the detected result of the detector 41L with such high object detection performance, it is possible to achieve even more stable travel of the agricultural machine 1.

An agricultural machine 1 according to a preferred embodiment includes a traveling vehicle body 3 to travel, a raising/lowering device 8 to change a heightwise position of a working device 2 linked to the traveling vehicle body 3, a positioning device $41k$ to detect a position of the traveling vehicle body 3, an information acquirer 40I to acquire information relating to an entrance/exit SL of an agricultural field H, and a raising/lowering controller 40D to control operation of the raising/lowering device 8, wherein the raising/lowering controller 40D is configured or programmed to acquire the position of the traveling vehicle body 3 detected by the positioning device $41k$ and a position and an angle of slope $\theta s$ of the entrance/exit SL included in the information acquired by the information acquirer 40I, when the traveling vehicle body 3 is traveling toward the entrance/exit SL, when a distance from the position of the traveling vehicle body 3 to a start point SLs of the entrance/exit SL is equal to or greater than a first threshold, the raising/lowering controller 40D causes the raising/lowering device 8 to set a heightwise position of the working device 2 to a first position S1, S1$a$, and when the distance from the position of the traveling vehicle body 3 to the start point SLs of the entrance/exit SL is less than the first threshold, the raising/lowering controller 40D is configured or programmed to cause, based on the angle of slope $\theta s$ of the entrance/exit SL, the raising/lowering device 8 to set the heightwise position of the working device 2 to a second position S2, S2$a$ in which the working device 2 is spaced above the land surface Kh, Kj.

With this, when the agricultural machine 1 is traveling on the agricultural field H or the agricultural road J toward the entrance/exit SL of the agricultural field H, the raising/lowering device 8 is caused to set the heightwise position of the working device 2 to the first position S1, S1$a$ or the second position S2, S2$a$ in which the working device 2 is spaced above land surface Kh according to a change in the position of the traveling vehicle body 3 of the agricultural machine 1 relative to the start point SLs of the entrance/exit SL and the angle of slope $\theta s$ of the entrance/exit SL. This makes it possible to prevent the working device 2 from contacting the land surface Kh of the agricultural field H or the land surface Kj of the agricultural road J on the same side of the entrance/exit SL as the traveling vehicle body 3, and also possible to maintain the stability of traveling vehicle body 3 by raising or lowering the working device 2 only to the extent that the center of gravity of the agricultural machine 1 is not too high. This makes it possible to achieve stable travel of the agricultural machine 1 with the working device 2 at varying heights.

In a preferred embodiment, when the traveling vehicle body 3 is traveling toward the entrance/exit SL that slopes upward, the raising/lowering controller 40D may cause the second position S2 to be higher than the first position S1. When the traveling vehicle body 3 is traveling up the entrance/exit SL that slopes upward, while a distance from the position of the traveling vehicle body 3 to the start point SLs of the entrance/exit SL is less than the first threshold, the raising/lowering controller 40D may cause the raising/lowering device 8 to maintain the heightwise position of the working device 2 at the second position S2.

With this, when the agricultural machine 1 travels toward the upward-sloping entrance/exit SL and approaches the entrance/exit SL and during a period from when the agricultural machine 1 started traveling up the entrance/exit SL to when the agricultural machine 1 goes way from the start point SLs of the entrance/exit SL to some extent, the heightwise position of the working device 2 is set at the second position S2. This makes it possible to prevent the working device 2 from contacting the land surface Kh on the same side of the entrance/exit SL as the traveling vehicle body 3, and also possible to achieve stability of the traveling vehicle body 3 by preventing the center of gravity of the agricultural machine 1 from becoming too high.

In a preferred embodiment, when the traveling vehicle body 3 is traveling on the entrance/exit SL, the raising/lowering controller 40D may cause, based on the angle of slope θs of the entrance/exit SL, the raising/lowering device 8 to set the heightwise position of the working device 2 to a third position S3, S3a in which the working device 2 is spaced above the land surface Ks. This makes it possible to prevent the working device 2 from contacting the land surface Ks of the entrance/exit SL when the agricultural machine 1 travels on the entrance/exit SL, and also possible to achieve stability of the traveling vehicle body 3 by preventing the center of gravity of the agricultural machine 1 from becoming too high.

In a preferred embodiment, after the traveling vehicle body 3 has traveled out of the entrance/exit SL, the raising/lowering controller 40D may cause the raising/lowering device 8 to set the heightwise position of the working device 2 to a fourth position S4, S4a in which the working device 2 is spaced above the land surface Kj, Kh. This makes it possible to prevent the working device 2 from contacting the land surface Kj, Kh after the agricultural machine 1 has traveled out of the entrance/exit SL, and also possible to achieve stability of the traveling vehicle body 3 by preventing the center of gravity of the agricultural machine 1 from becoming too high.

In a preferred embodiment, when the traveling vehicle body 3 is traveling down the entrance/exit SL that slopes downward, when a distance from the position of the traveling vehicle body 3 to the end point SLe of the entrance/exit SL is equal to or greater than a second threshold, the raising/lowering controller 40D may cause, based on the angle of slope θs of the entrance/exit SL, the raising/lowering device 8 to set the heightwise position of working device 2 to the second position S2a in which the working device 2 is spaced above the land surface Ks. When the distance from the position of the traveling vehicle body 3 to the end point SLe of the entrance/exit SL is less than the second threshold, the raising/lowering controller 40D may cause, based on the angle of slope θs of the entrance/exit SL, the raising/lowering device 8 to set the heightwise position of the working device 2 to a third position S3a which is higher than the second position S2a. After the traveling vehicle body 3 has traveled out of the entrance/exit SL, while the distance from the position of the traveling vehicle body 3 to the end point SLe of the entrance/exit SL is less than the second threshold, the raising/lowering controller 40D may cause the raising/lowering device 8 to maintain the heightwise position of the working device 2 at the third position S3a.

With this, when the agricultural machine 1 is traveling down the downward-sloping entrance/exit SL, the heightwise position of the working device 2 is set to the second position S2a and, during a period from when the agricultural machine 1 approaches the end point SLe of the entrance/exit SL to when the agricultural machine 1 goes away from the end point SLe to some extent, the heightwise position of the working device 2 is set to the third position S3a. This makes it possible to prevent the working device 2 from contacting the land surface Ks of the entrance/exit SL, and also possible to achieve stability of the traveling vehicle body 3 by preventing the center of gravity of the agricultural machine 1 from becoming too high.

In a preferred embodiment, the agricultural machine 1 may further include an automatic operation controller 40E to perform a first operation control in which the automatic operation controller 40E controls the automatic operation of the traveling vehicle body 3 while causing the working device 2 to do work on a ground, and a second operation control in which the automatic operation controller 40E controls the automatic operation of the traveling vehicle body 3 without causing the working device 2 to do work on the ground. The raising/lowering controller 40D may cause the raising/lowering device 8 to set the heightwise position of the working device 2 based on the angle of slope θs of the entrance/exit SL, an angle of slope θh, θj of a land surface Kh, Kj that is located forward or rearward of the entrance/exit SL, and/or a change in the position of the traveling vehicle body 3 relative to the entrance/exit SL when the traveling vehicle body 3 is traveling under the second operation control toward the entrance/exit SL, traveling vehicle body 3 is traveling on the entrance/exit SL, or when the traveling vehicle body 3 is traveling out of the entrance/exit SL.

With this, when the agricultural machine 1 travels on the entrance/exit SL under the second operation control or before or after the agricultural machine 1 travels on the entrance/exit SL, the heightwise position of the working device 2 can be appropriately set by the raising/lowering device 8 based on the angle(s) of slope θs, θh, and/or θj of the land surfaces Ks, Kh, and/or Kj on which the agricultural machine 1 travels and a change in the position of the traveling vehicle body 3 relative to the entrance/exit SL.

In a preferred embodiment, the raising/lowering controller 40D may cause the raising/lowering device 8 to cause the heightwise position of the working device 2 to move gradually based on the angle of slope θs of the entrance/exit SL, the angle of slope of the land surface Kh, Kj located forward or rearward of the entrance/exit SL, and/or a change in the position of the traveling vehicle body 3 relative to the entrance/exit SL. With this, when the agricultural machine 1 travels on the agricultural field H, the entrance/exit SL, and/or the agricultural road J, the height (heightwise position) of the working device 2 is appropriately and stably changed by the raising/lowering device 8, making it possible to prevent the working device 2 from contacting the land surface(s) Ks, Kh, and/or Kj, and also possible to achieve stability of the traveling vehicle body 3. This makes it possible to allow the agricultural machine 1 to travel stably on the agricultural field H, the entrance/exit SL, and/or the agricultural road J.

For example, the heightwise position of the working device 2 may be set by the raising/lowering device 8, during travel of the agricultural machine 1, based on a result of monitoring of land surface(s) Kh, Ks, and/or Kj (detected result) with the detector 41L. In such a case, if it is possible to properly detect with the detector 41L the conditions of land surface(s) Kh, Ks, and/or Kj, it would be possible to set the heightwise position of the working device 2 according to the conditions of the land surfaces Kh, Ks, and/or Kj in real-time. However, there may be cases in which, as described with reference to FIGS. 9A and 9B, the conditions of the surrounding area may not be properly detected with the detector 41L, for example, before and while the agricultural machine 1 travels on the entrance/exit SL of the agricultural field H. In such a case, the heightwise position of the working device 2 also cannot be appropriately set by the raising/lowering device 8.

In this regard, in a preferred embodiment, the information acquirer 40I acquires, before the raising/lowering device 8 sets the heightwise position of the working device 2, information relating to the entrance/exit SL from a memory 45 (and/or a memory or a storage of an external apparatus 56, a server, and/or a memory of the working device 2) which stores information relating to the agricultural field H. This makes it possible to cause the raising/lowering device 8 to appropriately set the heightwise position of the working device 2 based on the information relating to the entrance/exit SL pre-acquired by the information acquirer 40I when the agricultural machine 1 travels on the entrance/exit SL of the agricultural field H and before and after the agricultural machine 1 travels on the entrance/exit SL of the agricultural field H, making it possible to allow the agricultural machine 1 to travel stably.

An agricultural machine 1 according to a preferred embodiment includes a traveling vehicle body 3 to travel, a raising/lowering device 8 to change a heightwise position of a working device 2 linked to the traveling vehicle body 3, a positioning device 41k to detect a position of the traveling vehicle body 3, an information acquirer 40I to acquire information relating to land surfaces Kh, Ks, Kj on which the traveling vehicle body 3 is to travel, and a raising/lowering controller 40D to control operation of the raising/lowering device 8, wherein the raising/lowering controller 40D configured or programmed to acquire the position of the traveling vehicle body 3 detected by the positioning device 41k and positions and angles of slope $\theta h$, $\theta s$, $\theta j$ of the land surfaces Kh, Ks, Kj included in the information acquired by the information acquirer 40I, when the traveling vehicle body 3 is traveling from a first land surface Kh, Kj included in the land surfaces Kh, Ks, Kj toward a second land surface Ks included in the land surfaces Kh, Ks, Kj, when a distance from the position of the traveling vehicle body 3 to a start point SLs of the second land surface Ks is equal to or greater than the first threshold, the raising/lowering controller 40D is configured or programmed to cause the raising/lowering device 8 to set the heightwise position of the working device 2 to the first position S1, S1a, and when the distance from the position of the traveling vehicle body 3 to the start point SLs of the second land surface Ks is less than the first threshold, the raising/lowering controller 40D is configured or programmed to cause, based on the angle of slope $\theta s$ of the second land surface Ks, the raising/lowering device 8 to set the heightwise position of the working device 2 to the second position S2, S2a in which the working device 2 is spaced above the first land surface Kh, Kj.

With this, when the agricultural machine 1 is traveling from the first land surface Kh, Kj to the second land surface Ks, the raising/lowering device 8 is caused to set the heightwise position of the working device 2 to the first position S1, S1a or the second position S2, S2a in which the working device 2 is spaced above the land surface Kh, Kj according to a change in the position of the traveling vehicle body 3 of the agricultural machine 1 relative to the start point SLs of the second land surface Ks and the angle of slope $\theta s$ of the second land surface Ks. This makes it possible to prevent the working device 2 from contacting the land surface Kh, Kj on the same side of the second land surface Ks as the traveling vehicle body 3, and also possible to achieve stability of the traveling vehicle body 3 by raising or lowering the working device 2 only to the extent that the center of gravity of the agricultural machine 1 is not too high. This makes it possible to achieve stable travel of the agricultural machine 1 with the working device 2 at varying heights.

In a preferred embodiment, when the traveling vehicle body 3 is traveling toward the second land surface Ks that slopes upward, the raising/lowering controller 40D may set the second position S2 to be higher than the first position S1. When the traveling vehicle body 3 is traveling up the second land surface Ks, while a distance from the position of the traveling vehicle body 3 to the start point SLs of the second land surface Ks is less than a first threshold, the raising/lowering controller 40D may cause the raising/lowering device 8 to maintain the heightwise position of the working device 2 at the second position S2.

With this, when the agricultural machine 1 travels toward the upward-sloping second land surface Ks and approaches the second land surface Ks and during a period from when the agricultural machine 1 starts traveling up the second land surface Ks to when the agricultural machine 1 goes away from the start point SLs of the second land surface Ks to some extent, the heightwise position of the working device 2 is set to the second position S2. This makes it possible to prevent the working device 2 from contacting the land surface Kh on the same side of the second land surface Ks as the traveling vehicle body 3, and also possible to achieve stability of the traveling vehicle body 3 by preventing the center of gravity of the agricultural machine 1 from becoming too high.

In a preferred embodiment, when the traveling vehicle body 3 is traveling down the second land surface Ks that slopes downward, when a distance from the position of the traveling vehicle body 3 to the end point SLe of the second land surface Ks is equal to or greater than a second threshold, the raising/lowering controller 40D may cause, based on the angle of slope $\theta s$ of the second land surface Ks, the raising/lowering device 8 to set the heightwise position of the working device 2 to the second position S2a in which the working device 2 is spaced above the land surface Ks. When the distance from the position of the traveling vehicle body 3 to the end point SLe of the second land surface Ks is less than the second threshold, the raising/lowering controller 40D may cause, based on the angle of slope $\theta s$ of the second land surface Ks, the raising/lowering device 8 to set the heightwise position of the working device 2 to a third position S3a which is higher than the second position S2a. After the traveling vehicle body 3 has traveled out of the second land surface Ks, while the distance from the position of the traveling vehicle body 3 to the end point SLe of the second land surface Ks is less than the second threshold, the raising/lowering controller 40D may cause the raising/lowering device 8 to maintain the heightwise position of the working device 2 at the third position S3a.

With this, when the agricultural machine 1 is traveling down the downward-sloping second land surface Ks, the heightwise position of the working device 2 is set to the second position S2a and, during a period from when the agricultural machine 1 approaches the end point SLe of the second land surface Ks to when the agricultural machine 1 goes away from the end point SLe to some extent, the heightwise position of the working device 2 is set to the third position S3a. This makes it possible to prevent the working device 2 from contacting the second land surface Ks, and also possible to achieve stability of the traveling vehicle body 3 by preventing the center of gravity of the agricultural machine 1 from becoming too high.

In a preferred embodiment, the information acquirer 40I may acquire, before the raising/lowering device 8 sets the heightwise position of the working device 2, information relating to the land surface(s) Kh, Ks, and/or Kj from a memory 45 (and/or a memory or a storage of an external apparatus 56, a server, and/or a memory of the working device 2) which stores map information. This makes it possible to cause the raising/lowering device 8 to appropriately set the heightwise position of the working device 2 based on the information relating to the land surface(s) Kh, Ks, and/or Kj pre-acquired by the information acquirer 40I when the agricultural machine 1 travels on the land surface(s) Kh, Ks, and/or Kj and before and after the agricultural machine 1 travels on the land surface(s) Kh, Ks, and/or Kj, making it possible to allow the agricultural machine 1 to travel stably.

In a preferred embodiment, the information acquirer 40I may acquire information relating to the working device 2. The raising/lowering controller 40D may set the heightwise position of the working device 2 based on specifications of the working device 2 acquired by the information acquirer 40I. With this, the height (heightwise position) of the working device 2 can be appropriately changed by the raising/lowering device 8 according to the specifications of the working device 2, making it possible to prevent the working device 2 from contacting the land surface(s) Ks, Kh, and/or Kj and possible to achieve stability of the traveling vehicle body 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system to adjust an object detection direction for an agricultural machine, the system comprising:
   a traveling vehicle body to travel;
   a detector to detect objects in a surrounding area of the traveling vehicle body, an object detection direction and an object detection range of the detector being swingable up and down;
   a detection adjuster to adjust the object detection direction of the detector;
   a position sensor to use a satellite positioning system to detect a position of the traveling vehicle body; and
   a controller configured or programmed to acquire information relating to an entrance/exit of an agricultural field located between the agricultural field and a road outside the agricultural field by reading the information from a memory or a storage which stores the information or by receiving, via a communication device, the information from a computer or a storage which stores the information; wherein
   the detection adjuster is operable to perform a first adjustment when the traveling vehicle body is traveling toward a land surface of the entrance/exit and a distance from the position of the traveling vehicle body detected by the position sensor to a start point of the land surface of the entrance/exit included in the information acquired by the controller is equal to or less than a predetermined value, the first adjustment being an adjustment in which the object detection adjuster orients the detection direction toward an end point of the land surface of the entrance/exit by causing the object detection range to move upward or downward; and
   the detection adjuster is operable to perform a second adjustment when the traveling vehicle body is traveling on the land surface of the entrance/exit, the second adjustment being an adjustment in which the object detection adjuster orients the detection direction toward the end point of the land surface of the entrance/exit or a space forward of the end point in a direction of travel of the traveling vehicle body by causing the object detection range to move upward or downward.

2. The system according to claim 1, wherein:
   the detection adjuster is operable to perform: a third adjustment when the traveling vehicle body is traveling on the land surface of the entrance/exit and a distance from the position of the traveling vehicle body to the end point of the land surface of the entrance/exit is equal to or less than a predetermined value, the third adjustment being an adjustment in which the detection adjuster orients the object detection direction toward a space forward of the end point of the land surface of the entrance/exit in the direction of travel by causing the object detection range to move upward or downward; and
   the detection adjuster is operable to perform a fourth adjustment when the traveling vehicle body has traveled through the end point of the land surface of the entrance/exit, the fourth adjustment being an adjustment in which the object detection adjuster orients the detection direction toward a space forward of the traveling vehicle body in the direction of travel by causing the object detection range to move upward or downward.

3. The system according to claim 1, wherein
   the detection adjuster is operable to (i) when the traveling vehicle body is traveling toward somewhere other than the land surface of the entrance/exit or (ii) when the traveling vehicle body is traveling toward the land surface of the entrance/exit and the distance from the position of the traveling vehicle body to the position start point of the land surface of the entrance/exit is greater than the predetermined value,
   orient a plurality of the object detection directions toward a space forward of the traveling vehicle body in the direction of travel and a land surface that is located forward of the traveling vehicle body in the direction of travel.

4. The system according to claim 1, wherein
   the detection adjuster is operable to, when an angle of slope of the land surface of the entrance/exit included in the information acquired by the controller is equal to or greater than a threshold, adjust the object detection direction based on the angle of slope.

5. The system according to claim 1, wherein the controller is configured or programmed to acquire, before the detection adjuster adjusts the object detection direction, the information relating to the entrance/exit from the memory or the storage which stores information relating to the agricultural field.

6. The system according to claim 1, wherein
the detection adjuster is operable to correct a detected result of the detector based on a result of the first or second adjustment to obtain a corrected detected result; and
the system further comprises a travel controller to control travel of the traveling vehicle body based on the detected result of the detector and the corrected detected result.

7. A system to adjust an object detection direction for an agricultural machine, the system comprising:
a traveling vehicle body to travel;
a detector to detect objects in a surrounding area of the traveling vehicle body, an object detection direction and an object detection range of the detector being swingable up and down;
a detection adjuster to adjust the object detection direction of the detector;
a position sensor to use a satellite positioning system to detect a position of the traveling vehicle body;
a controller configured or programmed to acquire information relating to an entrance/exit of an agricultural filed located between the agricultural field and a road outside the agricultural field by reading the information from a memory or a storage which stores the information or by receiving, via a communication device, the information from a computer or a storage which stores the information; and
an automatic operation controller to perform:
a first operation control in which the automatic operation controller controls automatic operation of the traveling vehicle body while causing a working device linked to the traveling vehicle body to do work on a ground; and
a second operation control in which the automatic operation controller controls the automatic operation of the traveling vehicle body without causing the working device to do work on the ground; wherein
the detection adjuster is operable to, before the automatic operation controller changes the second operation control to the first operation control or after the automatic operation controller changes the first operation control to the second operation control:
perform a first adjustment when the traveling vehicle body is traveling toward a land surface of the entrance/exit under the second operation control and a distance from the position of the traveling vehicle body detected by the position sensor to a start point of the land surface of the entrance/exit including in the information acquired by the controller is equal to or less than a predetermined value, the first adjustment being an adjustment in which the direction adjuster orients at least some of a plurality of the object detection directions toward an end point of the land surface of the entrance/exit and the land surface of the entrance/exit, by causing the object detection range of the detector to move upward or downward; and perform a second adjustment when the traveling vehicle body is traveling on the land surface of the entrance/exit under the second operation control, the second adjustment being an adjustment in which the detection adjuster orients at least some of the plurality of object detection directions toward (i) the end point of the land surface of the entrance/exit and (ii) the land surface of the entrance/exit and/or a land surface located forward of the end point in a direction of travel of the traveling vehicle body, by causing the object detection range to move upward or downward.

8. The system according to claim 7, wherein the detection adjuster is operable to perform: a third adjustment when the traveling vehicle body is traveling on the land surface of the entrance/exit under the second operation control and a distance from the position of the traveling vehicle body to the end point of the land surface of the entrance/exit is equal to or less than a predetermined value, the third adjustment being an adjustment in which the detection adjuster orients at least some of the plurality of object detection directions toward a space forward of the end point of the land surface of the entrance/exit in the direction of travel and the land surface that is located forward of the end point in the direction of travel by causing the object detection range to move upward or downward; and the detection adjuster is operable to perform a fourth adjustment when the traveling vehicle body has travelled through the end point of the land surface of the entrance/exit under the second operation control, the fourth adjustment being an adjustment in which the detection adjuster orients at least some of the plurality of object detection directions toward a space forward of the traveling vehicle body in the direction of travel and the land surface that is located forward of the traveling vehicle body in the direction of travel by causing the object detection range to move upward or downward.

* * * * *